US012529049B2

(12) United States Patent
Joly et al.

(10) Patent No.: US 12,529,049 B2
(45) Date of Patent: Jan. 20, 2026

(54) CHARACTERIZATION AND LOCALIZATION OF PROTEIN MODIFICATIONS

(71) Applicant: NAUTILUS BIOTECHNOLOGY, INC., Seattle, WA (US)

(72) Inventors: James Henry Joly, San Mateo, CA (US); Torri Elise Rinker, San Francisco, CA (US); Christina E. Inman, San Mateo, CA (US)

(73) Assignee: NAUTILUS SUBSIDIARY, INC., Seattle, WA (US)

( * ) Notice: Subject to any disclaimer, the term of this patent is extended or adjusted under 35 U.S.C. 154(b) by 811 days.

(21) Appl. No.: 17/929,420

(22) Filed: Sep. 2, 2022

(65) Prior Publication Data

US 2023/0070896 A1   Mar. 9, 2023

Related U.S. Application Data

(60) Provisional application No. 63/242,433, filed on Sep. 9, 2021.

(51) Int. Cl.
*C12N 15/00* (2006.01)
*C12N 15/10* (2006.01)
(Continued)

(52) U.S. Cl.
CPC .......... *C12N 15/1065* (2013.01); *C40B 20/02* (2013.01); *C40B 20/04* (2013.01);
(Continued)

(58) Field of Classification Search
None
See application file for complete search history.

(56) References Cited

U.S. PATENT DOCUMENTS 7,306,904 B2   12/2007 Landegren et al.
7,351,528 B2    4/2008 Landegren
(Continued)

FOREIGN PATENT DOCUMENTS

WO   WO-2012044612 A1 *  4/2012  ............. C07K 16/32
WO   WO-2018102759 A1 *  6/2018  ....... G01N 33/54353
(Continued)

OTHER PUBLICATIONS

Aebersold et al., "How many human proteoforms are there?", Nat Chem Biol vol. 14:206-214 (2018).
(Continued)

*Primary Examiner* — Heather Calamita
*Assistant Examiner* — Elizabeth Rose Lafave
(74) *Attorney, Agent, or Firm* — Knobbe, Martens Olson & Bear LLP

(57) ABSTRACT

A method for characterizing proteins, including steps of (a) detecting a plurality of proteins, wherein individual proteins of the plurality are associated with unique identifiers, wherein the detecting distinguishes the identities of the individual proteins and the unique identifiers associated with the individual proteins; (b) digesting the proteins to form peptides, wherein the peptides from each protein are associated with the unique identifiers for the respective individual protein; (c) detecting the peptides and associated unique identifiers, wherein the detecting distinguishes characteristics of individual peptides, and wherein the detecting distinguishes unique identifiers associated with the individual peptides; and (d) correlating characteristics detected in step (c) with individual proteins detected in step (a) based on the unique identifiers associated with the individual proteins and the peptides.

19 Claims, 9 Drawing Sheets

(51) Int. Cl.
*C40B 20/02* (2006.01)
*C40B 20/04* (2006.01)
*C40B 70/00* (2006.01)
*G01N 33/68* (2006.01)

(52) U.S. Cl.
CPC .......... *C40B 70/00* (2013.01); *G01N 33/6842* (2013.01); *G01N 2440/14* (2013.01); *G01N 2458/10* (2013.01)

(56) References Cited

U.S. PATENT DOCUMENTS

| | | |
|---|---|---|
| 7,569,129 B2 | 8/2009 | Pamula et al. |
| 7,901,947 B2 | 3/2011 | Pollack et al. |
| 8,013,134 B2 | 9/2011 | Fredriksson |
| 8,268,554 B2 | 9/2012 | Schallmeiner |
| 8,445,194 B2 | 5/2013 | Drmanac et al. |
| 8,501,923 B2 | 8/2013 | Rothemund |
| 9,340,416 B2 | 5/2016 | Maune et al. |
| 9,777,315 B2 | 10/2017 | Fredriksson et al. |
| 9,796,749 B2 | 10/2017 | Yin et al. |
| 10,227,648 B2 | 3/2019 | Hindson et al. |
| 10,473,654 B1 | 11/2019 | Mallick |
| 10,809,254 B2 | 10/2020 | Pamula et al. |
| 11,125,748 B2 | 9/2021 | Gopinath et al. |
| 11,162,192 B2 | 11/2021 | Gopinath et al. |
| 11,203,612 B2 | 12/2021 | Gremyachinskiy et al. |
| 11,214,795 B2 | 1/2022 | Gopinath et al. |
| 11,282,585 B2 | 3/2022 | Patel et al. |
| 11,391,734 B2 | 7/2022 | Gopinath et al. |
| 11,505,796 B2 | 11/2022 | Aksel et al. |
| 2012/0211084 A1 | 8/2012 | Weitz et al. |
| 2016/0102344 A1 | 4/2016 | Niemeyer et al. |
| 2019/0145982 A1 | 5/2019 | Chee et al. |
| 2020/0082914 A1 | 3/2020 | Patel et al. |
| 2020/0318101 A1 | 10/2020 | Mallick et al. |
| 2020/0348307 A1 | 11/2020 | Beierle et al. |
| 2020/0348308 A1 | 11/2020 | Chee et al. |
| 2021/0101930 A1 | 4/2021 | Gremyachinskiy et al. |
| 2021/0132076 A1 | 5/2021 | Marcotte et al. |
| 2021/0148922 A1 | 5/2021 | Dyer et al. |
| 2021/0230587 A1 | 7/2021 | Gerling et al. |
| 2021/0239705 A1 | 8/2021 | Mallick |
| 2021/0254047 A1 | 8/2021 | Chee et al. |
| 2021/0390705 A1 | 12/2021 | Egertson et al. |
| 2022/0162684 A1 | 5/2022 | Aksel et al. |
| 2022/0227890 A1 | 7/2022 | Kapp et al. |
| 2022/0236282 A1 | 7/2022 | Mallick et al. |
| 2022/0339181 A1 | 10/2022 | Funke et al. |

FOREIGN PATENT DOCUMENTS

| | | |
|---|---|---|
| WO | WO 2019/195633 | 10/2019 |
| WO | WO 2020/106889 | 5/2020 |
| WO | WO 2020/223368 | 11/2020 |
| WO | WO 2021/087402 | 5/2021 |
| WO | WO 2022/136573 | 6/2022 |
| WO | WO 2022/218994 | 10/2022 |
| WO | WO 2022/223802 | 10/2022 |
| WO | WO 2023/038859 | 3/2023 |

OTHER PUBLICATIONS

Alfaro et al., "The emerging landscape of single-molecule protein sequencing technologies", Nature Publishing Group US, vol. 18(6):604-617 (2021).
Anderson et al., "The human plasma proteome: history, character, and diagnostic prospetcs", Molecular &Cellular Proteomics: MCP, vol. 1(11):845-867 (2002).
Bransky et al, "A microfluidic droplet generator based on a piezolectri cactuator", The Royal Society of Chemistry, vol. 9:516-520 (2009).
Demirci et al., "Single cell epitaxy by acoustic picolitre droplets", Lab Chip, vol. 7:1139-1145 (2007).
Egertson et al., "A theoretical framework for proteome-scale single-molecule protein identification using multi-affinity protein binding reagents", BioRxiv (2021), DOI: 10.1101/2021.10-11.463967.
Nguyen et al., "Developing bioorthogonal probes to span a spectrum of reactivities", Nat Rev Chem, vol. 4:476-489 (2020).
Patterson et al., "Orthogonal bioorthogonal chemistries", Current Opinion in Chemical Biology, vol. 28:141-149 (2015).
Rothemund et al., "Folding DNA to create nanoscale shapes and patterns", Nature, vol. 440(7082):297-302 (2006).
Sigl et al., "Programmable icosahedral shell system for virus trapping", Nat Mater, vol. 20(9):1281-1289 (2021).
Smith et al., "Proteoform: a single term describing protein complexity", Nature Methods vol. 10(3):186-187 (2013).
Williams et al., "Amplification of complex gene libraries by emulsion PCR", Nature Methods, vol. 3(7):545-550 (2006).
Zhao et al., "Organizing DNA origami tiles into larger structure suing pre-formed scaffold frames", Nno Lett. vol. 11(7):2997-3002 (2011).

* cited by examiner

CHARACTERIZATION AND LOCALIZATION OF PROTEIN MODIFICATIONS

CROSS REFERENCE TO RELATED U.S. APPLICATIONS

This application claims priority to U.S. Provisional Application No. 63/242,433, filed on Sep. 9, 2021, which is incorporated herein by reference in its entirety.

BACKGROUND

Medical research and clinical diagnostics have been revolutionized by the emergence of high throughput technology platforms that routinely decode the human genome or human transcriptome in a matter of hours. An individual's genome provides a set of instructions for development, behavior, risk of disease, responsiveness to therapeutic treatments, longevity and many other characteristics. As such, the genome provides a powerful source for evaluating risk and predicting outcomes to certain treatments or medications. An individual's transcriptome is the collection of RNA transcripts that are expressed from the genome. The RNA transcripts are, in turn, translated into proteins, the proteins being the workhorses that perform the biological functions instructed by the genome. High throughput tools allow characterized and quantification of the transcriptome and, in some cases, clinically relevant diagnoses or prognoses can be made. However, in many cases, a transcriptome does not provide adequate diagnostic or prognostic precision to guide treatment. This is because the collection of proteins (i.e. the proteome) that is present in a biological system at any given time is not a direct reflection of the transcriptome. The number and types of proteins present at any given time is also influenced by processes that degrade or remove proteins. This is a dynamic process that is responsive to prevailing conditions and that is variably applied to different proteins.

Moreover, protein activity is regulated not merely by the amount and types of proteins that are present, but also by the number and type of chemical modifications that are made to the proteins. These so-called post-translational modifications act as positive and negative regulators of protein activity and are dynamically responsive to conditions experienced by the individual at any given time. There exists a need for proteome-scale characterization of biological systems, thereby further advancing the revolution in medical research and clinical diagnostics. The compositions, methods and apparatus of the present disclosure satisfy this need and provide related advantages as well.

SUMMARY

The present disclosure provides a method for characterizing proteins. The method can include steps of (a) detecting a plurality of proteins, wherein individual proteins of the plurality are associated with unique identifiers, wherein the detecting distinguishes the identities of the individual proteins and the unique identifiers associated with the individual proteins; (b) digesting the proteins to form peptides, wherein the peptides from each protein are associated with the unique identifiers for the respective individual protein; (c) detecting the peptides and associated unique identifiers, wherein the detecting distinguishes characteristics of individual peptides, and wherein the detecting distinguishes unique identifiers associated with the individual peptides; and (d) correlating characteristics detected in step (c) with individual proteins detected in step (a) based on the unique identifiers associated with the individual proteins and the peptides.

A method for characterizing proteins can include steps of (a) detecting a plurality of proteins, wherein individual proteins of the plurality are located at unique protein addresses of an array, wherein the detecting distinguishes the identities of the individual proteins at the unique protein addresses; (b) digesting the proteins to form peptides, wherein the peptides are associated with a unique identifier label for a respective protein from a unique protein address of the array; (c) detecting the peptides and associated unique identifier labels, wherein the detecting distinguishes characteristics of individual peptides, and wherein the detecting distinguishes a unique identifier label associated with the individual peptides; and (d) correlating the characteristics detected in step (c) with individual proteins detected in step (a) based on the unique identifiers associated with the individual proteins and the peptides.

A method for characterizing proteins can include steps of (a) detecting a plurality of proteins, wherein individual proteins of the plurality are located at unique protein addresses of an array, wherein the detecting distinguishes the identities of the individual proteins at the unique protein addresses of the array; (b) digesting the proteins at the unique protein addresses of the array to form peptides; (c) transferring the peptides from the unique protein addresses of the array to unique peptide addresses of an array, wherein the unique protein address from which the peptides are transferred is known for individual peptides at the unique peptide addresses; (d) detecting the peptides at the unique peptide addresses, wherein the detecting distinguishes characteristics of individual peptides; and (e) correlating the characteristics detected in step (d) with individual proteins detected in step (a) based on the known unique protein addresses and the known unique peptide addresses for the peptides.

A method for characterizing proteins can include steps of (a) detecting a plurality of proteins, wherein individual proteins of the plurality are associated with unique identifier labels, wherein the detecting distinguishes the identities of the individual proteins and the unique identifier labels associated with the individual proteins; (b) digesting the proteins to form peptides, wherein the peptides from each protein are associated with the unique identifier labels for the respective individual protein; (c) transferring the peptides and the unique identifier labels to unique peptide addresses of an array; (d) detecting the peptides at the unique peptide addresses, wherein the detecting distinguishes characteristics of individual peptides and the unique identifier labels associated with the individual proteins; and (e) correlating the characteristics detected in step (d) with individual proteins detected in step (a) based on the detection of the unique identifier labels.

Also provided is a method for characterizing proteins, the method including steps of (a) detecting a plurality of proteins, wherein individual proteins of the plurality are associated with unique identifier labels, wherein the detecting distinguishes the identities of the individual proteins and the unique identifier labels associated with the individual proteins; (b) digesting the proteins to form peptides, wherein the peptides from each protein are associated with the unique identifier labels for the respective individual protein; (c) detecting the peptides and associated unique identifier labels, wherein the detecting distinguishes characteristics of individual peptides, and wherein the detecting distinguishes unique identifier labels associated with the individual peptides; and (d) correlating the characteristics detected in step (c) with individual proteins detected in step (a) based on the unique identifier labels associated with the individual proteins and the peptides.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications, patents, or patent applications incorporated by reference contradict the disclosure contained in the specification, the specification is intended to supersede and/or take precedence over any such contradictory material.

DETAILED DESCRIPTION

The present disclosure provides methods, apparatus and compositions for characterizing proteins. The methods, apparatus and compositions set forth herein are particularly useful for characterizing proteins at the complexity and scale of a proteome, such as the human proteome, currently believed to include about 20,000 proteins. However, the methods, apparatus and compositions are also well suited for smaller collections of proteins or even individual proteins.

Many proteomes and other protein collections include a large variety of different protein species including, for example, proteins having different amino acid sequences, and proteoforms having different lengths of a common amino acid sequence and/or different post-translational modifications to a given amino acid sequence. Additionally, many proteomes and other protein collections can have a large dynamic range in the quantity or specific activity of the different proteins. For example, the dynamic range in quantity of proteins in a cellular proteome can approach seven orders of magnitude, from one copy of a given protein per cell to ten million copies of another protein per cell. The methods, apparatus and compositions set forth herein are well suited for characterizing individual proteins in a collection of proteins having high diversity, high dynamic range, or both. The methods, apparatus and compositions of the present disclosure can be configured for use at different scales as appropriate for characterizing any of a variety of different features for the proteins in a proteome or other collection of proteins. For example, a large variety of individual proteins can be identified in a first process that is carried out at a scale that accommodates the expected diversity and dynamic range of a relatively complex protein collection (i.e. complexity referring here to the diversity of different proteins evaluated in regard to their different amino acid sequences). Then, one or more proteins from the collection can be assayed in a second process carried out at a lower complexity scale to identify more detailed characteristics such as the number, type or location of post translational modifications present in each of the proteins. Characteristics identified from the first and second processes can be correlated with respect to a given protein.

Figure 1:
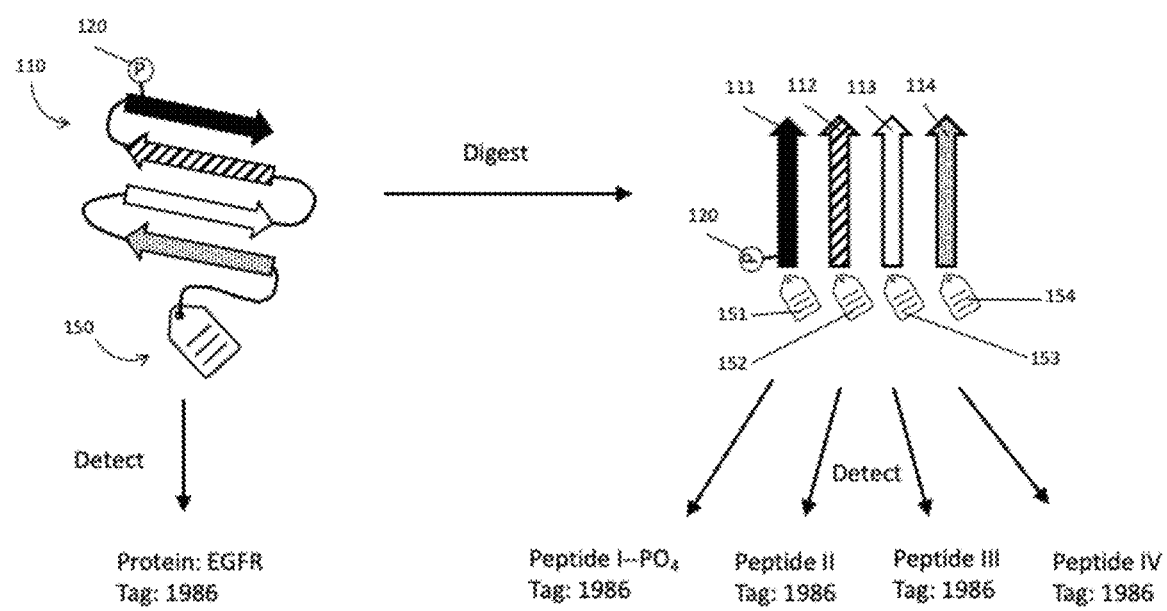
FIG. 1 shows a diagrammatic representation of two processes carried out for a protein associated with a unique identifier and peptide fragments of associated with unique identifiers.

In particular configurations of the methods, apparatus and compositions set forth herein, characteristics identified from two or more processes can be correlated with respect to a given protein by use of a unique identifier. A unique identifier can be associated with a given protein, or products thereof such as peptide fragments of the protein, throughout two or more processes. For each of the processes, characteristics can be identified in a way that a given characteristic is associated with a particular unique identifier. Because the unique identifier is associated with a given protein, or product thereof, the characteristics identified in association with the unique identifier across multiple processes can be attributed to the given protein. FIG. 1 provides a diagrammatic representation of two assay processes carried out for a protein that is associated with a unique identifier. In the first assay process, protein 110 and associated unique identifier 150 are detected. In this example, protein 110 is identified as epidermal growth factor receptor (EGFR) and the unique identifier is identified as tag 1986 (150). Protein 110 is then digested to produce peptide fragments 111, 112, 113 and 114 and the peptides are associated with unique identifiers 151, 152, 153 and 154, respectively. Tags 151, 152, 153 and 154 can be the same as tag 150 (e.g. tag 150 may be present in four copies during all or part of the first process), derived from tag 150 (e.g. tags 151, 152, 153 and 154 can be nucleic acid tags copied from a template nucleic acid in tag 150) or otherwise associated with tag 150. In the second assay process of FIG. 1, the peptides are individually detected to identify which, if any, have a phosphorylated amino acid. In the example shown, Peptide I (111) is observed to have a phosphoryl moiety 120, whereas peptides II (112), III (113) and IV (114) are observed to lack phosphoryl moieties. The phosphorylation states of the peptides detected in the second process can be correlated with the EGFR protein identified in the first process based on coincidence of the associated tags. An advantage of using unique identifiers is that, although phosphoryl moiety 120 can be detected in the first process, it need not be. Moreover, the sequences of peptides 111 through 114 can be determined at high resolution during the second process, but need not be. Accordingly, the use of unique identifiers as set forth herein allows for correlation of protein characteristics determined across a variety of different processes performed at different complexity scales or different levels of structural or functional resolution for individual proteins.

Any of a variety of characteristics can be determined for proteins using methods, apparatus and compositions set forth herein. As exemplified in FIG. 1, characteristics that identify a protein can be determined, for example, to distinguish an individual protein from among a plurality of other proteins. Characteristics that indicate the structure or function of an individual protein can also be determined. Exemplary protein characteristics that can be determined include, but are not limited to, primary structure (i.e. amino acid sequence), secondary structure (i.e. three dimensional form of continuous segments in the primary structure such as alpha helices, beta sheets, turns, loops etc.), tertiary structure (i.e. three dimensional form of a single polypeptide chain of a protein), quaternary structure (i.e. three dimensional form of two or more polypeptide chains of a multimeric protein), presence or absence of post translational modifications, presence or absence of enzyme co-factors, identification of single amino acid variants (SAVs), presence or absence of ligands or reaction substrates, affinity for ligands or reaction substrates, enzymatic activity, presence or absence of enzyme cofactors, affinity for other proteins, susceptibility or resistance to degradation factors such as proteases, polypeptide chain length, $pK_a$, charge, hydrodynamic radius, mass, charge to mass ratio, or amino acid composition (with or without indicating the order for the amino acids in the protein). These and other characteristics can optionally be detected in association with a unique identifier.

In particular configurations of the methods, apparatus and compositions set forth herein, a unique identifier can be used as a proxy for the identity of a protein when assaying a particular characteristic of the protein. As such, an assay that is used to determine the characteristic need not determine the identity of the protein. Rather, a unique identifier can be identified in the assay and the results of the assay can be correlated with the protein based on a known association of the unique identifier with the protein. In some configurations, a unique identifier can be used as a proxy for a first characteristic of a protein when assaying a second characteristic of the protein. Accordingly, the assay that is used to determine the second characteristic of the protein need not determine the first characteristic of the protein. Rather, the unique identifier can be identified in the assay and the second characteristic correlated with the first characteristic based on the association of the unique identifier.

Any of a variety of types of unique identifiers and configurations for associating the unique identifiers with proteins can be used. Exemplary unique identifiers include a physical location for an individual protein (such as an address in an array or a well in a multi-well substrate); unique identifier label (such as a nucleic acid having a unique nucleotide sequence); label having a distinguishable characteristic (such as an optical label having distinguishable absorption, luminescence excitation, luminescence emission, luminescence lifetime or luminescence polarity); and others set forth herein. A unique identifier can be associated with a protein via physical attachment of the unique identifier to the protein, co-localization of the unique identifier with the protein, knowledge of contemporaneous or co-localized processing for the unique identifier and protein, transfer of a code between the protein and unique identifier, or the like. Unique identifiers with a relatively large code space can be particularly useful when detecting, identifying or characterizing a large variety of proteins or when evaluating a large variety of characteristics for one or more proteins, for example, in multiplex or high throughput formats that utilize multiple procedures.

Terms used herein will be understood to take on their ordinary meaning in the relevant art unless specified otherwise. Several terms used herein and their meanings are set forth below.

As used herein, the term "address" means a location in an array where a particular analyte (e.g. protein, peptide or unique identifier label) is present. An address can contain a single analyte, or it can contain a population of several analytes of the same species (i.e. an ensemble of the analytes). Alternatively, an address can include a population of different analytes. Addresses are typically discrete. The discrete addresses can be contiguous, or they can be separated by interstitial spaces. An array useful herein can have, for example, addresses that are separated by less than 100 microns, 10 microns, 1 micron, 100 nm, 10 nm or less. Alternatively or additionally, an array can have addresses that are separated by at least 10 nm, 100 nm, 1 micron, 10 microns, or 100 microns. The addresses can each have an area of less than 1 square millimeter, 500 square microns, 100 square microns, 10 square microns, 1 square micron, 100 square nm or less. An array can include at least about $1 \times 10^4$, $1 \times 10^5$, $1 \times 10^6$, $1 \times 10^7$, $1 \times 10^8$, $1 \times 10^9$, $1 \times 10^{10}$, $1 \times 10^{11}$, $1 \times 10^{12}$, or more addresses. An address can be referred to as "unique" in reference to the association of the address with a particular analyte. The association may be permanent or transient. For example, an address may be unique to a protein of interest during some or all steps of a method set forth herein.

As used herein, the term "affinity agent" refers to a molecule or other substance that is capable of specifically or reproducibly binding to an analyte (e.g. protein, peptide or unique identifier label) or moiety (e.g. post-translational modification of a protein). An affinity agent can be larger than, smaller than or the same size as the analyte. An affinity agent may form a reversible or irreversible bond with an analyte. An affinity agent may bind with an analyte in a covalent or non-covalent manner. Affinity agents may include reactive affinity agents, catalytic affinity agents (e.g., kinases, proteases, etc.) or non-reactive affinity agents (e.g., antibodies or fragments thereof). An affinity agent can be non-reactive and non-catalytic, thereby not permanently altering the chemical structure of an analyte to which it binds. Affinity agents that can be particularly useful for binding to proteins include, but are not limited to, antibodies or functional fragments thereof (e.g., Fab' fragments, F(ab')$_2$ fragments, single-chain variable fragments (scFv), di-scFv, tri-scFv, or microantibodies), aptamers, affibodies, affilins, affimers, affitins, alphabodies, anticalins, avimers, miniproteins, DARPins, monobodies, nanoCLAMPs, lectins, or functional fragments thereof.

As used herein, the term "array" refers to a population of analytes (e.g. proteins) that are associated with unique identifiers such that the analytes can be distinguished from each other. A unique identifier can be a solid support (e.g. particle or bead), spatial address on a solid support, tag, label (e.g. luminophore), or barcode (e.g. nucleic acid barcode) that is associated with an analyte and that is distinct from other identifiers in the array. Analytes can be associated with unique identifiers by attachment, for example, via covalent or non-covalent (e.g. ionic bond, hydrogen bond, van der Waals forces, electrostatics etc.) bonds. An array can include different analytes that are each attached to different unique identifiers. An array can include different unique identifiers that are attached to the same or similar analytes. An array can include separate solid supports or separate addresses that each bear a different analyte, wherein the different analytes can be identified according to the locations of the solid supports or addresses.

As used herein, the term "associated" refers to two things being connected to each other physically or otherwise. Physical connection between two things can be attachment to each other, for example, via covalent bonding, non-covalent bonding, adhesion, adsorption or absorption; co-localization with each other, for example, at an address in or on a solid support; diffusional contact with each other in a fluid phase, for example, in a vessel; attachment of two things to the same unique identifier or to unique identifiers of the same type (e.g. unique identifiers sharing an encoded characteristic). Non-physical connection between two things can include, for example, knowledge of a past interaction or connection between the two things, knowledge of a shared characteristic by two things, knowledge of shared manipulations (e.g. chemical or enzymatic reaction) carried out for the two things, knowledge of one of the things being derived from the other thing (e.g. via replication, amplification, digestion, degradation, or synthesis), or knowledge of a shared origin for the two things.

As used herein, the term "attached" refers to the state of two things being joined, fastened, adhered, connected or bound to each other. For example, an analyte, such as a protein, can be attached to a solid phase component by a covalent or non-covalent bond. A covalent bond is characterized by the sharing of pairs of electrons between atoms. A non-covalent bond is a chemical bond that does not involve the sharing of pairs of electrons and can include, for example, hydrogen bonds, ionic bonds, van der Waals forces, hydrophilic interactions and hydrophobic interactions.

As used herein, the term "binding profile" refers to a plurality of binding outcomes for a protein or other analyte. The binding outcomes can be obtained from independent binding observations, for example, independent binding outcomes can be acquired using different affinity agents, respectively. A binding profile can include empirical measurement outcomes, putative measurement outcomes or both. A binding profile can exclude empirical measurement outcomes or putative measurement outcomes.

As used herein, the "comprising" is intended herein to be open-ended, including not only the recited elements, but further encompassing any additional elements.

As used herein, the term "each," when used in reference to a collection of items, is intended to identify an individual item in the collection but does not necessarily refer to every item in the collection. Exceptions can occur if explicit disclosure or context clearly dictates otherwise.

As used herein, the term "epitope" refers to an affinity target within a protein, peptide or other analyte. Epitopes may comprise amino acid sequences that are sequentially adjacent in the primary structure of a protein or amino acids that are structurally adjacent in the secondary, tertiary or quaternary structure of a protein. An epitope can optionally be recognized by or bound to an antibody. However, an epitope need not necessarily be recognized by any antibody, for example, instead being recognized by an aptamer, mini-protein or other affinity agent. An epitope can optionally bind an antibody to elicit an immune response. However, an epitope need not necessarily participate in, nor be capable of, eliciting an immune response.

As used herein, the term "exogenous," when used in reference to a moiety of a molecule, means a moiety that is not present in a natural analog of the molecule. For example, an exogenous label of a nucleic acid is a label that is not present on a naturally occurring nucleic acid. Similarly, an exogenous label that is present on a binding agent is not found on the native milieu from which the binding agent is derived.

As used herein, the term "immobilized," when used in reference to a molecule that is in contact with a fluid phase, refers to the molecule being prevented from diffusing in the fluid phase. For example, immobilization can occur due to the molecule being confined at, or attached to, a solid phase. Immobilization can be temporary (e.g. for the duration of one or more steps or methods set forth herein) or permanent. Immobilization can be reversible or irreversible under conditions utilized for a method, system or composition set forth herein.

As used herein, the term "label" refers to a molecule or moiety thereof that provides a detectable characteristic. The detectable characteristic can be, for example, an optical signal such as absorbance of radiation, luminescence (e.g. fluorescence) emission, luminescence lifetime or luminescence polarization; Rayleigh and/or Mie scattering; binding affinity for a ligand or receptor; magnetic properties; electrical properties; charge; mass; radioactivity or the like. Exemplary labels include, without limitation, a fluorophore, luminophore, chromophore, nanoparticle (e.g., gold, silver, carbon nanotubes), heavy atom, radioactive isotope, mass label, charge label, spin label, receptor, ligand, or the like.

As used herein, the term "linker" refers to a moiety that connects two objects to each other. One or both objects can be a molecule, solid support, address, particle or bead. Both objects can be moieties of a molecule, solid support, address, particle or bead. The term can also refer to an atom, moiety or molecule that is configured to react with two objects to form a moiety that connects the two objects. The connection of a linker to one or both objects can be a covalent bond or non-covalent bond. A linker may be configured to provide a chemical or mechanical property to the moiety connecting two objects, such as hydrophobicity, hydrophilicity, electrical charge, polarity, rigidity, or flexibility. A linker may comprise two or more functional groups that facilitate coupling of the linker to the first and second objects. A linker may include a polyfunctional linker such as a homobifunctional linker, heterobifunctional linker, homopolyfunctional linker, or heteropolyfunctional linker. Exemplary compositions for linkers can include, but are not limited to, a polyethylene glycol (PEG), polyethylene oxide (PEO), amino acid, protein, nucleotide, nucleic acid, nucleic acid origami, dendrimer, protein nucleic acid (PNA), polysaccharide, carbon, nitrogen, oxygen, ether, sulfur, or disulfide. A linker can be a bead or particle such as a structured nucleic acid particle.

As used herein, the term "measurement outcome" refers to information resulting from observation or examination of a process. For example, the measurement outcome for contacting an affinity agent with an analyte can be referred to as a "binding outcome." A measurement outcome can be positive or negative. For example, observation of binding is a positive binding outcome and observation (or perception)

of non-binding is a negative binding outcome. A measurement outcome can be a null outcome in the event a positive or negative outcome does not result from a given measurement. An "empirical" measurement outcome includes information based on observation of a signal from an analytical technique. A "putative" measurement outcome includes information based on theoretical or a priori evaluation of an analytical technique or analytes.

As used herein, the term "nucleic acid nanoball" refers to a globular or spherical nucleic acid structure. A nucleic acid nanoball may comprise a concatemer of sequence regions that arranges in a globular structure. A nucleic acid nanoball may include DNA, RNA, PNA, modified or non-natural nucleic acids, or combinations thereof. A nucleic acid nanoball can have a compact structure, thereby forming a structured nucleic acid particle (SNAP) or portion thereof.

As used herein, the term "nucleic acid origami" refers to a nucleic acid construct comprising engineered tertiary or quaternary structure(s), optionally, in addition to any double stranded helical structure occurring in complementary strands of the nucleic acid construct. A nucleic acid origami may include DNA, RNA, PNA, modified or non-natural nucleic acids, or combinations thereof. A nucleic acid origami may include a plurality of oligonucleotides that hybridize via sequence complementarity to produce the engineered structure of the origami particle. A nucleic acid origami may include sections of single-stranded or double-stranded nucleic acid, or combinations thereof. Exemplary nucleic acid origami structures may include nanotubes, nanowires, cages, tiles, nanospheres, blocks, and combinations thereof. A nucleic acid origami can optionally include a relatively long scaffold nucleic acid to which multiple smaller nucleic acids hybridize, thereby creating folds and bends in the scaffold that produce an engineered structure. The scaffold nucleic acid can be circular or linear. The scaffold nucleic acid can be single stranded but for hybridization to the smaller nucleic acids. A smaller nucleic acid (sometimes referred to as a "staple") can hybridize to two regions of the scaffold, wherein the two regions of the scaffold are separated by an intervening region that does not hybridize to the smaller nucleic acid.

As used herein, the term "nucleic acid tag" refers to a nucleic acid molecule or sequence that is encoded with information that uniquely identifies an object with which it is associated. A nucleic acid tag can be associated with an object via a connection. The connection can be physical, including for example, attachment, colocalization, diffusional contact or the like. Non-physical connections can include, for example, knowledge of a past interaction, knowledge of a shared characteristic, knowledge of common manipulations, knowledge of origin or the like. The nucleic acid tag can be DNA, RNA or analogs thereof. The length of the tag sequence can be at least about 5, 8, 10, 15, 20, 25, 30, 40, 50, 75, 100 or more nucleotides. Alternatively or additionally, the length of the tag sequence can be at most about 100, 75, 50, 40, 30, 25, 20, 15, 10, 8, 5 or fewer nucleotides.

As used herein, the term "post translational modification" refers to a change to the chemical composition of a protein compared to the chemical composition encoded by the gene for the protein. Exemplary changes include those that alter the presence, absence or relative arrangement of different regions of amino acid sequence (e.g., splicing variants, or protein processing variants of a single gene), or due to presence or absence of different moieties on particular amino acids (e.g., post-translationally modified variants of a single gene). A post translational modification can be derived from an in vivo process or in vitro process. A post translational modification can be derived from a natural process or a synthetic process. Exemplary post translational modifications include those classified by the PSI-MOD ontology. See Smith, L. M. et al. *Nat. Methods*, 2013, 10, 186-187.

As used herein, the term "promiscuity," when used in reference to a binding agent, refers to the binding agent binding to, or having the capability of binding to, two or more different analytes. For example, a promiscuous binding agent may: 1) bind to a plurality of different analytes due to the presence of a common epitope within the structures of the different analytes; or 2) bind to a plurality of different epitopes; or 3) a combination of both properties. Additional concepts pertaining to binding promiscuity are set forth in WO 2020/106889A1, which is incorporated herein by reference in its entirety.

As used herein, the term "protein" refers to a molecule comprising two or more amino acids joined by a peptide bond. A protein may also be referred to as a polypeptide, oligopeptide or peptide. Although the terms "protein," "polypeptide," "oligopeptide" and "peptide" may optionally be used to refer to molecules having different characteristics, such as amino acid sequence composition or length, molecular weight, origin of the molecule or the like, the terms are not intended to inherently include such distinctions in all contexts. A protein can be a naturally occurring molecule, or synthetic molecule. A protein may include one or more non-natural amino acids, modified amino acids, or non-amino acid linkers. A protein may contain D-amino acid enantiomers, L-amino acid enantiomers or both. Amino acids of a protein may be modified naturally or synthetically, such as by post-translational modifications.

As used herein, the term "random," when used in reference to an array, means the identities of analytes at particular addresses are not known. In some cases, an array can be referred to as random to indicate a mode of manufacture in which the identities of analytes at the addresses were not known from the manufacturing process. Optionally, the identity of the analyte can be unknown for at least 55%, 75%, 90%, 95% or 99% of the addresses in a random array. The addresses in a random array can be arranged in a repeating pattern such as a hexagonal grid or rectilinear grid. Alternatively or additionally, the addresses in a random array can be arranged in a non-repeating pattern or irregular pattern.

As used herein, the term "single analyte" refers to an analyte (e.g. protein, nucleic acid, or affinity agent) that is individually manipulated or distinguished from other analytes. A single analyte can be a single molecule (e.g. single protein or peptide), a single complex of two or more molecules (e.g. a single protein attached to a structured nucleic acid particle or a single protein bound to an affinity agent), a single particle, or the like. A single analyte may be resolved from other analytes based on, for example, spatial or temporal separation from the other analytes. Accordingly, an analyte can be detected at "single-analyte resolution" which is the detection of, or ability to detect, the analyte on an individual basis, for example, as distinguished from its nearest neighbor in an array. Reference herein to a 'single analyte' in the context of a composition, apparatus or method does not necessarily exclude application of the composition, apparatus or method to multiple single analytes that are manipulated or distinguished individually, unless indicated contextually or explicitly to the contrary.

As used herein, the term "solid support" refers to a substrate that is insoluble in aqueous liquid. Optionally, the substrate can be rigid. The substrate can be non-porous or porous. The substrate can optionally be capable of taking up a liquid (e.g. due to porosity) but will typically, but not necessarily, be sufficiently rigid that the substrate does not swell substantially when taking up the liquid and does not contract substantially when the liquid is removed. A non-porous solid support is generally impermeable to liquids or gases. Exemplary solid supports include, but are not limited to, glass and modified or functionalized glass, plastics (including acrylics, polystyrene and copolymers of styrene and other materials, polypropylene, polyethylene, polybutylene, polyurethanes, Teflon™, cyclic olefins, polyimides etc.), nylon, ceramics, resins, Zeonor™, silica or silica-based materials including silicon and modified silicon, carbon, metals, inorganic glasses, optical fiber bundles, gels, and polymers. In particular configurations, a flow cell contains the solid support such that fluids introduced to the flow cell can interact with a surface of the solid support to which one or more components of a binding event (or other reaction) is attached.

As used herein, the term "structured nucleic acid particle" (or "SNAP") refers to a single- or multi-chain polynucleotide molecule having a compacted three-dimensional structure. The compacted three-dimensional structure can optionally be characterized in terms of hydrodynamic radius or Stoke's radius of the SNAP relative to a random coil or other non-structured state for a nucleic acid having the same sequence length as the SNAP. The compacted three-dimensional structure can optionally be characterized with regard to tertiary structure. For example, a SNAP can be configured to have an increased number of internal binding interactions between regions of a polynucleotide strand, less distance between the regions, increased number of bends in the strand, and/or more acute bends in the strand, as compared to the same nucleic acid molecule in a random coil or other non-structured state. Alternatively or additionally, the compacted three-dimensional structure can optionally be characterized with regard to quaternary structure. For example, a SNAP can be configured to have an increased number of interactions between polynucleotide strands or less distance between the strands, as compared to the same nucleic acid molecule in a random coil or other non-structured state. In some configurations, the secondary structure (i.e. the helical twist or direction of the polynucleotide strand) of a SNAP can be configured to be more dense than the same nucleic acid molecule in a random coil or other non-structured state. A SNAP can optionally be modified to permit attachment of additional molecules to the SNAP. A SNAP may comprise DNA, RNA, PNA, modified or non-natural nucleic acids, or combinations thereof. A SNAP may include a plurality of oligonucleotides that hybridize to form the SNAP structure. The plurality of oligonucleotides in a SNAP may include oligonucleotides that are conjugated to other molecules (e.g., affinity reagents, detectable labels) or are configured to be conjugated to other molecules (e.g., by reactive handles). A SNAP may include engineered or rationally-designed structures, such as nucleic acid origami.

As used herein, the term "unique identifier" refers to a moiety, object or substance that is associated with an analyte and that is distinct from other identifiers, throughout one or more steps of a process. The moiety, object or substance can be, for example, a solid support such as a particle or bead; a location on a solid support; a spatial address in an array; a tag; a label such as a luminophore; a molecular barcode such as a nucleic acid having a unique nucleotide sequence or a protein having a unique amino acid sequence; or an encoded device such as a radiofrequency identification (RFID) chip, electronically encoded device, magnetically encoded device or optically encoded device. The process in which a unique identifier is used can be an analytical process, such as a method for detecting, identifying, characterizing or quantifying an analyte; a separation process in which at least on analyte is separated from other analytes; or a synthetic process in which an analyte is modified or produced. The unique identifier can be associated with an analyte via immobilization. For example, a unique identifier can be covalently or non-covalently (e.g. ionic bond, hydrogen bond, van der Waals forces etc.) attached to an analyte. A unique identifier can be exogenous to an associated analyte, for example, being synthetically attached to the associated analyte. Alternatively, a unique identifier can be endogenous to the analyte, for example, being attached or associated with the analyte in the native milieu of the analyte.

As used herein, the term "unique identifier label" refers to a unique identifier that is a particle, molecule or moiety that provides a detectable characteristic. The detectable characteristic can be, for example, an optical signal such as absorbance of radiation, luminescence (e.g. fluorescence) emission, luminescence lifetime, luminescence polarization, or the like; Rayleigh and/or Mie scattering; binding affinity for a ligand or receptor; magnetic properties; electrical properties; charge; mass; radioactivity or the like. Exemplary labels include, without limitation, a fluorophore, luminophore, chromophore, nanoparticle (e.g., gold, silver, carbon nanotubes), heavy atoms, radioactive isotope, mass label, charge label, spin label, receptor, ligand, or the like.

As used herein, the term "vessel" refers to an enclosure that contains a substance. The enclosure can be permanent or temporary with respect to the timeframe of a method set forth herein or with respect to one or more steps of a method set forth herein. Exemplary vessels include, but are not limited to, a well (e.g. in a multiwell plate or array of wells), test tube, channel, tubing, pipe, flow cell, bottle, vesicle, droplet that is immiscible in a surrounding fluid, or the like. A vessel can be entirely sealed to prevent fluid communication from inside to outside, and vice versa. Alternatively, a vessel can include one or more ingress or egress to allow fluid communication between the inside and outside of the vessel. A vessel can be made from multiple materials, for example, including a well in a solid support that is covered by a seal such as a wax or fluid that is immiscible with fluid in the well.

The embodiments set forth below and recited in the claims can be understood in view of the above definitions.

The present disclosure provides a method for characterizing proteins. The method can include steps of (a) detecting a plurality of proteins, wherein individual proteins of the plurality are associated with unique identifiers, wherein the detecting distinguishes the identities of the individual proteins and the unique identifiers associated with the individual proteins; (b) digesting the proteins to form peptides, wherein the peptides from each protein are associated with the unique identifiers for the respective individual protein; (c) detecting the peptides and associated unique identifiers, wherein the detecting distinguishes characteristics of individual peptides, and wherein the detecting distinguishes unique identifiers associated with the individual peptides; and (d) correlating characteristics detected in step (c) with individual proteins detected in step (a) based on the unique identifiers associated with the individual proteins and the peptides.

A method of the present disclosure can be used to identify any of a variety of characteristics for proteins. For example, a protein can be identified. Characteristics that distinguish an individual protein from among a plurality of other proteins are particularly useful. Structural or functional characteristics of proteins are also useful. Exemplary protein characteristics that can be determined include, but are not limited to, the amino acid sequence (i.e. primary structure) for all or part of the protein; three dimensional form for continuous segments of the protein such as alpha helices, beta sheets, turns, loops etc. (i.e. secondary structure); three dimensional form of a single polypeptide chain of a protein (i.e. tertiary structure) or a portion of the polypeptide that includes multiple secondary structural elements; or three dimensional form of all or part of a multimeric protein, wherein the part encompasses two or more polypeptide chains of a multimeric protein (i.e. quaternary structure).

Characteristics that distinguish one proteoform from another are also useful. For example, proteoforms can differ with regard to presence or absence of a post-translational modification, type of post-translational modification present, location of a post-translational modification, number of post-translational modifications present or combination thereof. A post-translational modification may be one or more of myristoylation, palmitoylation, isoprenylation, prenylation, farnesylation, geranylgeranylation, lipoylation, flavin moiety attachment, Heme C attachment, phosphopantetheinylation, retinylidene Schiff base formation, dipthamide formation, ethanolamine phosphoglycerol attachment, hypusine, beta-Lysine addition, acylation, acetylation, deacetylation, formylation, alkylation, methylation, C-terminal amidation, arginylation, polyglutamylation, polyglyclyation, butyrylation, gamma-carboxylation, glycosylation, glycation, polysialylation, malonylation, hydroxylation, iodination, nucleotide addition, phosphoate ester formation, phosphoramidate formation, phosphorylation, adenylylation, uridylylation, propionylation, pyrolglutamate formation, S-glutathionylation, S-nitrosylation, S-sulfenylation, S-sulfinylation, S-sulfonylation, succinylation, sulfation, glycation, carbamylation, carbonylation, isopeptide bond formation, biotinylation, carbamylation, oxidation, reduction, pegylation, ISGylation, SUMOylation, ubiquitination, neddylation, pupylation, citrullination, deamidation, elminylation, disulfide bridge formation, isoaspartate formation, and racemization.

A post-translational modification may occur at a particular type of amino acid residue in a protein. For example, the phosphate moiety of a particular proteoform can be present on a serine, threonine, tyrosine, histidine, cysteine, lysine, aspartate or glutamate residue. In another example, an acetyl moiety of a particular proteoform can be present on the N-terminus or on a lysine of a protein. In another example, a serine or threonine residue of a proteoform can have an O-linked glycosyl moiety, or an asparagine residue of a proteoform can have an N-linked glycosyl moiety. In another example, a proline, lysine, asparagine, aspartate or histidine amino acid of a proteoform can be hydroxylated. In another example, a proteoform can be methylated at an arginine or lysine amino acid. In another example, a proteoform can be ubiquitinated at the N-terminal methionine or at a lysine amino acid Further examples of characteristics that can be distinguished for different proteins or proteoforms include single amino acid variants (SAVs); alternative splicing variants expressed from a given gene; variants along a protein maturation pathway, such as those having a leader or signal sequence at the amino terminus vs. those that do not; affinity for ligands or reaction substrates; enzymatic activity; presence or absence of enzyme cofactors; affinity for other proteins; susceptibility or resistance to degradation factors such as proteases; polypeptide chain length; $pK_a$; charge; hydrodynamic radius; mass; charge to mass ratio; or amino acid composition (with or without indicating the order for the amino acids in the protein).

Different proteoforms may arise due to in vivo processes or in vitro processes. Examples of in vivo processes that produce in vivo post-translational modifications include those utilized by biological systems to regulate protein activity or abundance. Exemplary in vitro post-translational modifications that can result from in vitro processes include, but are not limited to, degradation of a protein to form peptide fragments, truncation by removal of a C-terminal or N-terminal portion of a protein, or modifications to one or more amino acids due to oxidation, reduction, or radical damage. Examples of in vitro processes that can result in post-translational modifications include, but are not limited to, cell lysis, fractionation of cellular components, synthetic procedures, biological assays, clinical assays or biochemical assays. Altered proteins may include partially or severely degraded proteins, truncated proteins, partially or fully denatured proteins, agglomerated proteins, damaged proteins, protein fragments, or modified proteins.

One or more proteins that are used in a method, composition or apparatus herein, can be derived from a natural or synthetic source. Exemplary sources include, but are not limited to biological tissue, fluid, cells or subcellular compartments (e.g. organelles). For example, a sample can be derived from a tissue biopsy, biological fluid (e.g. blood, plasma, extracellular fluid, urine, mucus, saliva, semen, vaginal fluid, sweat, synovial fluid, lymph, cerebrospinal fluid, peritoneal fluid, pleural fluid, amniotic fluid, intracellular fluid, extracellular fluid, etc.), fecal sample, hair sample, cultured cell, culture media, fixed tissue sample (e.g. fresh frozen or formalin-fixed paraffin-embedded) or protein synthesis reaction. A protein source may comprise any sample where a protein is a native or expected constituent. For example, sources for gastric enzymes may include cells from digestive organs, sample from gastric ducts, or fluid samples from digestive organs (e.g., bile). In a second example, a primary source for a cancer biomarker protein may be a tumor biopsy sample. Other sources include environmental samples or forensic samples.

Exemplary organisms from which proteins can be derived include, for example, a mammal such as a rodent, mouse, rat, rabbit, guinea pig, ungulate, horse, sheep, pig, goat, cow, cat, dog, primate, non-human primate or human; a plant such as *Arabidopsis thaliana*, tobacco, corn, sorghum, oat, wheat, rice, canola, or soybean; an algae such as *Chlamydomonas reinhardtii*; a nematode such as *Caenorhabditis elegans*; an insect such as *Drosophila melanogaster*, mosquito, fruit fly, honey bee or spider; a fish such as zebrafish; a reptile; an amphibian such as a frog or *Xenopus laevis*; a *Dictyostelium discoideum*; a fungi such as *Pneumocystis carinii*, *Takifugu rubripes*, yeast, *Saccharamoyces cerevisiae* or *Schizosaccharomyces pombe*; or a *Plasmodium falciparum*. Proteins can also be derived from a prokaryote such as a bacterium, *Escherichia coli*, staphylococci or *Mycoplasma pneumoniae*; an archae; a virus such as Hepatitis C virus, influenza virus, coronavirus, or human immunodeficiency virus; or a viroid. Proteins can be derived from a homogeneous culture or population of the above organisms or alternatively from a collection of several different organisms, for example, in a community or ecosystem.

In some cases, a protein can be derived from an organism that is collected from a host organism. A protein may be derived from a parasitic, pathogenic, symbiotic, or latent organism collected from a host organism. A protein can be derived from an organism, tissue, cell or biological fluid that is known or suspected of being linked with a disease state or disorder (e.g., an oncogenic virus). Alternatively, a protein can be derived from an organism, tissue, cell or biological fluid that is known or suspected of not being linked to a particular disease state or disorder. For example, the proteins isolated from such a source can be used as a control for comparison to results acquired from a source that is known or suspected of being linked to the particular disease state or disorder. A sample may comprise a microbiome. A sample may comprise a plurality of proteins contributed by microbiome constituents. In some cases, one or more proteins used in a method, composition or apparatus set forth herein may be obtained from a single organism (e.g. an individual human), single cell, single organelle, or single protein-containing particle (e.g., a viral particle).

In some cases, one or more proteins can be obtained from a single cell, protein-containing particle (e.g., a viral particle), or a fragment thereof. In some cases, a single cell, protein-containing particle, or fragment thereof may be collected for a single cell heterogeneity analysis. A single cell, protein-containing particle, or fragment thereof may be collected by any known method in the art, such as fluorescence assisted cell sorting, magnetic-assisted cell sorting, and buoyancy-assisted cell sorting. In some cases, a single cell, protein-containing particle, or fragment thereof may be collected by an emulsion technique such as liposome or micellar capture.

A method, composition or apparatus of the present disclosure can use or include a plurality of proteins having any of a variety of compositions such as a plurality of proteins composed of a proteome or fraction thereof. For example, a plurality of proteins can include solution-phase proteins, such as proteins in a biological sample or fraction thereof, or a plurality of proteins can include proteins that are immobilized, such as proteins attached to a particle or solid support. By way of further example, a plurality of proteins can include proteins that are detected, analyzed or identified in connection with a method, composition or apparatus of the present disclosure. The content of a plurality of proteins can be understood according to any of a variety of characteristics such as those set forth below or elsewhere herein.

A plurality of proteins can be characterized in terms of total protein mass. The total mass of protein in a liter of plasma has been estimated to be 70 g and the total mass of protein in a human cell has been estimated to be between 100 μg and 500 pg depending upon cells type. See Wisniewski et al. Molecular & Cellular Proteomics 13:10.1074/mcp.M113.037309, 3497-3506 (2014), which is incorporated herein by reference. A plurality of proteins used or included in a method, composition or apparatus set forth herein can include at least 1 μg, 10 pg, 100 μg, 1 ng, 10 ng, 100 ng, 1 mg, 10 mg, 100 mg, 1 mg, 10 mg, 100 mg or more protein by mass. Alternatively or additionally, a plurality of proteins may contain at most 100 mg, 10 mg, 1 mg, 100 mg, 10 mg, 1 mg, 100 ng, 10 ng, 1 ng, 100 μg, 10 pg, 1 μg or less protein by mass.

A method, composition or apparatus of the present disclosure can use or include a proteomic sample. A proteomic sample can include substantially all proteins from a given source or a substantial fraction thereof. For example, a proteomic sample may contain at least 60%, 75%, 90%, 95%, 99%, 99.9% or more of the total protein mass present in the source from which the sample was derived. Alternatively or additionally, a proteomic sample may contain at most 99.9%, 99%, 95%, 90%, 75%, 60% or less of the total protein mass present in the source from which the sample was derived.

A plurality of proteins can be characterized in terms of total number of protein molecules. The total number of protein molecules in a *Saccharomyces cerevisiae* cell has been estimated to be about 42 million protein molecules. See Ho et al., Cell Systems (2018), DOI: 10.1016/j.cels.2017.12.004, which is incorporated herein by reference. A plurality of proteins used or included in a method, composition or apparatus set forth herein can include at least 1 protein molecule, 10 protein molecules, 100 protein molecules, $1\times10^4$ protein molecules, $1\times10^6$ protein molecules, $1\times10^8$ protein molecules, $1\times10^{10}$ protein molecules, 1 mole ($6.02214076\times10^{23}$ molecules) of protein, 10 moles of protein molecules, 100 moles of protein molecules or more. Alternatively or additionally, a plurality of proteins may contain at most 100 moles of protein molecules, 10 moles of protein molecules, 1 mole of protein molecules, $1\times10^{10}$ protein molecules, $1\times10^8$ protein molecules, $1\times10^6$ protein molecules, $1\times10^4$ protein molecules, 100 protein molecules, 10 protein molecules, 1 protein molecule or less.

A plurality of proteins can be characterized in terms of the variety of full-length primary protein structures in the plurality. For example, the variety of full-length primary protein structures in a plurality of proteins can be equated with the number of different protein-encoding genes in the source for the plurality of proteins. Whether or not the proteins are derived from a known genome or from any genome at all, the variety of full-length primary protein structures can be counted independent of presence or absence of post translational modifications in the proteins. A human proteome is estimated to have about 20,000 different protein-encoding genes such that a plurality of proteins derived from a human can include up to about 20,000 different primary protein structures. See Aebersold et al., Nat. Chem. Biol. 14:206-214 (2018), which is incorporated herein by reference. Other genomes and proteomes in nature are known to be larger or smaller. A plurality of proteins used or included in a method, composition or apparatus set forth herein can have a complexity that includes substantially all different native-length protein primary sequences from a given source. A proteome or subfraction can have a complexity of at least 2, 5, 10, 100, $1\times10^3$, $1\times10^4$, $2\times10^4$, $3\times10^4$ or more different native-length protein primary sequences. Alternatively or additionally, a proteome or subfraction can have a complexity that is at most $3\times10^4$, $2\times10^4$, $1\times10^4$, $1\times10^3$, 100, 10, 5, 2 or fewer different native-length protein primary sequences.

The diversity of a proteomic sample can include at least one representative for substantially all proteins encoded by a source from which the sample was derived or a substantial fraction thereof. For example, a proteomic sample may contain at least one representative for at least 60%, 75%, 90%, 95%, 99%, 99.9% or more of the proteins encoded by a source from which the sample was derived. Alternatively or additionally, a proteomic sample may contain a representative for at most 99.9%, 99%, 95%, 90%, 75%, 60% or less of the proteins encoded by a source from which the sample was derived.

A plurality of proteins can be characterized in terms of the variety of primary protein structures in the plurality including transcribed splice variants. The human proteome has been estimated to include about 70,000 different primary protein structures when splice variants ae included. See Aebersold et al., Nat. Chem. Biol. 14:206-214 (2018), which is incorporated herein by reference. Moreover, the number of the partial-length primary protein structures can increase due to fragmentation that occurs in a sample. A plurality of proteins used or included in a method, composition or apparatus set forth herein can have a complexity of at least 2, 5, 10, 100, $1\times10^3$, $1\times10^4$, $7\times10^4$, $1\times10^5$, $1\times10^6$ or more different primary protein structures. Alternatively or additionally, a plurality of proteins can have a complexity that is at most $1\times10^6$, $1\times10^5$, $7\times10^4$, $1\times10^4$, $1\times10^3$, 100, 10, 5, 2 or fewer different primary protein structures.

A plurality of proteins can be characterized in terms of the variety of protein structures in the plurality including different primary structures and different proteoforms among the primary structures. Different molecular forms of proteins expressed from a given gene are considered to be different proteoforms. Protoeforms can differ, for example, due to differences in primary structure (e.g. shorter or longer amino acid sequences), different arrangement of domains (e.g. transcriptional splice variants), or different post translational modifications (e.g. presence or absence of phosphoryl, glycosyl, acetyl, or ubiquitin moieties). The human proteome is estimated to include hundreds of thousands of proteins when counting the different primary structures and proteoforms. See Aebersold et al., *Nat. Chem. Biol.* 14:206-214 (2018), which is incorporated herein by reference. A plurality of proteins used or included in a method, composition or apparatus set forth herein can have a complexity of at least 2, 5, 10, 100, $1\times10^3$, $1\times10^4$, $1\times10^5$, $1\times10^6$, $5\times10^6$, $1\times10^7$ or more different protein structures. Alternatively or additionally, a plurality of proteins can have a complexity that is at most $1\times10^7$, $5\times10^6$, $1\times10^6$, $1\times10^5$, $1\times10^4$, $1\times10^3$, 100, 10, 5, 2 or fewer different protein structures.

A plurality of proteins can be characterized in terms of the dynamic range for the different protein structures in the sample. The dynamic range can be a measure of the range of abundance for all different protein structures in a plurality of proteins, the range of abundance for all different primary protein structures in a plurality of proteins, the range of abundance for all different full-length primary protein structures in a plurality of proteins, the range of abundance for all different full-length gene products in a plurality of proteins, the range of abundance for all different proteoforms expressed from a given gene, or the range of abundance for any other set of different proteins set forth herein. The dynamic range for all proteins in human plasma is estimated to span more than 10 orders of magnitude from albumin, the most abundant protein, to the rarest proteins that have been measured clinically. See Anderson and Anderson *Mol Cell Proteomics* 1:845-67 (2002), which is incorporated herein by reference. The dynamic range for plurality of proteins set forth herein can be a factor of at least 10, 100, $1\times10^3$, $1\times10^4$, $1\times10^6$, $1\times10^8$, $1\times10^{10}$, or more. Alternatively or additionally, the dynamic range for plurality of proteins set forth herein can be a factor of at most $1\times10^{10}$, $1\times10^8$, $1\times10^6$, $1\times10^4$, $1\times10^3$, 100, 10 or less.

A sample can include different proteoforms of a particular protein. For example, at least 1, 2, 3, 4, 5, 10, 15, 20, 25 or more proteoforms from a particular gene can be present in a method, composition or apparatus set forth herein. Alternatively or additionally, at most 25, 20, 15, 10, 5, 4, 3, 2 or 1 proteoforms from a particular gene can be present in a method, composition or apparatus set forth herein. A method set forth herein can be configured to distinguish the proteoforms. For example, proteoforms can be distinguished with regard to differences in the presence, location or type of post-translational modifications occurring at least at 2, 3, 4, 5, 10, 15, 20, 25 or more residues of a particular amino acid sequence that is shared by the proteoforms. Alternatively or additionally, proteoforms can be distinguished with regard to the presence, location or type of post-translational modifications occurring at most at 25, 20, 15, 10, 5, 4, 3, 2 or 1 residues of a particular amino acid sequence that is shared by the proteoforms.

A sample used herein need not be from a biological source and can instead be from a synthetic source, such as a library from a combinatorial synthesis or a library from an in vitro synthesis that exploits biological components. A synthetic sample can have a range of complexity similar to those set forth above for proteomes. A method set forth herein can detect, identify or characterize some or all proteins in a proteome or other sample including, for example, at least about 1%, 5%, 10%, 25%, 50%, 75%, 90% or 99% of the proteins in the sample.

One or more proteins can optionally be separated or isolated from other components of the source for the protein(s). For example, one or more proteins can be separated or isolated from lipids, nucleic acids, hormones, enzyme cofactors, vitamins, metabolites, microtubules, organelles (e.g. nucleus, mitochondria, chloroplast, endoplasmic reticulum, vesicle, cytoskeleton, vacuole, lysosome, cell membrane, cytosol or Golgi apparatus) or the like. Protein separation can be carried out using methods known in the art such as centrifugation (e.g. to separate membrane fractions from soluble fractions), density gradient centrifugation (e.g. to separate different types of organelles), precipitation, affinity capture (e.g. to capture post-translationally modified proteins using immobilized affinity agents having specificity for post-translational modifications), adsorption, liquid-liquid extraction, solid-phase extraction, chromatography (e.g. affinity chromatography, ion exchange chromatography, reverse phase chromatography, size exclusion chromatography, electrophoresis (e.g. polyacrylamide gel electrophoresis) or the like. Particularly useful protein separation methods are set forth in Scopes, *Protein Purification Principles and Practice*, SPRINGER®; 3rd edition (1993). In particular configurations of the methods set forth herein, a protein sample can be enriched for proteoforms of a particular type. For example, proteoforms having a particular post-translational modification can be enriched by affinity capture and removal of proteoforms lacking the post-translational modification. Such enrichment can occur for proteins prior to being subjected to an identification or characterization method. Alternatively or additionally, enrichment can occur for peptides during or after digestion of the protein from which the peptides are derived.

In some configurations, proteins can be in a native state, for example, being capable of performing native function(s) such as catalysis of reactions. In some configurations, proteins can be in a denatured state, for example, being incapable of performing native function(s) such as catalysis of reactions. One or more proteins can be in a native state for some manipulations and in a non-native state for other manipulations. Protein(s) may be denatured at any stage during manipulation, including for example, upon removal from a native milieu or at a later stage of processing such as a stage where protein(s) are separated from other cellular components, fractionated from other proteins, functionalized for attachment to a solid support, attached to a solid support, contacted with a binding reagent, detected, digested to produce peptides, conjugated to a unique identifier label, or other step set forth herein. Denatured proteins may be refolded, for example, reverting to a native state for one or more step of a process set forth herein.

In particular configurations of the methods, compositions and apparatus of the present disclosure, a protein or product derived from manipulation of a protein, such as a peptide fragment of the protein, can be associated with a unique identifier. A unique identifier can be encoded with information that identifies a protein or its characteristics. A unique identifier can be encoded with information that identifies a product of a protein, such as a peptide fragment of the protein, or that identifies a characteristic of a product of a protein such as a peptide fragment of the protein. Particularly useful unique identifiers encode information in a form that can be decoded more readily than detecting or distinguishing the identity or characteristics of the protein they encode. This advantage can be exploited during one or more steps of a method set forth herein, depending upon the unique identifiers deployed and the detection techniques used. As such, a unique identifier can be used as a proxy for the identity of a protein, as a proxy for the identity of a product of a protein, as a proxy for a characteristic of a protein, or as a proxy for a characteristic of a product of a protein. As such, an assay that is used to determine a particular characteristic of a protein need not determine the identity of the protein, and an assay that is used to determine the identity of a protein need not determine a particular characteristic of the protein. Rather, a unique identifier can be identified in both assays and the results of the assays correlated with an unknown protein based on the association of the unique identifier with the unknown protein during both assays.

A physical location for an individual protein, such as an address in an array or a well in a multiwell substrate, can serve as a unique identifier for the protein. The protein can be immobilized at the location, attached to the location or confined to the location throughout one or more steps of a method set forth herein. A protein or peptide can be identified or characterized, for example, using an assay set forth herein, and the resulting identification or characterization can be correlated with the physical location of the protein or peptide. Subsequent assays of the protein or peptide can be carried out to determine at least one other characteristic for the protein or peptide and the subsequent assay need not repeat the prior assay since the identity or characteristic acquired from the prior assay can be tracked by virtue of the known location for the protein or peptide. In some configurations, both assays are carried out at the same location and the common location functions as the unique identifier for both assays. In other configurations, one assay occurs at a first location and the other assay occurs at a second location. Tracking the transfer of the protein or peptide from one location to the other serves as a nexus for associating the results of the two assays with a particular protein. In a further configuration, one assay occurs at a first location and the other assay occurs in association with a unique identifier label. Observation of the unique identifier label in association with an observed result of the assay performed at the first location can serves as a nexus for association with observations from an assay performed at a different location where the unique identifier was also observed.

For a plurality of proteins or peptides, each protein or peptide can be located at a discrete location that is resolvable from the locations for the other proteins or peptides in the plurality. For example, each protein or peptide can be present at a unique address of an array. A useful configuration is a single molecule configuration in which one, and only one, protein is attached to each address in an array. A single molecule configuration can be used for a peptide array such that one, and only one, peptide is attached to each address in an array. Individual proteins in the plurality can remain associated with the same location or address during multiple assays. Alternatively, individual proteins can remain associated with a unique identifier label during one or more of the assays.

A location, such as an address in an array, can be identified using a detection method that is appropriate to the array and reagents used. For example, an array can be subjected to reagents having optical labels and optical imaging techniques can be used to resolvably detect the individual addresses. Individual electronic detectors in an array of electronic detectors, such as individual field effect transistors (FETs), can be distinguished by individualized detection of each electronic detector. In another example, individual beads or particles in an array of beads or particles can be distinguished based on spatial location of the beads or particles, or based on the temporal position of the beads or particles in a fluidic stream passing a detector.

A unique identifier can be a unique identifier label. The composition of the label can include a molecule, bead, particle or other detectable substance. A protein or peptide can be associated with a unique identifier label, for example, by attachment of the label to the protein or peptide, co-localization of the label and the protein or peptide (e.g. via attachment of the label and the protein or peptide to the same address of an array), contemporary use of the label and the protein or peptide. A protein or peptide can be identified or characterized, for example, using an assay set forth herein, and the resulting identification or characterization can be correlated with an associated unique identifier. Subsequent assays of the protein or peptide can be carried out to determine at least one other characteristic for the protein or peptide and the subsequent assay need not repeat the prior assay since the identity or characteristic acquired from the prior assay can be tracked by virtue of the identity of the unique identifier label. In some configurations, both assays are carried out in association with the same unique identifier label. In other configurations, one assay occurs in association with a first unique identifier (e.g. a first unique identifier label or first unique address) and the other assay occurs in association with a second unique identifier (e.g. a second unique identifier label or unique address). Tracking the transfer of the protein or peptide from a first unique identifier to a second unique identifier serves as a nexus for associating the results of the two assays with a particular protein.

In multiplex formats having a plurality of proteins or peptides, each protein or peptide can be associated with a unique identifier label that is resolvable from unique identifier labels associated with the other proteins or peptides in the plurality. A unique identifier label can be encoded by detectable characteristic that can be distinguished from other labels or other components that are known or suspected of being present during a detection step. A particularly useful unique identifier label is a nucleic acid molecule having a unique nucleotide sequence. An unknown protein can be subjected to a first assay, and the resulting identification or characterization can be correlated to a unique sequence that is associated with the unknown protein. Subsequent assay of the protein or peptide fragments can be carried out and the unique identifier label, or a derivative of the label, can be decoded. The identity or characteristic(s) observed across multiple assays can be correlated with a given protein or peptide based on observation of the unique identifier label being associated with the protein or its peptide fragments across the assays.

In some configurations of the methods, compositions and apparatus set forth herein, a particular unique identifier can be physically associated with a protein, or peptide fragment of the protein, for two or more processes. Alternatively, a protein, or peptide fragment of the protein, can be physically associated with different unique identifiers; however, one of the unique identifiers can be encoded with information derived from another of the unique identifiers. For example, the identity or characteristic(s) observed across multiple assays can be correlated with a given protein or peptide based on observation of a unique identifier label in one assay and a derivative of the label in a second assay. Derivatives of unique identifier labels can be copies of the labels that include the encoded information or a translation thereof, fragments of the labels that include the encoded information or a translation thereof, chemically modified products of the labels that include the encoded information or a translation thereof, or the like.

Nucleic acid labels are particularly useful as unique identifiers since the encoded sequences can be copied, amplified or modified in predictable ways. For example, an encoded sequence that is associated with an identified protein can be copied to create an encoded sequence complement that is associated with a peptide fragment of the protein. Based on known rules of nucleic acid complementarity, the encoded sequence and its complement can be effectively considered as the same sequences for encoding purposes, unless distinction of the complementary strands is desired. Nucleic acids can also be modified to include extensions or insertions of new sequences via action of polymerases, ligases, transposases or other nucleic acid enzymes. The added sequences can encode information regarding manipulations carried out for the protein or peptide, for example, encoding a history of use for the protein or peptide.

Unique sequences of nucleic acids can be readily detected and resolved using known molecular biology techniques such as hybridization of the unique identifier nucleic acid to a complementary nucleic acid probe, sequencing the unique identifier nucleic acid (e.g. using Sanger sequencing or next generation sequencing), detecting the unique identifier nucleic acid using real-time polymerase chain reaction (PCR) or quantitative PCR, or sequence-specific modification of the unique identifier nucleic acid such as via cleavage, insertion, extension or the like. Such methods can be carried out in highly multiplexed formats if desired. For example, probe hybridization can occur in a nucleic acid array. Exemplary arrays and nucleic acid detection assays that can be useful include, without limitation, those commercialized for a BeadChip™ Array available from ILLUMINA®, Inc. (San Diego, Calif.) or arrays such as those described in U.S. Pat. Nos. 6,266,459; 6,355,431; 6,770,441; 6,859,570; or 7,622,294; or PCT Publication No. WO 00/63437, each of which is incorporated herein by reference. Further examples include arrays and assays commercialized by Affymetrix under the GeneChip™ tradename (now marketed by THERMOFISHER®, Waltham, MA), arrays and assays commercialized by AMERSHAM BIOSCIENCES® under the CodeLink™ tradename, arrays and assays commercialized by AGILENT® under the SurePrint™ tradename. Arrays can be programmed to include nucleic acid probes that are complementary to unique identifiers and the arrays can be used to capture proteins or peptides that are attached to the unique identifiers. Nucleic acids can be sequenced, for example, using cyclical reversible terminator (CRT) sequencing technologies such as those that have been commercialized by ILLUMINA®. (e.g. HiSeq™, MiSeq™, NextSeq™, iSeq™ or NovaSeq™ platforms), sequencing by ligation technologies such as those commercialized by Life Technologies™ (e.g. ABI PRISM™, or SOLID™ platforms), real-time prime extension and detection sequencing techniques such as those commercialized by PACIFIC BIOSCIENCES® (e.g. Sequel™ or RS II™ systems), or nanopore sequencing techniques such as those commercialized by OXFORD NANOPORE® (e.g. MinION™, GridION™ or PromethION™).

In some configurations, nucleic acids that serve as unique identifier labels can be detected in the presence of the proteins or peptides to which they are associated. For example, a unique identifier nucleic acid can be detected by probe hybridization or nucleic acid sequencing at a protein address or peptide address where a protein assay is also performed. Alternatively, the nucleic acids can be separated from the proteins or peptides and detected in isolation from the proteins or peptides.

Nucleic acids provide useful unique identifier labels, but need not be used. Other types of unique identifier labels that can be used include, for example, polymers having distinguishable sequences of monomers such as polypeptides having distinguishable amino acid sequences, polysaccharides having distinguishable monosaccharide sequences, or synthetic polymers having distinguishable monomer sequences. Non-polymeric molecules can be useful as unique identifier label so long as they have distinguishable properties that can be encoded and decoded. For example, luminophores, dyes, radioactive isotopes, charge tags and other known signal producing molecules can be used. Unique identifier labels can be in the form of particles or beads that are encoded with detectable characteristics. For example, particles can be optically encoded with distinguishable luminescence excitation or emission, distinguishable diffraction gratings, or distinguishable images. Size and shape distinctions can also provide encodable characteristics. Unique identifier label can be encoded with other distinguishable characteristics such as luminescence lifetime, luminescence polarity, radiofrequency transmission, light absorption wavelength, magnetic properties, and other signal types. These and other unique identifier labels can be detected in the presence of the proteins or peptides to which they are associated. Alternatively, the unique identifier labels can be separated from the proteins or peptides and detected in isolation from the proteins or peptides.

For a plurality of proteins or peptides, each protein or peptide can be encoded by a unique identifier label that is unique compared to the unique identifier labels for the other proteins or peptides in the plurality. For example, each protein or peptide can be encoded by a nucleic acid tag having a nucleotide sequence that is unique compared to the sequences of the nucleic acid tags for the other proteins or peptides in the plurality. In some cases, a given protein or peptide in a plurality of proteins or peptides can be associated with an identifier label that is indistinguishable from identifier label(s) associated with one, some or all proteins or peptides in the plurality. For example, a plurality of peptide fragments of a protein can be associated with a unique identifier that is common to peptides derived from the protein. The unique identifier associated with the peptides derived from one protein can be unique compared to the unique identifier associated with peptides derived from other proteins. In another example, individual peptides derived from a given protein can be associated with different unique identifiers.

A unique identifier can be associated with a protein or peptide via physical attachment of the unique identifier to the protein or peptide, co-localization of the unique identifier with the protein or peptide, contemporaneous manipulation of the unique identifier with the protein or peptide, co-localized manipulation of the unique identifier with the protein or peptide, or the like. In some configurations, a unique identifier is associated with substantially all peptides derived from a protein. Alternatively, a first subset of (one or more) peptides derived from a particular protein is associated with a unique identifier and a second subset of (one or more) peptides derived from the particular protein is not associated with a unique identifier. The unique identifier can be attached to a protein or peptide via covalent or non-covalent (e.g. ionic bond, hydrogen bond, van der Waals forces etc.) bonding. Particularly useful chemistries include bioorthogonal chemistries which employ functional groups that are relatively inert to proteins and other components of biological systems, but react expediently with one another under conditions that are compatible with biological systems. Exemplary bioorthogonal chemistries are set forth in Patterson and Prescher, *Curr. Opin. Chem. Biol.* 28:141-149 (2014) and Nguyen and Prescher *Nature Reviews Chemistry* 4:476-489 (2020), each of which is incorporated herein by reference. For example, a click reaction can be used. A click reaction may utilize an aqueous solvent. Exemplary click reactions are set forth in WO 2019/195633A1; U.S. Pat. No. 11,203,612 and US Pat. App. Pub. No. 2022/0162684 A1, each of which is incorporated by reference. Exemplary click reactions may include metal-catalyzed azide-alkyne cycloaddition, strain-promoted azide-alkyne cycloaddition, strain-promoted azide-nitrone cycloaddition, strained alkene reactions, thiol-ene reaction, Diels-Alder reaction, inverse electron demand Diels-Alder reaction, [3+2] cycloaddition, [4+1] cycloaddition, nucleophilic substitution, dihydroxylation, thiol-yne reaction, photoclick, nitrone dipole cycloaddition, norbornene cycloaddition, oxanorbornadiene cycloaddition, tetrazine ligation, and tetrazole photoclick reactions. Exemplary functional groups that can be present on a substance that is to be linked to another may include alkenes, alkynes, azides, allenes, epoxides, amines, thiols, nitrones, isonitriles, isocyanides, aziridines, activated esters, and tetrazines. A receptor (e.g. (strept)avidin) that is attached to one molecule can be bound to a ligand (e.g. biotin) that is attached to a second molecule, thereby attaching the molecules to each other. Other chemistries that can be used to conjugate or attach a unique identifier to a protein, peptide or location include, for example, those set forth in US Pat. App. Pub. No. 2021/0101930 A1; U.S. Pat. No. 11,203,612 and US Pat. App. Pub. No. 2022/0162684 A1, each of which is incorporated herein by reference.

In some configurations of the methods, compositions or apparatus set forth herein, multiple different attachment chemistries are used for different components. Chemistries that are orthogonal to each other can be used to avoid unwanted cross-reactivity. For example, peptides can be attached to a peptide address using a chemistry that is mutually orthogonal with the chemistry used to attach a protein address to a protein from which the peptides are derived. Similarly, mutually orthogonal chemistries can be used to attach unique identifiers to proteins and peptides, respectively. Proteins or peptides can be attached to unique identifier labels using chemistry that is mutually orthogonal to chemistries used to attach the proteins or peptides to solid supports, such as addresses of an array. For example, azide-alkyne cycloadditions can be used in tandem with orthogonal chemistries such as hydrazine-ketone condensations, various inverse electron-demand Diels-Alder reagents, 1,3-dipoles and other reactive moieties. In some configurations, three-way orthogonality may be beneficial. For example, three-way orthogonality can be achieved using azide-containing components, cyclopropene-containing components and alkyne containing components. In another example, three-way orthogonality can deploy two tetrazines: one that is sterically encumbered and reacts selectively with a small isonitrile and a second that ligates trans-cyclooctene in a inverse electron-demand Diels-Alder cycloaddition. The tetrazine reactions are orthogonal with each other and with a reaction that uses an azide-strained-alkyne pair to achieve attachment.

In some configurations, polypeptide linkers can be used. Polypeptide linkers can be useful for attaching proteins or peptides to addresses, particles, beads, unique identifiers or other objects set forth herein. The diversity of amino acids available affords polypeptide linkers with a variety of properties. For example, a polypeptide linker can be composed of flexible residues like glycine and serine to allow a relatively high degree of freedom of movement between a protein or polypeptide and the object to which it is attached. Alternatively, relatively rigid amino acid residues such as proline can be used to reduce degrees of freedom for relative motion. Polypeptide linkers can be designed to lack one or more recognition sites for protease(s) that will be used to digest a protein in a method set forth herein. As such the polypeptide linker can remain attached after treatment with a particular protease. Optionally, a polypeptide linker can include a recognition site for a particular protease, thereby allowing the linker to be cleaved. The protease recognition site of a polypeptide linker that attaches a protein to another object can be selected to be cleaved by a protease that is used to digest the protein, thereby releasing peptides form the object upon digestion. Alternatively, the protease recognition site can provide orthogonal cleavage of the linker, by being recognized by a protease that is different from the protease(s) used to digest the protein.

The chemistries exemplified above in the context of attaching unique identifiers to proteins or peptides can be used to attach a unique identifier, protein or peptide to a solid support such as an address of an array. Attachment can be mediated by a linker such as a structured nucleic acid particle (SNAP) or bead. Attachment can be mediated by a coating such as polyethylene glycol or hydrogel.

A unique identifier can be exogenous to an associated protein, for example, being synthetically attached. Alternatively, a unique identifier can be endogenous to the analyte, for example, being attached or associated with the analyte in the native milieu of the analyte. Accordingly, a unique identifier can be a moiety of a protein. A unique identifier can be similarly attached to a solid support, particle or other object.

In particular configurations of the methods, compositions and apparatus herein, encoded information can be transferred from one unique identifier to another. For example, a protein can be identified using an assay performed at a first address and a peptide fragment of the protein can be transferred to a second address where a second assay is performed. A discrete transfer of the peptide from the first address to the second address creates a nexus whereby the identity of the protein, as encoded by the first address, can be associated with a characteristic determined for the peptide at the second address. A similar association of encoded information can occur for assays carried out to determine different characteristics for a protein and/or fragments of the protein.

Transfer of a peptide from a protein address to a peptide address can be achieved by juxtaposing the peptide address with the protein address. The juxtaposition can be temporary, for example, being initiated during or after digestion of the protein to produce the peptide. One or more peptides can be transported to one or more peptide addresses and attached to respective addresses using a chemistry or other technique set forth herein. See for example, FIG. 3A and Example II below. In some configurations, the peptides can be attached to nucleic acids and the peptide addresses can be attached to complementary nucleic acids such that hybridization of the sequences provides specificity of attachment. Once peptides have been transferred to peptide addresses, the peptide addresses can be separated from the protein address for subsequent assay or detection of the peptides at the addresses. Juxtaposition can be a feature of a given array, each protein address being juxtaposed with one or more peptide addresses in the array. For example, a protein address and one or more peptide addresses can be present in a well or other structure that limits or prevents diffusion of peptides to other addresses that are not juxtaposed with the protein address from which the peptide is derived. See for example, FIG. 3C and Example II below. Optionally, the well can be sealed, for example, with a wax, gel, membrane, or the like to prevent diffusion of peptides out of the well during transfer.

Transfer of a peptide from a protein address to a peptide address can be mediated by a particle such as a structured nucleic acid particle, dendrimer or bead. A peptide can be attached to a particle using attachment chemistries or other techniques (e.g. hybridization between complementary nucleic acid strands on the peptide and particle) set forth herein for attachment of proteins to solid supports or unique identifiers. The peptide-attached particle can be transferred to a peptide address and the particle can be attached to the address using similar chemistries or techniques. See for example, FIG. 3B and Example II below. Particularly useful particles are configured to attach only a single peptide, for example, having only a single attachment moiety or having capacity for no more than one peptide. The peptide addresses can in turn be configured to accommodate only a single particle. For example, the particle can be sized to sterically occlude more than one particle from occupying a given peptide address. Accordingly, a particle can mediate the transfer of individual peptide molecules to individual peptide addresses.

Transfer of a peptide from a protein address to a peptide address can be mediated by vesicle, droplet or other vessel. A peptide can be confined to such a vessel, transported to a peptide address and released. For example, a vesicle or droplet can be formed by mixing immiscible liquids at, or in proximity to, a protein address where a peptide is present such that the peptide becomes encapsulated in the vesicle or droplet. The droplet or vesicle can be transported to a peptide address where it can be disrupted such that the peptide is released for subsequent attachment to the peptide address. In some configurations, a peptide can be attached to a particle and the particle-attached peptide can be enclosed in a droplet or vesicle for transfer. Exemplary methods for making, transporting and disrupting droplets and vesicles are set forth in U.S. Pat. Nos. 10,809,254; 7,901,947; 7,569,129; or 10,227,648; US Pat. Pub. No. 2012/0211084 A1; or Weizmann et al. *Nature Methods* 3:545-550 (2006); Bransky et al., *Lab on a Chip,* 9:516-520 (2009); or Demirci and Montesano, *Lab on a Chip,* 7, 1139-1145 (2007), each of which is incorporated herein by reference.

Encoded information can be transferred between a physical location and a unique identifier label. For example, an unknown protein can be subjected to a first assay at a location, a unique identifier label that is associated with the location can be identified, a peptide fragment of the unknown protein and an associated unique identifier label can be removed from the location, the label-associated peptide fragment can be subjected to a second assay, and the associated unique identifier label can be identified in connection with the peptide fragment in the second assay. In this example, observation of the unique identifier label in association with the first assay and in association with the second assay provides a nexus for attributing a characteristic observed for the peptide in the second assay to the protein identified in the first assay. A similar transfer of encoded information can occur for assays carried out to determine different characteristics for a protein and/or fragment of the protein.

Encoded information can be transferred from a first unique identifier label to a second unique identifier label. For example, an unknown protein can be subjected to a first assay in association with a first unique identifier label, the first unique identifier label can be identified in association with the first assay, a peptide fragment of the unknown protein and a derivative of the unique identifier label can be removed from the location, the peptide fragment can be subjected to a second assay, and the derivative identifier label can be identified in connection with the peptide fragment in the second assay. The derivative of the unique identifier can be produced by a method that creates a nexus between the information encoded in the unique identifier from which it was derived. For example, a nucleic acid tag can be copied to produce a nucleic acid having a complementary sequence, and the known rules of nucleic acid complementarity can serve as a nexus. As such, a characteristic observed for the peptide in the second assay can be attributed to the protein identified in the first assay. A similar transfer of encoded information can occur for assays carried out to determine different characteristics for a protein and/or peptide fragments of the protein.

The present disclosure provides compositions, apparatus and methods for detecting one or more proteins. The detected protein(s) can be identified or characterized, for example, with respect to identifying one or more proteoforms of the protein(s). Accordingly, the compositions, apparatus and methods set forth herein in the context of detecting or manipulating protein(s) can be applied to detecting or manipulating one or more proteoforms. Moreover, the examples set forth herein for detecting, identifying, or characterizing proteins can be extended to peptide fragments or other protein derivatives.

A protein can be detected using one or more affinity agents having binding affinity for the protein. The affinity agent and the protein can bind each other to form a complex and, during or after formation, the complex can be detected. The complex can be detected directly, for example, due to a label that is present on the affinity agent or protein. In some configurations, the complex need not be directly detected, for example, in formats where the complex is formed and then the affinity agent, protein, or a label component that was present in the complex is detected.

Many protein detection methods, such as enzyme linked immunosorbent assay (ELISA), can achieve high-confidence characterization of one or more proteins or proteoforms in a sample by exploiting high specificity binding of antibodies, aptamers or other binding agents to the protein(s) or proteoforms(s) and detecting the binding event while ignoring all other proteins or proteoforms in the sample. ELISA is generally carried out at low plex scale (e.g. from one to a hundred different proteins detected in parallel or in succession) but can be used at higher plex. ELISA methods can be carried out by detecting immobilized binding agents and/or proteins in multiwell plates, on arrays, or on particles in microfluidic devices. Exemplary plate-based methods include, for example, the MULTI-ARRAY technology commercialized by MESOSCALE DIAGNOSTICS® (Rockville, Maryland) or SIMPLE PLEX™ technology commercialized by PROTEIN SIMPLE® (San Jose, CA). Exemplary, array-based methods include, but are not limited to those utilizing Simoa® Planar Array Technology or Simoa® Bead Technology, commercialized by QUANTERIX® (Billerica, MA). Further exemplary array-based methods are set forth in U.S. Pat. Nos. 9,678,068; 9,395,359; 8,415,171; 8,236,574; or 8,222,047, each of which is incorporated herein by reference. Exemplary microfluidic detection methods include those commercialized by LUMINEX® (Austin, Texas) under the trade name xMAP® technology or used on platforms identified as MAGPIX®, LUMINEX® 100/200 or FEXMAP 3D®.

Other detection methods that can also be used, for example at low plex scale, include procedures that employ SOMAmer reagents and SOMAscan assays commercialized by SOMA LOGIC® (Boulder, CO). In one configuration, a sample is contacted with aptamers that are capable of binding proteins with high specificity for the amino acid sequence of the proteins. Optionally, aptamers having high specificity for post translational modifications can be used. The resulting aptamer-protein complexes can be detected. For example, the complexes can be separated from other sample components, for example, by attaching the complexes to beads (or other solid support) that are separated from other sample components. Aptamers can be detected using any of a variety of methods known in the art for detecting nucleic acids, including for example, detection of a label attached to the aptamer, detection of hybridization to nucleic acid arrays, PCR-based detection, or nucleic acid sequencing. Exemplary methods and compositions are set forth in U.S. Pat. Nos. 7,855,054; 7,964,356; 8,404,830; 8,945,830; 8,975,026; 8,975,388; 9,163,056; 9,938,314; 9,404,919; 9,926,566; 10,221,421; 10,239,908; 10,316,321 10,221,207 or 10,392,621, each of which is incorporated herein by reference.

In particular configurations, individual measurements performed in a protein detection assay may not, by themselves, be sufficiently accurate or specific to provide an unambiguous identification or characterization, but an aggregation of the multiple non-identical measurements can provide accuracy, specificity and confidence. For example, the multiple separate measurements can include subjecting the sample to reagents that are promiscuous with regard to recognizing multiple proteins (or multiple proteoforms of a protein) in the sample. Accordingly, a first measurement carried out using a first promiscuous reagent may perceive a first subset of proteins without distinguishing one protein (or proteoforms) from another. A second measurement carried out using a second promiscuous reagent may perceive a second subset of proteins (or proteoforms), again, without distinguishing one protein (or proteoform) from another. However, a comparison of the first and second measurements can distinguish: (i) a protein (or proteoform) that is uniquely present in the first subset but not the second; (ii) a protein (or proteoform) that is uniquely present in the second subset but not the first; (iii) a protein (or proteoform) that is uniquely present in both the first and second subsets; or (iv) a protein (or proteoform) that is uniquely absent in the first and second subsets. The number of promiscuous reagents used, the number of separate measurements acquired, and degree of reagent promiscuity (e.g. the diversity of proteins or proteoforms recognized by the reagent) can be adjusted to suit the diversity expected for a particular sample.

In particular configurations, a protein can be detected using one or more affinity agents having known or measurable binding affinity for the protein. For example, an affinity agent can bind a protein to form a complex and a signal produced by the complex can be detected. A protein that is detected by binding to a known affinity agent can be identified based on the known or predicted binding characteristics of the affinity agent. For example, an affinity agent that is known to selectively bind a candidate protein (or proteoform) suspected of being in a sample, without substantially binding to other proteins (or proteoforms) in the sample, can be used to identify the candidate protein (or proteoform) in the sample merely by observing the binding event. This one-to-one correlation of affinity agent to candidate protein (or proteoform) can be used for identification of one or more proteins (or proteoforms). However, as the protein complexity (i.e. the number and variety of different proteins) in a sample increases, or as the number of different candidate proteins to be identified increases, the time and resources to produce a commensurate variety of affinity agents having one-to-one specificity for the proteins can approach limits of practicality. Similar limits can apply to the ability to identify or distinguish proteoforms, for example, in cases where a given protein can have a large number or variety of post-translational modifications.

Methods set forth herein, can be advantageously employed to overcome these limits. In particular configurations, the methods can be used to identify a number of different candidate proteins (or proteoforms) that exceeds the number of affinity agents used. For example, the number of candidate proteins (or proteoforms) identified can be at least 5×, 10×, 25×, 50×, 100× or more than the number of affinity agents used. This can be achieved, for example, by (1) using promiscuous affinity agents that bind to multiple different candidate proteins (or proteoforms) suspected of being present in a given sample, and (2) subjecting the protein sample to a set of promiscuous affinity agents that, taken as a whole, are expected to bind each protein (or proteoform) in a different combination, such that each protein (or proteoform) is expected to be encoded by a unique profile of binding and non-binding events. Promiscuity of an affinity agent is a characteristic that can be understood relative to a given population of proteins (or proteoforms). Promiscuity can arise due to the affinity agent recognizing an epitope that is known to be present in a population of different candidate proteins (or proteoforms), wherein the candidate proteins (or proteoforms) are suspected of being present in the given population. For example, epitopes having relatively short amino acid lengths such as dimers, trimers, tetramers, pentamers or hexamers can be expected to occur in a substantial number of different proteins in the human proteome. Alternatively or additionally, a promiscuous affinity agent can recognize different epitopes (i.e. having a variety of different structures), the different epitopes being present in a plurality of different candidate proteins. For example, a promiscuous affinity agent that is designed or selected for its affinity toward a first trimer epitope may bind to a second epitope that has a different sequence of amino acids when compared to the first epitope. Similar promiscuity can occur for affinity reagents that recognize particular post-translational modifications in a variety of amino acid contexts.

Although performing a single binding reaction between a promiscuous affinity agent and a complex protein sample may yield ambiguous results regarding the identity of the different proteins (or proteoforms) to which it binds, the ambiguity can be resolved when the results are combined with other identifying information about those proteins (or proteoforms). The identifying information can include characteristics such as length (i.e. number of amino acids), hydrophobicity, charge to mass ratio, isoelectric point, chromatographic fractionation behavior, enzymatic activity, presence or absence of post-translational modifications, location of post-translational modifications or the like. The identifying information can include results of binding with other promiscuous affinity agents. For example, a plurality of different promiscuous affinity agents can be contacted with a complex population of proteins, wherein the plurality is configured to produce a different binding profile for each candidate protein suspected of being present in the population. In this example, each of the affinity agents is distinguishable from the other affinity agents, for example, due to unique labeling (e.g. different affinity agents have different luminophore labels), unique spatial location (e.g. different affinity agents are located at different addresses in an array), and/or unique time of use (e.g. different affinity agents are delivered in series to a population of proteins). Accordingly, the plurality of promiscuous affinity agents produces a binding profile for each individual protein that can be decoded to identify a unique combination of epitopes present in the individual protein, and this can in turn be used to identify the individual protein as a particular candidate protein (or a particular candidate proteoform) having the same or similar unique combination of epitopes. The binding profile can include observed binding events as well as observed non-binding events and this information can be compared to the presence and absence of epitopes, respectively, in a given candidate protein (or a given candidate proteoform) to make a positive identification.

In some configurations, distinct and reproducible binding profiles may be observed for some or even a substantial majority of proteins (or proteoforms) that are to be identified in a sample. However, in many cases one or more binding events produces inconclusive or even aberrant results and this, in turn, can yield ambiguous binding profiles. For example, observation of binding outcome for a single-molecule binding event can be particularly prone to ambiguities due to stochasticity in the behavior of single molecules when observed using certain detection hardware. The present disclosure provides methods that provide accurate protein (or proteoform) identification despite, and in some aspects because of, ambiguities and imperfections that can arise in many contexts. In some configurations, methods for identifying, quantitating or otherwise characterizing one or more proteins (or proteoforms) in a sample utilize reference binding profiles for one or more candidate proteins (or proteoforms) that are suspected of being present in the sample. The reference binding profiles can include information regarding expected binding outcomes (e.g. binding or non-binding) for binding of one or more affinity agent with one or more candidate proteins (or proteoforms). The information can include an a priori characteristic of a candidate protein, such as presence or absence of a particular epitope in the candidate protein, presence or absence of a particular post-translational modification, location of a particular post-translational modification or length of the candidate protein. Alternatively or additionally, the information can include empirically determined characteristics such as propensity or likelihood that the candidate protein will bind to a particular affinity agent despite lacking an a priori recognizable epitope for the affinity agent. Accordingly, a reference binding profile can include information regarding the propensity or likelihood of a given candidate protein (or proteoform) to generate a false positive or false negative binding result in the presence of a particular affinity agent, and such information can optionally be included for a plurality of affinity agents.

Methods set forth herein can be used to evaluate the degree of compatibility of one or more empirical binding profiles with one or more reference binding profiles to identify or characterize one or more candidate proteins (or proteoforms) in a sample. For example, to identify a match, an empirical binding profile can be compared to reference binding profiles for many or all candidate proteins (or proteoforms) suspected of being in a given sample. In some configurations of the methods set forth herein, a match is determined based on the likelihood of the unknown protein (or proteoform) being a particular candidate protein (or proteoform) given the empirical binding pattern, or based on the probability of a particular candidate protein (or proteoform) generating the empirical binding pattern. Optionally a score can be determined from the measurements that are acquired for the unknown protein (or proteoform) with respect to many or all candidate proteins (or proteoforms) suspected of being in the sample. A digital or binary score that indicates one of two discrete states can be used. In particular configurations, the score can be non-digital or non-binary. For example, the score can be a value selected from a continuum of values such that an identity is made based on the score being above or below a threshold value. Moreover, a score can be a single value or a collection of values.

Methods, compositions and apparatus of the present disclosure can be advantageously deployed in a situation where proteins having identical primary structure and post-translational modification state generate different empirical binding profiles despite being subjected to the same set of affinity agents. For example, the methods, compositions and apparatus are well suited for single-molecule detection and other formats that are prone to stochastic variability. By evaluating the degree of compatibility of the empirical binding profiles with one or more reference binding profiles, the proteins (or proteoforms) can be identified as being identical to the same candidate protein (or proteoform). Accordingly, the present disclosure provides compositions, apparatus and methods that overcome ambiguities and errors in observed binding outcomes to provide binding profiles that are useful for accurate identification of proteins (or proteoforms). The methods can be advantageously deployed for complex samples including proteomes or subfractions thereof. Particular configurations of the methods, apparatus and compositions set forth herein can be made and used, for example, as set forth in Egertson et al., *BioRxiv* (2021), DOI: 10.1101/2021.10.11.463967; U.S. Pat. Nos. 10,473,654 or 11,282,585; or US Pat. App. Pub. Nos. 2020/0318101 A1 or 2020/0286584 A1, each of which is incorporated herein by reference. Exemplary methods, systems and compositions are set forth in further detail below.

The present disclosure provides a method for identifying or characterizing a candidate protein or proteoform in a sample. The method can include steps of (a) contacting a plurality of different affinity agents with a plurality of proteins in a sample; (b) determining empirical binding profiles for individual proteins of the plurality of proteins, wherein each of the empirical binding profiles comprise observed outcomes of binding or non-binding of the respective protein to the plurality of different affinity agents; (c) providing reference binding profiles for a plurality of candidate proteins; and (d) identifying a set of candidate proteins in the sample based on determining compatibility of the empirical binding profiles with the reference binding profiles. Optionally, a common candidate protein is identified from different empirical binding profiles for a plurality of candidate proteins in the set of candidate proteins. The reference binding profiles can be for a plurality of candidate proteoforms and used to identify a set of candidate proteoforms in sample.

In particular configurations, a method for identifying or characterizing a candidate protein or proteoform in a sample can include steps of (a) contacting a plurality of different affinity agents with a plurality of proteins in a sample, wherein the plurality of proteins comprises a subset of proteins having identical primary structures; (b) determining empirical binding profiles for individual proteins of the plurality of proteins, wherein each of the empirical binding profiles comprise observed outcomes of binding or non-binding of the respective protein to the plurality of different affinity agents, and wherein different empirical binding profiles are generated for the proteins in the subset despite the proteins in the subset having identical primary structures; (c) providing reference binding profiles for a plurality of candidate proteins; and (d) identifying a set of candidate proteins in the sample based on determining compatibility of the empirical binding profiles with the reference binding profiles, wherein the subset of proteins are identified to be the same candidate protein based on the degree of compatibility of a reference binding profile for the candidate protein with the different empirical binding profiles. The reference binding profiles can be for a plurality of candidate proteoforms and used to identify a set of candidate proteoforms in sample, wherein the subset of proteins are identified to be the same candidate proteoform based on the degree of compatibility of a reference binding profile for the candidate proteoform with the different empirical binding profiles.

Optionally, a method for identifying or characterizing a candidate protein or proteoform in a sample can include steps of (a) contacting a plurality of different affinity agents with a plurality of proteins in a sample; (b) providing reference binding profiles for a set of candidate proteins (or proteoforms), wherein the reference binding profile for each said candidate protein (or proteoform) comprises a plurality of the reference measurement outcomes for said candidate protein (or proteoforms), wherein each said reference measurement outcome comprises predicted outcome of binding or non-binding of said individual protein (or proteoform) with the plurality of different affinity agents; (c) acquiring an empirical measurement outcome for an individual protein (or proteoform) of the sample based on: (i) observation of binding or non-binding of the individual protein (or proteoform) with an individual affinity agent of the plurality of different affinity agents, and (ii) determination of compatibility between the observed outcome and the reference measurement outcomes for the plurality of different affinity agents, whereby the empirical measurement outcome comprises an observed outcome that is compatible with a reference measurement outcome; (d) repeating step (c) for a plurality of the individual affinity agents, thereby generating an empirical binding profile for the individual protein (or proteoform), the empirical binding profile comprising a plurality of empirical measurement outcomes for the individual protein (or proteoform); and (e) identifying a candidate protein (or proteoform) as being in the sample by determining an extent of compatibility between the plurality of empirical measurement outcomes for the individual protein (or proteoform) and the reference binding profiles for the set of candidate proteins (or proteoforms).

The present disclosure provides a method for locating proteins (or proteoforms) in an array. The method can include steps of (a) randomly attaching proteins (or proteoforms) to unique identifiers, thereby generating an array of different proteins (or proteoforms), wherein a unique identifier is attached to each said different protein (or proteoform); (b) contacting the array with a plurality of different affinity agents, whereby binding or non-binding of the affinity agents to the proteins (or proteoforms) produce signals associated with the unique identifiers; (c) determining empirical binding profiles from the signals associated with the unique identifiers, wherein each of the empirical binding profiles comprises observed outcomes of binding or non-binding of the respective protein (or proteoform) to the plurality of different affinity agents; (c) providing reference binding profiles for a plurality of candidate proteins (or proteoforms); and (d) identifying a candidate protein (or proteoform) attached to each of the unique identifiers based on determining compatibility of the empirical binding profiles with the reference binding profiles.

Any of a variety of affinity agents can be used in a composition, apparatus or method set forth herein. An affinity agent can be characterized, for example, prior to use in a method set forth herein, with respect to its binding properties. Exemplary binding properties that can be characterized include, but are not limited to, specificity, strength of binding; equilibrium binding constant (e.g. $K_A$ or $K_D$); binding rate constant, such as association rate constant ($k_{on}$) or dissociation rate constant ($k_{off}$); binding probability; or the like. Binding properties can be determined with regard to an epitope, a set of epitopes (e.g. a set of proteins having structural similarities), a protein, a set of proteins (e.g. a set of proteins having structural similarities), or a proteome.

An affinity agent can include a label. Exemplary labels include, without limitation, a fluorophore, luminophore, chromophore, nanoparticle (e.g., gold, silver, carbon nanotubes), heavy atom, radioactive isotope, mass label, charge label, spin label, receptor, ligand, nucleic acid barcode, polypeptide barcode, polysaccharide barcode, or the like. A label can produce any of a variety of detectable signals including, for example, an optical signal such as absorbance of radiation, luminescence (e.g. fluorescence or phosphorescence) emission, luminescence lifetime, luminescence polarization, or the like; Rayleigh and/or Mie scattering; magnetic properties; electrical properties; charge; mass; radioactivity or the like. A label component may produce a signal with a characteristic frequency, intensity, polarity, duration, wavelength, sequence, or fingerprint. A label need not directly produce a signal. For example, a label can bind to a receptor or ligand having a moiety that produces a characteristic signal. Such labels can include, for example, nucleic acids that are encoded with a particular nucleotide sequence, avidin, biotin, non-peptide ligands of known receptors, or the like. These and other labels can be used as unique identifier labels or as components for encoding unique identifier labels.

A method set forth herein can be carried out in a fluid phase or on a solid phase. For fluid phase configurations, a fluid containing one or more proteins can be mixed with another fluid containing one or more affinity agents. For solid phase configurations one or more proteins or affinity agents can be attached to a solid support. One or more components that will participate in a binding event can be contained in a fluid and the fluid can be delivered to a solid support, the solid support being attached to one or more other component that will participate in the binding event.

A method of the present disclosure can be carried out at single analyte resolution, wherein a single analyte (e.g. protein, peptide, proteoform, unique identifier, or affinity agent) is individually manipulated or distinguished from other analytes. A single analyte can be a single molecule (e.g. single protein), a single complex of two or more molecules (e.g. a single protein attached to a structured nucleic acid particle or a single protein attached to an affinity agent), a single particle, or the like. A single analyte may be resolved from other analytes based on, for example, spatial or temporal separation from the other analytes. Accordingly, an analyte can be detected at "single-analyte resolution," which is the detection of, or ability to detect, the analyte on an individual basis, for example, as distinguished from its nearest neighbor in an array. Reference herein to a 'single analyte' in the context of a composition, apparatus or method does not necessarily exclude application of the composition, apparatus or method to multiple single analytes that are manipulated or distinguished individually, unless indicated contextually or explicitly to the contrary.

Alternatively to single-analyte resolution, a method can be carried out at ensemble-resolution or bulk-resolution. Bulk-resolution configurations acquire a composite signal from a plurality of different analytes or affinity agents in a vessel or on a surface. For example, a composite signal can be acquired from a population of different protein-affinity agent complexes in a well or cuvette or on a solid support surface, such that individual complexes are not resolved from each other. Ensemble-resolution configurations acquire a composite signal from a first collection of proteins or affinity agents in a sample, such that the composite signal is distinguishable from signals generated by a second collection of proteins or affinity agents in the sample. For example, the ensembles can be located at different addresses in an array. Accordingly, the composite signal obtained from each address will be an average of signals from the ensemble, yet signals from different addresses can be distinguished from each other.

A composition, apparatus or method set forth herein can be configured to contact one or more proteins (e.g. an array of different proteins, wherein the proteins differ with regard to amino acid sequence and/or proteoform composition) with a plurality of different affinity agents. For example, a plurality of affinity agents (whether configured separately or as a pool) may comprise at least 2, 5, 10, 25, 50, 100, 250, 500 or more types of affinity agents, each type of affinity agent differing from the other types with respect to the epitope(s) recognized. Alternatively or additionally, a plurality of affinity agents may comprise at most 500, 250, 100, 50, 25, 10, 5, or 2 types of affinity agents, each type of affinity agent differing from the other types with respect to the epitope(s) recognized. Different types of affinity agents in a pool can be uniquely labeled such that the different types can be distinguished from each other. In some configurations, at least two, and up to all, of the different types of affinity agents in a pool may be indistinguishably labeled. Alternatively or additionally to the use of unique labels, different types of affinity agents can be delivered and detected serially when evaluating one or more proteins (e.g. in an array).

A method of the present disclosure can include a step of assaying binding between a protein and affinity agent to determine a measurement outcome. Binding can be detected using any of a variety of techniques that are appropriate to the assay components used. For example, binding can be detected by acquiring a signal from a label attached to an affinity agent when bound to an observed protein, acquiring a signal from a label attached to protein when bound to an observed affinity agent, or signal(s) from labels attached to an affinity agent and protein. In some configurations a protein-affinity agent complex need not be directly detected, for example, in formats where a nucleic acid tag or other moiety is created or modified as a result of binding between the protein and affinity agent. Optical detection techniques such as luminescent intensity detection, luminescence lifetime detection, luminescence polarization detection, or surface plasmon resonance detection can be useful. Other detection techniques include, but are not limited to, electronic detection such as techniques that utilize a field-effect transistor (FET), ion-sensitive FET, or chemically-sensitive FET. Exemplary methods are set forth in U.S. Pat. No. 10,473,654, which is incorporated herein by reference.

A method of the present disclosure can include a step of determining an empirical binding profile for a protein. The empirical binding profile can include observed outcomes of binding or non-binding of the protein to a plurality of different affinity agents. In a multiplex format, an empirical binding profile can be determined for each of the proteins of a plurality of proteins, wherein each of the empirical binding profiles comprise observed outcomes of binding or non-binding of the respective protein to a plurality of different affinity agents. The proteins in a multiplex format can differ from each other, for example, in terms of amino acid sequence and/or proteoform composition.

A reference binding profile can include a plurality of putative binding outcomes for a candidate protein (or proteoform). Reference profiles can be provided for a plurality of different candidate proteins (or proteoforms). The plurality of candidate proteins may comprise at least 10, 20, 30, 40, 50, 60, 70, 80, 90, 100, 200, 300, 400, 500, 600, 800, 1000, or more different candidate proteins. The candidate proteins can differ from each other, for example, in terms of amino acid sequence and/or proteoform composition. In some embodiments, one or more reference binding profiles can be stored in a database. Particularly useful information that can be included in a database or in a reference binding profile includes, for example, binding characteristics for binding of one or more affinity agents to a protein (or proteoform). For example, the information can include a binding probability of each of a plurality of affinity agents to each of a plurality of candidate proteins (or proteoforms). In some configurations, binding probabilities or other binding characteristics are derived empirically, for example, from binding experiments carried out between one or more known candidate proteins (or proteoforms) and known affinity agent(s). In some embodiments, binding probabilities or other binding characteristics are derived based on a priori information such as presence of a suspected epitope sequence in the structure (e.g. amino acid sequence) of a candidate protein, or presence of a suspected post-translational modification in a candidate proteoform. A reference binding profile for a candidate protein (or proteoform) can include a probability or likelihood that an empirical measurement of the candidate protein (or proteoform) would generate an observed measurement outcome. Additionally or alternatively, a reference binding profile for a candidate protein (or proteoform) can include a probability that an empirical measurement of the candidate protein (or proteoform) would not generate an observed measurement outcome.

A reference binding profile can be used in a method, composition or apparatus of the present disclosure. For example, one or more candidate protein (or proteoform) can be identified in a sample by evaluating the degree of compatibility of an empirical binding profile for each candidate protein (or proteoform) with one or more reference binding profiles. An empirical binding profile for an unknown protein (or proteoform) can be compared to reference binding profiles for many or all candidate proteins (or proteoforms) suspected of being in a given sample, and the results of the comparison can be used to identify a candidate protein (or proteoform) that is a match. In accordance with the present methods, the identity for a particular unknown protein (or proteoform) can be determined based on the likelihood of every candidate protein (or proteoform) being the unknown protein (or proteoform). The likelihood of a given candidate protein (or proteoform) being the unknown protein (or proteoform) can be determined based on the probability of each affinity agent binding to the given candidate protein (or proteoform).

In some configurations of the methods set forth herein, the empirical binding profile for an unknown protein (or proteoform) is assigned a score indicating the likelihood of the unknown protein (or proteoform) being a particular candidate protein (or proteoform) given the empirical binding profile, and/or the score can indicate the probability of a particular candidate protein (or proteoform) generating the empirical binding profile. Optionally, a score can be determined for the unknown protein (or proteoform) with respect to many or all candidate proteins (or proteoform) suspected of being in the sample. The scores can be combined, the proportion of the total score contributed by the top matching score can be determined, and the proportion can be compared to a threshold value to determine whether an identification will be made.

A particularly useful score for evaluating degree of compatibility of a binding profile to a candidate protein (or proteoform) is a proportion. For example, an empirical binding profile can be compared to individual reference binding profiles expected for a set of candidate proteins (or proteoforms), each comparison can be given a numerical score indicating goodness of fit, the scores can be summed, and the score for the best fit comparison can be divided by the sum to derive a proportion of the score contributed by the top match. A threshold can be applied to filter out incorrect identifications. By way of more specific example, each binding profile comparison can output a score between 0 and 1 (0 being lowest possible match and 1 being the highest possible match) indicating the likelihood of the detected protein being a particular candidate protein (or proteoform) given the observed binding profile (or the score can indicate the probability of the particular candidate protein, or proteoform, generating the observed binding profile), a score can be calculated from a comparison of the empirical binding profile to each candidate protein (or proteoform) suspected of being in an organism's proteome (e.g. a human proteome), and the threshold can be set at 0.9. As such, a given binding profile will only result in a candidate identification if exactly one protein matches well.

The scores that are used to identify a candidate protein (or proteoform) can be determined using a machine learning algorithm such as deep learning, statistical learning, supervised learning, unsupervised learning, clustering, expectation maximization, maximum likelihood estimation, Bayesian inference, linear regression, logistic regression, binary classification, multinomial classification, support vector machines (SVMs), neural networks, convolutional neural networks (CNNs), deep neural networks, cascading neural networks, k-Nearest Neighbor (k-NN) classification, random forests (RFs), classification and regression trees (CARTs) or pattern recognition algorithms. For example, the software may perform the one or more algorithms to analyze inputs such as (i) a priori binding characteristic of one or more affinity agents, (ii) empirically observed binding behavior of one or more affinity agents, (iii) putative binding outcomes or putative binding profiles for one or more candidate proteins (or proteoforms), (iv) presence or absence of particular epitopes in candidate proteins (or proteoforms), (v) characteristics of binding outcomes used to generate one or more binding profiles, (vi) information identifying a unique identifier (e.g. array address) for an empirically observed protein, and/or (vii) empirical binding outcomes or empirical binding profiles for one or more unknown proteins (or proteoform). Thus, the input to an algorithm of the present disclosure may include a database of information for one or more candidate proteins (or proteoform) and a set of empirical binding outcomes for one or more unknown proteins (or proteoforms). The output of the algorithm may include (i) a probability that a binding outcome or binding profile is observed given a hypothesized candidate protein (or proteoform) identity, (ii) the most probable identity, selected from the set of candidate proteins (or proteoforms), for an unknown protein (or proteoform), (iii) the probability of a candidate identification being correct given an observed empirical binding outcome or empirical binding profile, and/or (iv) a group of high-probability candidate protein (or proteoform) identities and an associated probability that an unknown protein (or proteoforms) is one of the proteins (or proteoforms) in the group. Exemplary algorithms, and methods that can be used for characterizing proteins and proteoforms, are set forth, for example in US Pat App. Pub. No. 2020/0286584 A1; U.S. Pat. Nos. 10,473,654 or 11,282,585; or Egertson et al., *BioRxiv* (2021), DOI: 10.1101/2021.10.11.463967, each of which is incorporated herein by reference.

Accordingly, a method set forth herein can include a step of identifying one or more candidate proteins (or proteoforms) in a sample based on determination of the compatibility of an empirical binding profile with one or more reference binding profiles for one or more candidate proteins (or proteoforms). The method can be further configured to provide a confidence level that each of one or more candidate proteins (or proteoforms) is present in the sample. Decoding protein (or proteoform) identity may be applied independently to each unknown protein in a sample, to generate a collection of candidate proteins (or proteoforms) identified in the sample. For example, the decoding approach may be applied independently to individual addresses of an array.

In some detection assays, a protein can be cyclically modified and the modified products from individual cycles can be detected. In some configurations, a protein can be sequenced by a sequential process in which each cycle includes steps of labeling and removing the amino terminal amino acid of a protein and detecting the label. Accordingly, a method of detecting a protein can include steps of (i) exposing a terminal amino acid on the protein; (ii) detecting a change in signal from the protein; and (iii) identifying the type of amino acid that was removed based on the change detected in step (ii). The terminal amino acid can be exposed, for example, by removal of one or more amino acids from the amino terminus or carboxyl terminus of the protein. Steps (i) through (iii) can be repeated to produce a series of signal changes that is indicative of the sequence for the protein.

In a first configuration of the above method, one or more types of amino acids in the protein can be attached to a label that uniquely identifies the type of amino acid. The amino acid type can be identified with regard to the structure of the amino acid with or without a post-translational modification. In this configuration, the change in signal that identifies the amino acid can be loss of signal from the respective label. Exemplary compositions and techniques that can be used to remove amino acids from a protein and detect signal changes are those set forth in Swaminathan et al., *Nature Biotech.* 36:1076-1082 (2018); or U.S. Pat. No. 9,625,469 or 10,545,153, each of which is incorporated herein by reference.

In a second configuration of the above method, the terminal amino acid of the protein can be recognized by an affinity agent that is specific for the terminal amino acid or specific for a label moiety that is present on the terminal amino acid. Affinity reagents that are specific for presence or absence of a particular post-translational modification are particularly useful. For example, an affinity reagent may detect presence or absence of a particular post-translational moiety independent of the amino acid to which it is attached or, alternatively, an affinity reagent may distinguish an amino acid that lacks a particular post-translational moiety from an amino acid that is of the same type but for the presence of the particular post-translational moiety. An affinity agent can be detected on an array, for example, due to a label on the affinity agent. Optionally, the label is a nucleic acid barcode sequence that is added to a primer nucleic acid upon formation of a complex. The formation of the complex and identity of the terminal amino acid can be determined by decoding the barcode sequence. Exemplary affinity agents and detection methods are set forth in US Pat. App. Pub. No. 2019/0145982 A1; 2020/0348308 A1; or 2020/0348307 A1, each of which is incorporated herein by reference.

Cyclical removal of terminal amino acids from a protein can be carried out using an Edman-type sequencing reaction in which a phenyl isothiocyanate reacts with a N-terminal amino group under mildly alkaline conditions (e.g. about pH 8) to form a cyclical phenylthiocarbamoyl Edman complex derivative. The phenyl isothiocyanate may be substituted or unsubstituted with one or more functional groups, linker groups, or linker groups containing functional groups. An Edman-type sequencing reaction can include variations to reagents and conditions that yield a detectable removal of amino acids from a protein terminus, thereby facilitating determination of the amino acid sequence for a protein or portion thereof. For example, the phenyl group can be replaced with at least one aromatic, heteroaromatic or aliphatic group which may participate in an Edman-type sequencing reaction, non-limiting examples including: pyridine, pyrimidine, pyrazine, pyridazoline, fused aromatic groups such as naphthalene and quinoline), methyl or other alkyl groups or alkyl group derivatives (e.g., alkenyl, alkynyl, cyclo-alkyl). Under certain conditions, for example, acidic conditions of about pH 2, derivatized terminal amino acids may be cleaved, for example, as a thiazolinone derivative. The thiazolinone amino acid derivative under acidic conditions may form a more stable phenylthiohydantoin (PTH) or similar amino acid derivative which can be detected. This procedure can be repeated iteratively for residual protein to identify the subsequent N-terminal amino acid. Many variations of Edman-type degradation have been described and may be used including, for example, a one-step removal of an N-terminal amino acid using alkaline conditions (Chang, J. Y., *FEBS LETTS.*, 1978, 91 (1), 63-68). In some cases, Edman-type reactions may be thwarted by N-terminal modifications which may be selectively removed, for example, N-terminal acetylation or formylation (e.g., see Gheorghe M. T., Bergman T. (1995) in *Methods in Protein Structure Analysis*, Chapter 8: Deacetylation and internal cleavage of Proteins for N-terminal Sequence Analysis. SPRINGER®, Boston, MA. doi.org/10.1007/978-1-4899-1031-8_8).

Non-limiting examples of functional groups for substituted phenyl isothiocyanate may include ligands (e.g. biotin and biotin analogs) for known receptors, labels such as luminophores, or reactive groups such as click functionalities (e.g. compositions having an azide or acetylene moiety). The functional group may be a DNA, RNA, peptide or small molecule barcode or other tag which may be further processed and/or detected.

The removal of an amino terminal amino acid using Edman-type processes can utilize at least two steps. The first step can include reacting an isothiocyanate or equivalent with protein N-terminal residues to form a relatively stable Edman complex, for example, a phenylthiocarbamoyl complex. The second step can include removing the derivatized N-terminal amino acid, for example, via heating. The protein, now having been shortened by one amino acid, may be detected, for example, by contacting the protein with a labeled affinity agent that is complementary to the amino terminus and examining the protein for binding to the agent, or by detecting loss of a label that was attached to the removed amino acid.

Edman-type processes can be carried out in a multiplex format to detect, characterize or identify a plurality of proteins (or proteoforms). A method of detecting a protein can include steps of (i) exposing a terminal amino acid on a protein at an address of an array; (ii) binding an affinity agent to the terminal amino acid, where the affinity agent comprises a nucleic acid tag, and where a primer nucleic acid is present at the address; (iii) extending the primer nucleic acid, thereby producing an extended primer having a copy of the tag; and (iv) detecting the tag of the extended primer. The terminal amino acid can be exposed, for example, by removal of one or more amino acids from the amino terminus or carboxyl terminus of the protein. Steps (i) through (iv) can be repeated to produce a series of tags that is indicative of the sequence for the protein. The method can be applied to a plurality of proteins on the array and in parallel. Whatever the plexity, the extending of the primer can be carried out, for example, by polymerase-based extension of the primer, using the nucleic acid tag as a template. Alternatively, the extending of the primer can be carried out, for example, by ligase- or chemical-based ligation of the primer to a nucleic acid that is hybridized to the nucleic acid tag. The nucleic acid tag can be detected via hybridization to nucleic acid probes (e.g. in an array), amplification-based detections (e.g. PCR-based detection, or rolling circle amplification-based detection) or nuclei acid sequencing (e.g. cyclical reversible terminator methods, nanopore methods, or single molecule, real time detection methods). Exemplary methods that can be used for detecting proteins using nucleic acid tags are set forth in US Pat. App. Pub. No. 2019/0145982 A1; 2020/0348308 A1; or 2020/0348307 A1, each of which is incorporated herein by reference. The methods set forth above and in the foregoing references can be deployed for characterizing or identifying proteoforms, for example, by using an affinity reagent that is specific for presence or absence of a particular post-translational modification. Optionally, an affinity reagent may be used to detect presence or absence of a particular post-translational moiety independent of the amino acid to which it is attached or, alternatively, an affinity reagent may distinguish an amino acid that lacks a particular post-translational moiety from an amino acid that is of the same type but for the presence of the particular post-translational moiety.

A protein (or proteoform) can optionally be detected, characterized or identified based on its enzymatic or biological activity. For example, a protein can be contacted with a reactant that is converted to a detectable product by an enzymatic activity of the protein. In other assay formats, a first protein having a known enzymatic function can be contacted with a second protein to determine if the second protein changes the enzymatic function of the first protein. As such, the first protein serves as a reporter system for detection of the second protein. Exemplary changes that can be observed include, but are not limited to, activation of the enzymatic function, inhibition of the enzymatic function, attenuation of the enzymatic function, degradation of the first protein or competition for a reactant or cofactor used by the first protein. Activity for different proteoforms can be distinguished based on the number, type or location of post-translational modifications in the protein. Proteins can also be detected based on their binding interactions with other molecules such as proteins, nucleic acids, nucleotides, metabolites, hormones, vitamins, small molecules that participate in biological signal transduction pathways, biological receptors or the like. For example, a protein that participates in a signal transduction pathway can be identified as a particular candidate protein by detecting binding to a second protein that is known to be a binding partner for the candidate protein in the pathway. Binding behavior for different proteoforms can be distinguished based on the number, type or location of post-translational modifications in the protein.

In some configurations of the apparatus and methods set forth herein, one or more proteins can be detected on a solid support. For example, protein(s) can be attached to a support, the support can be contacted with detection agents (e.g. affinity agents) in solution, the agents can interact with the protein(s), thereby producing a detectable signal, and then the signal can be detected to determine the presence of the protein(s). In multiplexed versions of this approach, different proteins (e.g. differing due to amino acid sequence and/or proteoform composition) can be attached to different addresses in an array, and the probing and detection steps can occur in parallel. In another example, affinity agents can be attached to a solid support, the support can be contacted with proteins in solution, the proteins can interact with the affinity agents, thereby producing a detectable signal, and then the signal can be detected to determine presence, quantity or characteristics of the proteins. This approach can also be multiplexed by attaching different affinity agents to different addresses of an array. Proteins, affinity agents or other objects of interest can be attached to a solid support using compositions and methods set forth herein, for example, in the context of binding agents using affinity agents. For example, proteins or peptides can be attached to unique nucleic acids which function as unique identifiers and which hybridize to complementary sequences at known locations of an array.

A protein can be detected based on proximity of two or more affinity agents. For example, the two affinity agents can include two components each: a receptor component and a nucleic acid component. When the affinity agents bind in proximity to each other, for example, due to ligands for the respective receptors being on a single protein, or due to the ligands being present on two proteins that associate with each other, the nucleic acids can interact to cause a modification that is indicative of the two ligands being in proximity. Optionally, the modification can be extension of one of the nucleic acids using the other nucleic acid as a template. As another option, one of the nucleic acids can form a template that acts as splint to position other nucleic acids for ligation to an oligonucleotide. Exemplary methods are commercialized by OLINE PROTEOMICS AB® (Uppsala Sweden) or set forth in U.S. Pat. Nos. 7,306,904; 7,351,528; 8,013,134; 8,268,554 or 9,777,315, each of which is incorporated herein by reference.

A method set forth herein for detecting a protein or peptide can be configured to characterize a post translational modification or other proteoform characteristic. In some configurations, a protein molecule is subjected to an assay that detectably distinguishes a post-translational moiety on the protein. For example, the protein molecule can be contacted with a binding agent that distinguishes presence and absence of a post-translational modification on the protein. In such configurations, one or more peptide molecules derived from digestion the protein can also be subjected to an assay that detectably distinguishes presence and absence of a post-translational moiety on the peptide(s). The protein and peptide molecules can be subjected to the same or different assays in such configurations. In an alternative configuration, one or more peptide molecules derived from a protein can be subjected to an assay that detectably distinguishes a post-translational moiety on the peptide molecule(s), wherein the protein molecule from which the peptide(s) are derived is not subjected to the assay. Optionally, in this configuration, the protein molecule may not be subjected to any reagents or conditions that detectably distinguishes a post-translational moiety on the protein molecule. As set forth herein, a unique identifier can be used in the exemplified configurations to correlate the presence or absence of a post-translational moiety detected on one or more peptide molecules with the presence or absence of the post-translational moiety on the protein from which the peptide(s) are derived.

In some configurations of the methods set forth herein, a protein is contacted with an affinity agent that recognizes epitopes that are known or suspected to be inert to one or more post-translational modification of interest. Thus, the protein can be identified independent of its proteoform state. For example, when evaluating phosphoryl modifications, a protein identification assay can use affinity reagents that do not include serine, threonine, tyrosine or other amino acids known to be susceptible to phosphorylation. One or more peptide fragments derived from the protein can be detected using affinity agents that distinguish presence and absence of a post-translational modification that is not distinguished in an assay used to identify the protein. Amino acid sequence motifs or specific protein locations likely to be post-translationally modified can be identified a priori using available resources such as the dbPTM, PhosphoSitePlus, or UniProt databases. A method for detecting proteins can be configured to characterize presence or absence of a post-translational moiety by employing a reagent that produces a detectable product in the presence of the moiety or based on a detectable characteristic of the moiety such as charge or mass.

A method for detecting proteins can be configured to characterize proteoforms, such as proteoforms that are distinguished by the presence or absence of a post-translational moiety set forth herein, by employing an affinity agent having characterized binding affinity for the moiety. In some configurations, the characterized binding affinity includes affinity for a particular post-translational moiety that is independent of sequence context. For example, a lectin having specificity for a particular carbohydrate can be used or an antibody that recognizes phosphotyrosine can be used. In some configurations, the characterized binding affinity includes binding affinity for a particular post-translational moiety that is dependent upon sequence context. For example, an antibody that binds a phosphorylated amino acid sequence motif can be used.

Discrepancies in binding measurements between assayed proteins (or peptides) and databases of expected binding characteristics for affinity agents used in the assay may provide information on the likelihood of a post-translational moiety. For example, the presence of a post-translational moiety can be determined if an affinity agent that is known to have a high frequency of binding to a candidate protein in a database does not bind the assayed protein or does not bind a peptide fragment of the protein. If a binding epitope were known for the affinity agent for which a binding discrepancy existed, the location of the post-translational moiety may be localized to, at or near the affinity reagent's epitope. A database of binding characteristics may be derived from previous experiments in which protein or peptide candidate sequences were confidently assigned to unknown proteins or peptides.

In some configurations, proteoforms can be characterized by performing a protein detection method set forth herein (or known in the art) both before and after treatment of a protein or peptide with a reagent or condition that removes a particular post-translational moiety. The protein detection method can be configured to employ reagents or conditions that distinguish presence and absence of particular post-translational moieties. Enzymes known to remove post-translational moieties can be particularly useful in such configurations. For example, binding measurements may be acquired prior to treatment of a phosphorylated protein or peptide with a phosphatase enzyme, and then repeated after treatment with the phosphatase enzyme. Chemical reagents known to remove or modify post-translational moieties can be used. For example, phosphoryl moieties can be removed from phosphoserine and phosphothreonine using alkali-induced chemical dephosphorylation (beta-elimination reaction). Acid treatment can be used to remove the phosphoryl moiety from phosphohistidine. By way of more specific example, a protein or peptide can be assayed using one or more affinity agents known to distinguishably bind a phosphorylated motif, the protein or peptide can then be treated with a phosphatase to remove the phosphoryl moiety followed by further assay with the one or more affinity agents. The presence of a phosphoryl moiety on the protein or peptide can be determined based on differential binding of the affinity agents before and after phosphatase treatment. An affinity agent that binds to a motif having a particular post-translational moiety (e.g. the phosphorylated motif) but not to the same motif when lacking the post-translational moiety (e.g. the non-phosphorylated motif) can be used.

In some configurations, proteoform characterization may include Edman-type sequencing steps, where the N-terminal regions may be assayed with proteoform-specific reagents. For example, a protein or peptide can be contacted with proteoform-specific affinity agents between one or more cycles of N-terminal residue removal by the Edman-type process. In some configurations, proteoform-specific affinity reagents may be used to form specific affinity complexes which include an Edman-type N-terminal complex (prior to N-terminal cleavage). Presence of a post-translational moiety can be determined based on observed binding of an Edman-type N-terminal complex to an affinity agent that is specific for the post-translational moiety. Optionally, the Edman-type N-terminal complex can then be treated to remove the post-translational moiety and the treated Edman-type N-terminal complex can be contacted with a proteoform-specific affinity reagent, such as a reagent used prior to removal of the moiety. Absence of binding between the treated Edman-type N-terminal complex and the proteoform-specific affinity reagent can be used to confirm the identity of the post-translational moiety identified from the binding assay carried out before the removal treatment. As an alternative or addition to using an affinity reagent that recognizes the post-translational moiety, the assay that is performed after the treatment to remove the moiety can be carried out using an affinity reagent that selectively recognizes an Edman-type N-terminal complex that lacks the moiety (i.e. the selectivity being relative to an Edman-type N-terminal complex that lacks the moiety).

In another exemplary configuration, a proteoform-specific affinity agent can be used to probe a protein or peptide between one or more cycles of N-terminal residue removal by the Edman-type process. For example, an affinity reagent that is specific for a particular post-translational moiety can be contacted with a protein or peptide to identify presence of the moiety. The location of a post-translational moiety in the protein or peptide can be determined based on the cycle when binding to the affinity agent is no longer observed.

A protein or peptide can be treated to remove a post-translational moiety using any of a variety of methods. Exemplary methods include, but are not limited to, treatment with an enzyme that catalyzes removal of the moiety; reaction with chemical reagents that remove the moiety or alter a detectable characteristic of the moiety; change in conditions such as pH, redox potential or temperature that remove the moiety or alter a detectable characteristic of the moiety, or the like. By way of more specific examples, a protein or peptide can be treated with a glycosidase enzyme or equivalent chemical reagents known to remove at least some post translational glycans. A protein or peptide can be treated with a reducing agent to reduce disulfide bonds within the polypeptide and subsequently treated with a chemical reagent, for example, an haloacetamide reagent (for example, iodoacetamide or any other known thiol capping group) which "caps" resulting free thiols residing on cysteine side chains. Proteins or peptides may be treated with phosphatases or pH changes to remove phosphoryl moieties. In some cases, proteins or peptides can be treated with a phosphatase that selectively removes phosphates from a particular type of amino acid or peptide motif without removing phosphates from another type of amino acid or peptide motif. Particularly useful phosphatases are tyrosine-specific phosphatases, serine/threonine-specific phosphatases, histidine-specific phosphatases and dual specificity phosphatases (e.g., tyrosine/serine/threonine-specific phosphatases).

A method or apparatus of the present disclosure can optionally be configured for optical detection (e.g. luminescence detection). Proteins, peptides, unique identifiers or other substances can be detected, and optionally distinguished from each other, based on measurable characteristics such as the wavelength of radiation that excites a luminophore, the wavelength of radiation emitted by a luminophore, the intensity of radiation emitted by a luminophore (e.g. at particular detection wavelength(s)), luminescence lifetime (e.g. the time that a luminophore remains in an excited state) or luminescence polarity. Other optical characteristics that can be detected, and optionally used to distinguish proteins or unique identifiers include, for example, absorbance of radiation, resonance Raman, radiation scattering, or the like. A luminophore can be an intrinsic moiety of a protein or unique identifier, or the luminophore can be an exogenous moiety that has been synthetically added to a protein or unique identifier.

A method or apparatus of the present disclosure can use a light sensing device. Particularly useful components of a light sensing device can include, but are not limited to, optical sub-systems or components used in nucleic acid sequencing systems. Examples of useful sub systems and components thereof are set forth in US Pat. App. Pub. No. 2010/0111768 A1 or U.S. Pat. Nos. 7,329,860; 8,951,781 or 9,193,996, each of which is incorporated herein by reference. Other useful light sensing devices and components thereof are described in U.S. Pat. Nos. 5,888,737; 6,175,002; 5,695,934; 6,140,489; or 5,863,722; or US Pat. Pub. Nos. 2007/007991 A1, 2009/0247414 A1, or 2010/0111768; or WO2007/123744, each of which is incorporated herein by reference. Light sensing devices and components that can be used to detect luminophores based on luminescence lifetime are described, for example, in U.S. Pat. Nos. 9,678,012; 9,921,157; 10,605,730; 10,712,274; 10,775,305; or 10,895,534, each of which is incorporated herein by reference.

Luminescence lifetime can be detected using an integrated circuit having a photodetection region configured to receive incident photons and produce a plurality of charge carriers in response to the incident photons. The integrated circuit can include at least one charge carrier storage region and a charge carrier segregation structure configured to selectively direct charge carriers of the plurality of charge carriers directly into the charge carrier storage region based upon times at which the charge carriers are produced. See, for example, U.S. Pat. Nos. 9,606,058, 10,775,305, and 10,845,308, each of which is incorporated herein by reference. Optical sources that produce short optical pulses can be used for luminescence lifetime measurements. For example, a light source, such as a semiconductor laser or LED, can be driven with a bipolar waveform to generate optical pulses with FWHM durations as short as approximately 85 ps having suppressed tail emission. See, for example, in U.S. Pat. No. 10,605,730, which is incorporated herein by reference.

For configurations that use optical detection (e.g. luminescent detection), one or more analytes (e.g. proteins, peptides or unique identifier labels) may be immobilized on a surface, and this surface may be scanned with a microscope to detect any signal from the immobilized analyte(s). The microscope itself may include a digital camera or other luminescence detector configured to record, store, and analyze the data collected during the scan. A luminescence detector of the present disclosure can be configured for epiluminescent detection, total internal reflection (TIR) detection, waveguide assisted excitation, or the like.

A light sensing device may be based upon any suitable technology, and may be, for example, a charged coupled device (CCD) sensor that generates pixilated image data based upon photons impacting locations in the device. It will be understood that any of a variety of other light sensing devices may also be used including, but not limited to, a detector array configured for time delay integration (TDI) operation, a complementary metal oxide semiconductor (CMOS) detector, an avalanche photodiode (APD) detector, a Geiger-mode photon counter, a photomultiplier tube (PMT), charge injection device (CID) sensors, JOT image sensor (Quanta), or any other suitable detector. Light sensing devices can optionally be coupled with one or more excitation sources, for example, lasers, light emitting diodes (LEDs), arc lamps or other energy sources known in the art.

An optical detection system can be configured for single molecule detection. For example, waveguides or optical confinements can be used to deliver excitation radiation to locations of a solid support where proteins or unique identifiers are located. Zero-mode waveguides can be particularly useful, examples of which are set forth in U.S. Pat. Nos. 7,181,122, 7,302,146, or 7,313,308, each of which is incorporated herein by reference. Proteins or unique identifiers can be confined to surface features, for example, to facilitate single molecule resolution. For example, the analytes can be distributed into wells having nanometer dimensions such as those set forth in U.S. Pat. No. 7,122,482 or 8,765,359, or US Pat. App. Pub. No 2013/0116153 A1, each of which is incorporated herein by reference. The wells can be configured for selective excitation, for example, as set forth in U.S. Pat. No. 8,798,414 or 9,347,829, each of which is incorporated herein by reference. Proteins or unique identifiers can be distributed to nanometer-scale posts, such as high aspect ratio posts which can optionally be dielectric pillars that extend through a metallic layer to improve detection of an analyte attached to the pillar. See, for example, U.S. Pat. Nos. 8,148,264, 9,410,887 or 9,987,609, each of which is incorporated herein by reference. Further examples of nanostructures that can be used to detect analytes are those that change state in response to the concentration of analytes such that the analytes can be quantitated as set forth in WO 2020/176793 A1, which is incorporated herein by reference.

An apparatus or method set forth herein need not be configured for optical detection. For example, an electronic detector can be used for detection of protons or charged labels (see, for example, US Pat. App. Pub. Nos. 2009/0026082 A1; 2009/0127589 A1; 2010/0137143 A1; or 2010/0282617 A1, each of which is incorporated herein by reference in its entirety). A field effect transistor (FET) can be used to detect proteins, peptides, affinity agents, unique identifiers or other analytes, for example, based on proximity of the FET to a field-disrupting moiety. The field-disrupting moiety can be an extrinsic label attached to a protein, peptide, affinity agent or unique identifier, or the moiety can be intrinsic to such species. Surface plasmon resonance can be used to detect binding at or near a surface. Exemplary sensors and methods for attaching molecules to sensors are set forth in US Pat. App. Pub. Nos. 2017/0240962 A1; 2018/0051316 A1; 2018/0112265 A1; 2018/0155773 A1 or 2018/0305727 A1; or U.S. Pat. Nos. 9,164,053; 9,829,456; 10,036,064, each of which is incorporated herein by reference.

In some configurations of the compositions, apparatus and methods set forth herein, one or more analytes (e.g. proteins, peptides or unique identifier labels) can be present on a solid support, where the analytes can optionally be detected. In multiplexed formats, different proteins can be attached to different unique identifiers (e.g. addresses in an array), and the proteins can be manipulated and detected in parallel. For example, a fluid containing one or more different affinity agents can be delivered to an array such that the proteins of the array are in simultaneous contact with the affinity agent(s). Moreover, a plurality of addresses can be observed in parallel allowing for rapid detection of binding events. A plurality of different proteins can have a complexity of at least 5, 10, 100, $1 \times 10^3$, $1 \times 10^4$, $2 \times 10^4$, $3 \times 10^4$ or more different native-length protein primary sequences. Alternatively or additionally, a plurality of different proteins that is analyzed in a method set forth herein can have a complexity that is at most $3 \times 10^4$, $2 \times 10^4$, $1 \times 10^4$, $1 \times 10^3$, 100, 10, 5 or fewer different native-length protein primary sequences.

A particularly useful multiplex format uses an array of proteins and/or affinity agents. A protein can be attached to an address or other unique identifier using any of a variety of means. The attachment can be covalent or non-covalent. Exemplary covalent attachments include chemical linkers such as those achieved using click chemistry or other linkages known in the art or described in US Pat. App. Pub. No. US 2021/0101930 A1, which is incorporated herein by reference. Non-covalent attachment can be mediated by receptor-ligand interactions (e.g. (strept) avidin-biotin, antibody-antigen, or complementary nucleic acid strands), for example, wherein the receptor is attached to the unique identifier and the ligand is attached to the protein or vice versa. In particular configurations, a protein is attached to a solid support (e.g. an address in an array) via a structured nucleic acid particle (SNAP). A protein can be attached to a SNAP and the SNAP can interact with a solid support, for example, by non-covalent interactions of the DNA with the support and/or via covalent linkage of the SNAP to the support. The non-covalent interactions can be generic to multiple nucleic acid sequences, for example, ionic interactions between the negatively charged phosphate backbone of nucleic acids and a positively charged surface of the solid support. Optionally, a positively charged cation, such as $Mg^{2+}$ or $Mn^{2+}$ or other divalent metal cation, can form a bridge between negatively charged phosphate backbone of nucleic acids and a negatively charged surface of the solid support. Alternatively, the non-covalent interactions can be sequence specific, for example, Watson-Crick base pairing between a sequence present in a SNAP and a complementary sequence attached to the solid support. Nucleic acid origami or nucleic acid nanoballs are particularly useful. The use of SNAPs and other moieties to attach proteins to unique identifiers such as labels or addresses in an array are set forth in US Pat. App. Pub. No. US 2021/0101930 A1 or U.S. patent application Ser. No. 17/692,035, each of which is incorporated herein by reference.

In multiplexed configurations, different proteins can be associated with a particular unique identifier (e.g. address in an array), and the proteins can be manipulated and detected in parallel. For example, a fluid containing one or more different affinity agents can be delivered to an array such that the proteins of the array are in simultaneous contact with the affinity agent(s). Moreover, a plurality of proteins can be observed in parallel allowing for rapid detection of binding events.

A method of the present disclosure can include a step of digesting a protein to form one or more peptide fragments of the protein. A protein can be digested using any of a variety of techniques including, but not limited to, treatment with a protease, chemical reagent, physical condition, or combination thereof. Proteases can digest a protein into smaller peptide fragments or amino acids by cleaving peptide bonds. Exopeptidases can be used to cleave the bond between a terminal amino acid to form a peptide fragment and amino acid. Optionally, an exopeptidase can be used to serially remove a plurality of amino acids to form a shorter peptide fragment. Endopeptidases can be used to cleave an internal protein bond to form two peptide fragments. Optionally, an endopeptidase or multiple different endopeptidases can be used to cleave a protein at several positions to form several peptide fragments of the protein.

A protease can be used based on known or predicted specificity for a particular amino acid sequence that it will recognize and cleave in a protein. Table I provides a list of proteases and their specificities (see the expasy.org website of the SWISS INSTITUTE OF BIOINFORMATICS™). The first column of the table includes the common name for each protease and the other columns indicate the amino acid composition the respective protease's recognition site. The nomenclature for the relative positions of residues in the protein recognition site is:

Pn—P4—P3—P2—P1-//-P1'—P2'—Pm, wherein Pn indicates the portion (variable length) of the protein that is on the amino side of the cleavage site; wherein Pm indicates the portion (variable length) of the protein that is on the carboxy side of the cleavage site; wherein P1, P2, P3, P4, P1' and P2' are positions for respective amino acid residues; wherein peptide bonds between position are indicated by a dash and wherein the cleavage site is indicated as "-//-". The amino acids that contribute to recognition are identified using the single amino acid code, the word "not" indicates amino acids that when present at the listed position will inhibit proteolysis, and a dash indicates a position that can have any amino acid residue.

TABLE I

| Enzyme name | P4 | P3 | P2 | P1 | P1' | P2' |
|---|---|---|---|---|---|---|
| Arg-C proteinase | — | — | — | R | — | — |
| Asp-N endopeptidase | — | — | — | — | D | — |
| BNPS-Skatole | — | — | — | W | — | — |
| Caspase 1 | F, W, Y, or L | — | H, A or T | D | not P, E, D, Q, K or R | — |
| Caspase 2 | D | V | A | D | not P, E, D, Q, K or R | — |
| Caspase 3 | D | M | Q | D | not P, E, D, Q, K or R | — |
| Caspase 4 | L | E | V | D | not P, E, D, Q, K or R | — |
| Caspase 5 | L or W | E | H | D | — | — |
| Caspase 6 | V | E | H or I | D | not P, E, D, Q, K or R | — |
| Caspase 7 | D | E | V | D | not P, E, D, Q, K or R | — |
| Caspase 8 | I or L | E | T | D | not P, E, D, Q, K or R | — |
| Caspase 9 | L | E | H | D | — | — |
| Caspase 10 | I | E | A | D | — | — |
| Chymotrypsin-high specificity (C-term to [FYW], not before P) | — | — | — | F or Y | not P | — |
| | — | — | — | W | not M or P | — |

TABLE I-continued

| Enzyme name | P4 | P3 | P2 | P1 | P1' | P2' |
|---|---|---|---|---|---|---|
| Chymotrypsin-low specificity (C-term to [FYWML], not before P) | — | — | — | F, L or Y | not P | — |
|  | — | — | — | W | not M or P | — |
|  | — | — | — | M | not P or Y | — |
|  | — | — | — | H | not D, M, P or W | — |
| Clostripain (Clostridiopeptidase B) | — | — | — | R | — | — |
| CNBr | — | — | — | M | — | — |
| Enterokinase | D or E | D or E | D or E | K | — | — |
| Factor Xa | A, F, G, I, L, T, V or M | D or E | G | R | — | — |
| Formic acid | — | — | — | D | — | — |
| Glutamyl endopeptidase | — | — | — | E | — | — |
| GranzymeB | I | E | P | D | — | — |
| Hydroxylamine | — | — | — | N | G | — |
| Iodosobenzoic acid | — | — | — | W | — | — |
| LysC | — | — | — | K | — | — |
| Neutrophil elastase | — | — | — | A or V | — | — |
| NTCB (2-nitro-5-thiocyanobenzoic acid) | — | — | — | — | C | — |
| Pepsin (pH 1.3) | — | not H, K, or R | not P | not R | F or L | not P |
|  | — | not H, K, or R | not P | F or L | — | not P |
| Pepsin (pH > 2) | — | not H, K, or R | not P | not R | F, L, W or Y | not P |
|  | — | not H, K or R | not P | F, L, W or Y | — | not P |
| Proline-endopeptidase | — | — | H, K or R | P | not P | — |
| Proteinase K | — | — | — | A, E, F, I, L, T, V, W or Y | — | — |
| Staphylococcal peptidase I | — | — | not E | E | — | — |
| Thermolysin | — | — | — | not D or E | A, F, I, L, M or V | — |
| Thrombin | — | — | G | R | G | — |
|  | A, F, G, I, L, T, V or M | A, F, G, I, L, T, V, W or A | P | R | not D or E | not DE |
| Trypsin | — | — | — | K or R | not P | — |
|  | — | — | W | K | P | — |
|  | — | — | M | R | P | — |

A protein can be digested using chemical reagents. For example, cyanogen bromide (CNBr) can be used to cleave at methionine (Met) residues; 2-(2-nitrophenyl)-3-methyl-3-bromoindolenine (BNPS-skatole) can cleave at tryptophan (Trp) residues; formic acid can cleave aspartic acid-proline (Asp-Pro) peptide bonds; hydroxylamine can cleave asparagine-glycine (Asn-Gly) peptide bonds, and 2-nitro-5-thiocyanobenzoic acid (NTCB) can cleave at cysteine (Cys) residues. Chemical reagents that are not highly site selective can also be used to randomly generate peptides including, for example, 6M HCl or reagents used in Edman-type degradation processes. Physical digestion of proteins can be achieved using physical shearing, UV light, or radicals generated from interaction of light with radical forming species such as titanium dioxide.

A combination of different digestion reagents and/or conditions can be used, for example, to influence the properties of the peptide fragments produced. For example, a plurality of proteases can be used to digest a protein. A plurality of proteases can be in simultaneous contact with a protein, for example, being delivered as a protease cocktail. Alternatively, a plurality of proteases can be delivered serially. For example, one or more peptide fragments produced from a first protease treatment can be separated from at least one other peptide fragment product of the first protease treatment, and at least one peptide fragment can be treated with a second protease while at least one other peptide fragment is protected from the second protease due to having been separated. A combination of protease(s), chemical reagent(s) and/or physical conditions can be used.

A method set forth herein can be configured to produce one or more peptides having a length of at least 10, 25, 50, 100, 150, 200, 250, 500 or more amino acids. Alternatively or additionally, a method set forth herein can be configured to produce one or more peptides having a length of at most 500, 250, 200, 150, 100, 50, 25, 10 or fewer amino acids.

A method set forth herein can be configured to produce at least 2, 3, 4, 5, 6, 7, 8, 9, 10, 15, 20, 25, 50 or more peptide fragments of a protein. Alternatively or additionally, a method set forth herein can be configured to produce at most 50, 25, 20, 15, 10, 9, 8, 7, 6, 5, 4, 3, or 2 peptide fragments of a protein.

A method of the present disclosure can be configured to digest a plurality of proteins, whereby one or more peptide fragments is produced from each protein of the plurality. In a multiplex configuration, a plurality of proteins can be in simultaneous contact with a fluid containing protease(s) such that the proteins are digested in parallel. Alternatively, a plurality of proteins can be individually and discretely contacted with protease(s).

In particular configurations of the methods, compositions or apparatus set forth herein, the association of a unique identifier to a protein, peptide or location (e.g. address of an array) can be inert to the active ingredients used for digesting a protein. For example, the association can be inert to a protease, chemical or physical manipulation set forth herein for use in digesting proteins or known in the art for digesting proteins. For example, linkers or attachment chemistries that lack peptide bonds can be used to attach a unique identifier with a protein, peptide or location. For example, a nucleic acid, such as a structured nucleic acid particle, can be used. Alternatively, a unique identifier can be attached to a protein, peptide or location via a peptide bond that is not susceptible to the digestion technique used. For example, digestion reagents can be used that do not recognize nor act on peptide moieties in a linker used to attach a unique identifier to a protein, peptide or location. By way of more specific example, a linker can omit one or more of the recognition sites set forth above for chemical or protease-catalyzed digestion of proteins.

Figure 6:
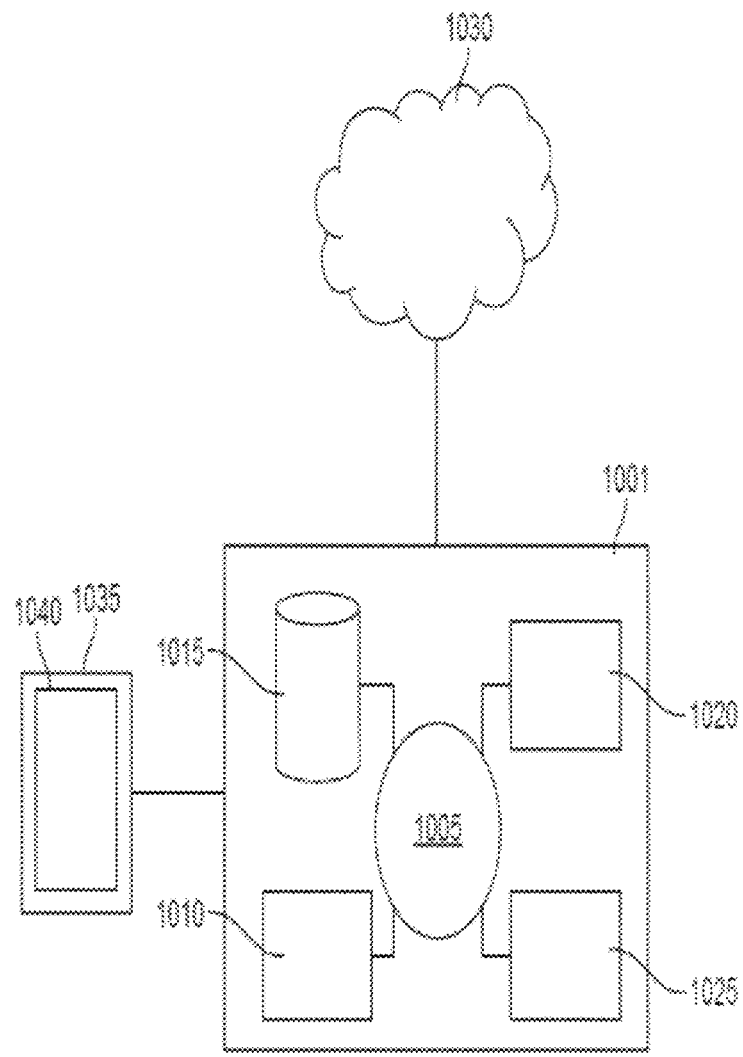
FIG. 6 shows a computer control system that is programmed or otherwise configured to implement a method set forth herein.

The present disclosure provides computer systems that are programmed to implement methods of the disclosure. FIG. 6 shows a computer system 1001 which is programmed or otherwise configured to, for example, detect proteins, peptides or unique identifiers; associate proteins, peptides or unique identifiers; identify proteins, peptides or unique identifiers; characterize proteins, peptides or unique identifiers; determine a nexus between a unique identifier and a proteins, peptide or other unique identifiers; perform an algorithm set forth herein or the like. The computer system 1001 can regulate various aspects of analysis, calculation, and generation of the present disclosure, such as, delivering proteins, peptides or unique identifiers to a reaction vessel or detecting proteins, peptides or unique identifiers. The computer system 1001 can be an electronic device of a user or a computer system that is remotely located with respect to the electronic device. The electronic device can be a mobile electronic device.

The computer system 1001 can include a central processing unit (CPU, also "processor" and "computer processor" herein) 1005, which can be a single core or multi core processor, or a plurality of processors for parallel processing. The computer system 1001 can also include memory or memory location 1010 (e.g., random-access memory, read-only memory, flash memory), electronic storage unit 1015 (e.g., hard disk), communication interface 1020 (e.g., network adapter) for communicating with one or more other systems, and peripheral devices 1025, such as cache, other memory, data storage and/or electronic display adapters. The memory 1010, storage unit 1015, interface 1020 and peripheral devices 1025 are in communication with the CPU 1005 through a communication bus (solid lines), such as a motherboard. The storage unit 1015 can be a data storage unit (or data repository) for storing data. The computer system 1001 can be operatively coupled to a computer network ("network") 1030 with the aid of the communication interface 1020. The network 1030 can be the Internet, an internet and/or extranet, or an intranet and/or extranet that is in communication with the Internet. The network 1030 in some embodiments, is a telecommunication and/or data network. The network 1030 can include one or more computer servers, which can enable distributed computing, such as cloud computing. For example, one or more computer servers may enable cloud computing over the network 1030 (e.g. the cloud) to perform various aspects of analysis, calculation, and generation of the present disclosure. Such cloud computing may be provided by cloud computing platforms such as, for example, AMAZON WEB SERVICES® (AWS), MICROSOFT AZURE®, GOOGLE CLOUD® PLATFORM, and IBM® cloud. The network 1030, in some embodiments, with the aid of the computer system 1001, can implement a peer-to-peer network, which may enable devices coupled to the computer system 1001 to behave as a client or a server.

The CPU 1005 can execute a sequence of machine-readable instructions, which can be embodied in a program or software. The instructions may be stored in a memory location, such as the memory 1010. The instructions can be directed to the CPU 1005, which can subsequently program or otherwise configure the CPU 1005 to implement methods of the present disclosure. Examples of operations performed by the CPU 1005 can include fetch, decode, execute, and writeback.

The CPU 1005 can be part of a circuit, such as an integrated circuit. One or more other components of the system 1001 can be included in the circuit. In some embodiments, the circuit is an application specific integrated circuit (ASIC).

The storage unit 1015 can store files, such as drivers, libraries and saved programs. The storage unit 1015 can store user data, e.g., user preferences and user programs. The computer system 1001 in some embodiments, can include one or more additional data storage units that are external to the computer system 1001, such as located on a remote server that is in communication with the computer system 1001 through an intranet or the Internet.

The computer system 1001 can communicate with one or more remote computer systems through the network 1030. For instance, the computer system 1001 can communicate with a remote computer system of a user (e.g., a physician, a nurse, a caretaker, a patient, or a subject). Examples of remote computer systems include personal computers (e.g., portable PC), slate or tablet PC's (e.g., Apple® iPad, Samsung® Galaxy Tab), telephones, Smart phones (e.g., Apple® iphone, Android®-enabled device, Blackberry®), or personal digital assistants. The user can access the computer system 1001 via the network 1030.

Methods as described herein can be implemented by way of machine (e.g., computer processor) executable code stored on an electronic storage location of the computer system 1001, such as, for example, on the memory 1010 or electronic storage unit 1015. The machine-executable or machine-readable code can be provided in the form of software. During use, the code can be executed by the processor 1005. In some embodiments, the code can be retrieved from the storage unit 1015 and stored on the memory 1010 for ready access by the processor 1005. In some situations, the electronic storage unit 1015 can be precluded, and machine-executable instructions are stored on memory 1010.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1001, can be embodied in programming. Various aspects of the technology may be thought of as "products" or "articles of manufacture" typically in the form of machine (or processor) executable code and/or associated data that is carried on or embodied in a type of machine-readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer-readable media may be involved in carrying one or more sequences of one or more instructions to a processor for execution.

The computer system 1001 can include or be in communication with an electronic display 1035 that comprises a user interface (UI) 1040 for providing, for example, video, image, or pixel information of an array of biological, chemical, or physical entities, and detected biological, chemical, or physical entities. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1005.

The present disclosure provides a non-transitory information-recording medium that has, encoded thereon, instructions for the execution of one or more steps of the methods set forth herein, for example, when these instructions are executed by an electronic computer in a non-abstract manner. This disclosure further provides a computer processor (i.e., not a human mind) configured to implement, in a non-abstract manner, one or more of the methods set forth herein. All methods, compositions, apparatus and systems set forth herein will be understood to be implementable in physical, tangible and non-abstract form. The claims are intended to encompass physical, tangible and non-abstract subject matter. Explicit limitation of any claim to physical, tangible and non-abstract subject matter will be understood to limit the claim to cover only non-abstract subject matter, when taken as a whole. As used herein, the term "non-abstract" is the converse of "abstract" as that term has been interpreted by controlling precedent of the U.S. Supreme Court and the Federal Circuit as of the priority date of this application.

Example I

Proteins Encoded by Locations and Peptides Encoded by Labels

A method for characterizing proteins can include steps of (a) detecting a plurality of proteins, wherein individual proteins of the plurality are located at unique protein addresses of an array, wherein the detecting distinguishes the identities of the individual proteins at the unique protein addresses; (b) digesting the proteins to form peptides, wherein the peptides are associated with a unique identifier label for a respective protein from a unique protein address of the array; (c) detecting the peptides and associated unique identifier labels, wherein the detecting distinguishes characteristics of individual peptides, and wherein the detecting distinguishes a unique identifier label associated with the individual peptides; and (d) correlating the characteristics detected in step (c) with individual proteins detected in step (a) based on the unique identifiers associated with the individual proteins and the peptides.

A method of the present disclosure can be configured to encode individual proteins with unique protein addresses in an array and to encode peptide fragments of the proteins with unique identifier labels. Information pertaining to the identity or characteristic(s) of a protein can be encoded by the protein address with which the protein is associated. Information that is encoded for a given protein by its associated protein address can be transferred to one or more unique identifier labels that are associated with one or more peptide fragments of the protein, respectively. In some configurations, the nexus between the information encoded by the protein address and the information encoded by the unique identifier label(s) is an association of the unique identifier label(s) with the address. The association of the unique identifier label(s) with the address can be observed or detected prior to separating the protein or peptide(s) from the address. Thus, information acquired from an assay performed at the address can be correlated with information acquired from an assay performed for the label-associated peptide(s). As such, characteristics attributed to the peptide(s) can be correlated with the protein identified or characterized at the address.

A unique identifier label can be associated with an array address via attachment, immobilization, confinement or other mechanisms set forth herein or known in the art. The association can be present prior to, during or after any of a variety of steps of a method set forth herein. For example, unique identifier labels can be immobilized at unique protein addresses prior to, during or after digesting proteins to form peptide fragments. Unique identifier labels can be immobilized at unique protein addresses prior to, during or after removing the peptide fragments from a protein address. In some cases, unique identifier labels can be immobilized at unique protein addresses prior to, during or after detecting proteins at protein addresses; or prior to, during or after associating proteins with the protein addresses (e.g. prior to attaching, immobilizing or confining the proteins at the protein addresses). A unique protein address of an array can be sealed to confine a unique identifier label along with a protein and/or peptide fragments of the protein. For example, the unique protein addresses can be configured as wells and the wells can be sealed by a substance that is immiscible with fluid in the wells. The immiscible substance can be a lipid layer (e.g. lipid bilayer), wax, hydrogel or oil that is immiscible with an aqueous fluid in the wells. Aqueous two-phase systems such as polyethylene glycol (PEG)-dextran systems or others employed in density gradient centrifugation can also be useful.

A method of the present disclosure can include a step of associating a unique identifier label with a protein, peptide and/or address prior to, during or after any of a variety of steps of a method set forth herein. For example, the associating step can be carried out prior to, during or after, a step of: (1) removing a peptide from a protein address, (2) digesting a protein, (3) detecting a protein at a protein address or (4) associating a protein with a protein address.

A unique identifier label can be associated with a protein via attachment to a surface of a unique protein address, attachment to the protein at the unique protein address, attachment to a linker that mediates attachment of the protein to the unique protein address, colocalization with the protein in a vessel or contemporary processing with the protein. Unique identifier label(s) can be attached to one or more regions of a protein that will be included in peptide fragments. As such, digesting the protein can form one or more peptide fragments that are each attached to a unique identifier label. Multiple peptide fragments of a protein can be attached to unique identifier labels that are unique for the protein (compared to other proteins). The unique identifier labels for some or all of the peptides from the protein can be indistinguishable from each other. Alternatively, the unique identifier labels for some or all of the peptides from the protein can be distinguishable, for example, such that each peptide is uniquely encoded compared to other peptides from the same protein.

A unique identifier label can be associated with a peptide via attachment to a surface of a unique protein address from which the peptide is produced or via attachment to a surface of a unique peptide address where the peptide is located. A unique identifier label can be associated with a peptide via attachment to the protein from which the peptide is produced. For example, the unique identifier label can be attached to the protein at the unique protein address. A unique identifier label can be associated with a peptide via attachment to a linker that mediates attachment of the protein to the unique protein address or via attachment to a linker that mediates attachment of the peptide to a unique peptide address.

Figure 2A:
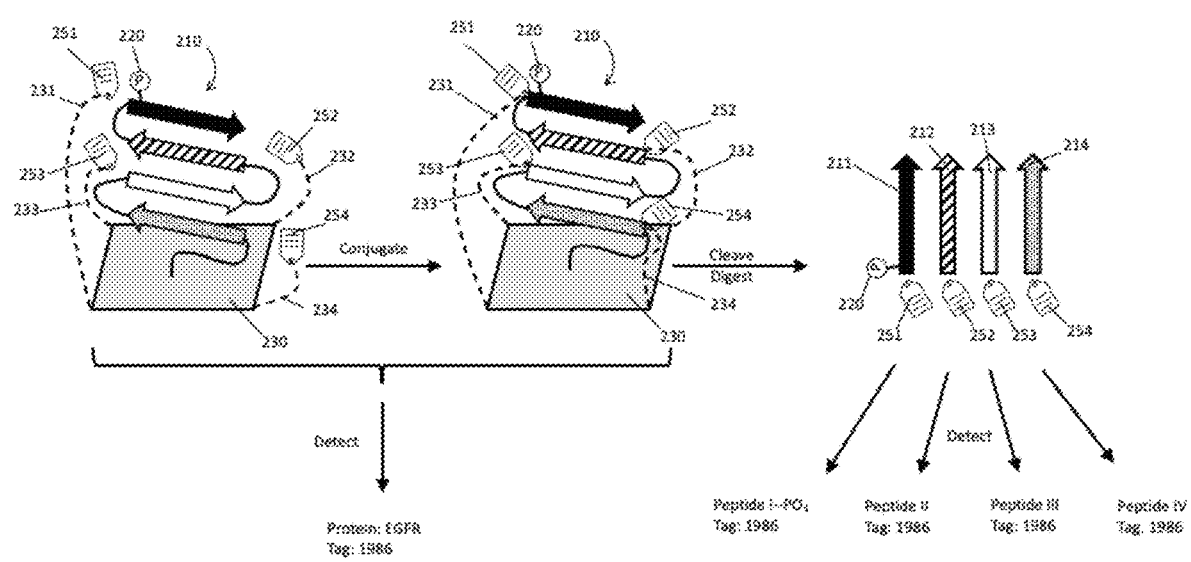
FIG. 2A shows a diagrammatic representation of processes carried out for a protein associated with a protein address and peptide fragments associated with unique identifiers.

FIG. 2A shows a diagrammatic representation of steps that can be used in a method for characterizing a protein. In this example a protein 210 is associated with a protein address 230 and with unique identifier labels 251 to 254. Protein 210 has a phosphoryl moiety 220. Protein 210 can be associated with address 230 using techniques set forth herein such as attachment to a surface of a solid support that forms part of the address or via attachment to a linker or particle (e.g. a structured nucleic acid particle) that is immobilized (e.g. via attachment or confinement) at address 230. The unique identifier labels 251 to 254 can optionally be attached at or near protein address 230 via linkers 231 to 234. For example, one or more of unique identifier labels 251 to 254 can be associated with address 230 via attachment to a surface of a solid support that forms part of the array or via attachment of a linker or particle (e.g. a structured nucleic acid particle) that links protein 210 to the address 230. Unique identifier labels 251 to 254 can be conjugated to protein 210 followed by digestion to form peptide fragments 211 to 214 of protein 210. The product of the conjugation reaction can be protein 210 tethered to protein address 230 via one or more of labels 251 to 254 and linkers 231 to 234 respectively, as shown in FIG. 2A. In an alternative configuration, the conjugation reaction can produce protein 210 attached to labels 251 to 254 without being tethered to protein address 230 via linkers 231 to 234. Accordingly, the conjugation reaction can occur before, during or after the cleavage reaction. Optionally, the conjugation reaction can occur before, during or after the digestion reaction. For configurations that utilize linkers 231 to 234, the linkers can be cleaved to separate peptide fragments 211 to 214 from address 230. The cleavage reaction can occur before or after the digestion reaction. The cleavage reaction can occur before or after the conjugation reaction. As with other configurations of the methods set forth herein cleavage to release a unique identifier label or digestion to create peptide fragments can occur at a protein address.

Protein 210 can be detected in association with address 230 and unique identifier labels 251 to 254 can also be detected in association with address 230. For example, the protein can be detected using a method set forth herein or known in the art for identifying the protein. Optionally, phosphoryl moiety 220 can be detected while the protein is at protein address 230. Encoded characteristics of the unique identifier labels 251 to 254 can be detected and decoded. In the example shown, protein 210 is identified as EGFR and the unique identifier labels are identified as tag number 1986. Protein 210 or unique identifier labels 251 to 254 can optionally be detected before the conjugation reaction, for example, if unique identifier labels 251 to 254 are associated (e.g. via attachment) with address 230. Alternatively or additionally, detection of protein 210 or unique identifier labels 251 to 254 can occur after the conjugation reaction. Detection of protein 210 and unique identifier labels 251 to 254 will typically be carried out before the completion of both the cleavage and digestion reactions. However, protein 210 can be detected after the cleavage reaction and before the digestion reaction. Alternatively, protein 210 can be digested to form peptide fragments 211 to 214 and peptide fragments 211 to 214 can be retained at address 230, for example, via linkers 231 to 234. The retained peptide fragments 211 to 214 can be detected, for example, using an assay set forth herein and the results can be used to identify protein 210 as EGFR. Similarly, unique identifier labels 251 to 254 can be detected after the cleavage reaction and before the digestion reaction; or unique identifier labels 251 to 254 can be detected after the digestion reaction and before the cleavage reaction.

Peptide fragments 211 to 214 and their associated unique identifier labels 251 to 254, respectively, can be detected in a second assay. For example, the second assay can be performed to identify a post translational modification such as presence of a phosphoryl moiety 220 as shown for peptide I (211). The presence of phosphorylation on peptide I (211) can be attributed to phosphorylation of EGFR due to protein 210 and peptide I (211) both being associated with the same unique identifier label, tag 1986 (251). The assay can also detect absence of phosphorylation for peptides II to IV (212 to 214), and this can be attributed to EGFR due to the peptides and protein 210 being associated with common tag 1986 (252 to 254). Optionally, an assay can be performed on peptides 211 to 214 to identify sufficient structural features (e.g. the primary amino acid sequence of the peptides) to locate the peptides in the structure of the EGFR protein. This information can be useful for locating the region of EGFR that is phosphorylated. If the phosphorylated amino acid can be identified from assay of the peptide fragments, then the phosphorylated amino acid in EGFR can be identified as well. Similarly, absence of detected phosphorylation in peptides II to IV (212 to 214) can indicate absence of phosphorylation in the respective regions of EGFR. Peptides 211 to 214 can be assayed in solution or on solid phase. Peptides 211 to 214 and respective unique identifier labels 252 to 254 can be attached to particles whether in solution or on solid phase. Each particle can be attached to a single peptide and its respective unique identifier, thereby facilitating resolution of one peptide from another. Particularly useful particles include, but are not limited to, structured nucleic acid particles.

For purposes of illustration, FIG. 2A shows a single address. Multiplex formats can be configured to include a plurality of addresses each associated with a different protein. In an optional multiplexed configuration, individual proteins of a plurality can be randomly located at the protein addresses of the array. As such, the identities of the individual proteins at the unique protein addresses may be unknown prior to performing an assay on the proteins. A method of characterizing a plurality of proteins can include a step of randomly distributing the plurality of proteins at the protein addresses of the array. The distribution step can be carried out prior to or during a detection assay. In some configurations, the proteins can be attached to probe nucleic acids that are complementary to nucleic acids at addresses of an array. The sequence of the nucleic acid(s) attached to each protein need not be known prior to the distribution step. Moreover, the addresses for the probe sequence need not be known prior to the distribution step. Rather, the nucleic acid sequences or array locations can be determined after the distribution step. The nucleic acid moieties of the proteins can serve as linkers that facilitate attachment of the proteins via hybridization and the locations of the proteins can be determined using methods set forth herein.

In an optional multiplexed configuration, proteins can be located at known protein addresses of the array. In this configuration, a detection assay need not be performed to identify the protein at each address. However, a detection assay can be carried out, for example, to confirm the identity of the protein at each address. An assay for determining another characteristic of the protein at each site, such as presence or absence of a post-translational modification, can be performed as an alternative or addition to a protein identification assay. A method of characterizing a plurality of proteins can include a step of distributing a plurality of proteins to known protein addresses, respectively. The distribution step can be carried out, for example, using inkjet technology, nanofluidics or other array manufacturing techniques known in the art. In another example, the proteins can be attached to nucleic acids, each protein being attached to one or more nucleic acids having a known sequence that hybridizes to one or more nucleic acids having known sequences at a known address of an array. The location for individual proteins can be determined based on the known sequence for the nucleic acid(s) that are attached to the proteins, the known location of the probe sequences in the array and known rules for nucleic acid complementarity.

Figure 2B:
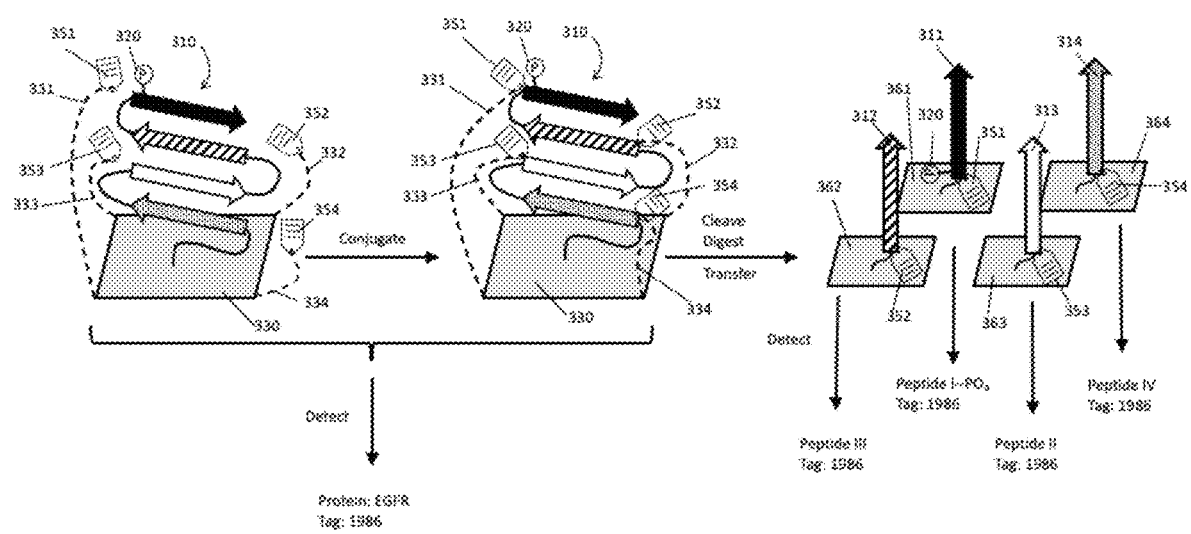
FIG. 2B shows a diagrammatic representation of processes carried out for a protein associated with a protein address and peptide fragments associated with unique identifiers, and including a step of transferring released peptides and associated unique identifier labels to unique peptide addresses.

Methods set forth in the context of this example and FIG. 2A or 2B can further include a step of releasing one or more peptides and their associated unique identifier labels, respectively, from a protein address. In a multiplex configuration such as an array of protein addresses, the peptides and associated unique identifier labels can be released from a plurality of the protein addresses to produce a mixture of different peptides and associated unique identifier labels. For example, the peptides or unique identifier labels can be retained at the protein addresses via an immobilization mechanism that can be disrupted using reagents or conditions that are common to a plurality of protein addresses. By way of further examples, the peptides or unique identifier labels can be attached to protein addresses via a scissile linkage that is cleaved via a reagent that is delivered to the array; the peptides or unique identifier labels can be attached to protein addresses via hybridization of nucleic acid strands that are denatured under similar treatments (e.g. treatment with heat above a melting temperature for the nucleic acid strands or treatment with a chemical denaturant); or the peptides or unique identifier labels can be immobilized to protein addresses via a temporary confinement (e.g. wax or lipid bilayer covering to a well) that is disrupted via a treatment of the array. Thus, the peptides and associated unique identifier labels can be manipulated or detected as a mixture or pool in downstream steps.

Peptides, unique identifier labels or both need not be removed from an array of protein address as a pool. Rather, the peptides or unique identifier labels can be selectively released from individual unique protein addresses to produce separated fractions. For example, the peptides or unique identifier labels can be retained at the protein addresses via immobilization mechanisms that can be disrupted using reagents or conditions that are unique to different addresses in the array. By way of further examples, the peptides or unique identifier labels can be attached to protein addresses via photolabile linkages that are photolyzed at different wavelengths of radiation; the peptides or unique identifier labels can be attached to protein addresses via hybridization of nucleic acid strands that are recognized and cleaved by different restriction endonuclease or other sequence specific nucleic acid enzymes; or the peptides or unique identifier labels can be selectively released by application of an electric field to the unique protein addresses individually. Peptides or unique identifier labels can be attached to array addresses via hybridization of nucleic acid strands having varying melting temperatures and selectively released by discrete application of heat to achieve the respective melting temperatures. Accordingly, one or more peptide fragments and associated unique identifier labels from a given protein or given address can be manipulated or detected separately from peptides or unique identifiers derived from other proteins or protein addresses.

Methods set forth in the context of this example can further include a step of transferring one or more of released peptides and associated unique identifier labels, respectively, to unique peptide addresses of an array. FIG. 2B shows a diagrammatic representation of a process that includes steps similar to those set forth above in the context of FIG. 2A and a further step of transferring released peptides 311 to 314 and associated unique identifier labels 351 to 354, respectively, to unique peptide addresses 361 to 364, respectively. Peptide fragments 311 to 314 and their associated unique identifier labels 351 to 354, respectively, can be detected in a second assay. For example, the second assay can be performed to identify a post translational modification such as presence of a phosphoryl moiety 320 as shown for peptide I (311). The presence of phosphorylation on peptide I (311) can be attributed to phosphorylation of EGFR due to protein 310 and peptide I (311) both being associated with the same unique identifier label, tag 1986 (351). The assay can also detect absence of phosphorylation for peptides II to IV (312 to 314), and this can be attributed to EGFR due to the peptides and protein 310 being associated with common tag 1986 (352 to 354). Optionally, an assay can be performed on peptides 311 to 314 to identify sufficient structural features (e.g. the primary amino acid sequence of the peptides) to locate the peptides in the structure of the EGFR protein. This information can be useful for locating the region of EGFR that is phosphorylated. If the phosphorylated amino acid can be identified from assay of the peptide fragments, then the phosphorylated amino acid in EGFR can be identified as well. Similarly, absence of detected phosphorylation in peptides II to IV (312 to 314) can indicate absence of phosphorylation in the respective regions of EGFR. An advantage of using unique peptide addresses 361 to 364 is that peptides 311 to 314 can be spatially resolved from each other. Similarly, each unique identifier label 351 to 354 can be resolved from the other unique identifier labels since they are associated (e.g. via immobilization, attachment or confinement) to discrete addresses.

Optionally, peptides and their respective unique identifier labels can be attached to particles or other linkers. A particle-attached or linker-attached peptide can be in solution, for example, when being detected, transported or otherwise manipulated. A particle or linker can mediate attachment of a peptide to a peptide address. For example, protein address 330 can be contacted with particles that attach to peptides 311-314 and unique identifier labels 351 to 354. An individual particle can have separate attachment points for the peptide and label to which it attaches. Alternatively, a peptide and label can be attached to each other such that creating a linkage between the particle and one of these moieties results in both moieties being attached to the particle. For example, a peptide moiety can be attached to a particle via a unique identifier label moiety. Alternatively, the unique identifier label moiety can be attached to the particle via a peptide moiety. Particle-attached peptides and labels can be transferred to peptide addresses 361-364. The particles can be nucleic acid origami particles having a single nucleotide moiety that attaches to a peptide or unique identifier label. As such, each particle will attach to no more than one of the peptides and its respective label. Peptide addresses 361-364 can be configured to have a surface area that accommodates only a single particle (i.e. a second particle is sterically excluded from binding to a peptide address once another particle is present). As such, each peptide address will attach to no more than a single particle. When the particles each have only a single peptide attached, the result is an array of peptide addresses configured for single-molecule detection of the peptides. Particles or other linkers can be used for manipulation and detection of peptides as set forth in Example II below.

Optionally, protein address 330 can be in the same array as peptide addresses 361 to 364. For example, an array can be configured to have a plurality of protein addresses, wherein each peptide address is in proximity to one or more peptide addresses. For example, peptide addresses can be arranged as satellites of a protein address in a configuration similar to that exemplified in FIG. 3C and set forth in Example II below. Optionally, a first protein address in an array can be closer to one or more peptide addresses than it is to some or all of the other protein addresses in the array. Peptides released from the first protein address under passive diffusion or non-directional diffusion are more likely to transfer to a peptide address that is proximal to the first protein address than to a peptide address that is more distal, for example, due to being proximal to a second protein address. As illustrated by this exemplary configuration, relative location of a peptide address to a protein address can be positively weighted when correlating the characteristics detected for a peptide at the peptide address with a protein identified at the protein address. As a further option, protein addresses of an array can be present in respective wells of the array and one or more peptide addresses can be located in each of the wells. The wells can function to prevent or retard diffusion of released peptides such that the peptides are preferentially transferred to peptide addresses in the same well as the protein address from which they were released. Other surface features that prevent or retard diffusion, such as ridges, channels or pillars, can be used to separate protein addresses (and their peptide addresses) from each other. High viscosity fluids (e.g. fluids having sucrose, polyethylene glycol, hydrogels or other diffusion retardants) can also be used. Alternatively, a protein address need not be located proximal to peptide addresses. Rather, a plurality of protein addresses can be located proximal to each other in one region of an array and a plurality of peptide addresses can be located proximal to each other. Accordingly, one or more protein addresses in an array can be closer to another protein address in the array than to any peptide address in the array.

Optionally, protein address 330 can be in a separate array from the array of peptide addresses 361 to 364. An advantage of this configuration is that some or all of the peptide addresses in a peptide array can be juxtaposed with one or more of the protein addresses in a protein array. The juxtaposition can be temporary, for example, to facilitate transfer of peptides from a protein address on a protein array to one or more peptide address on a peptide array prior to separating the arrays for detection. Alternatively, the addresses of the two arrays can remain juxtaposed after transfer, for example, during detection.

One or more peptides can be transferred from a protein address to another location, such as a peptide address, via passive diffusion or active transport. Active transport can be achieved, for example, using an electric field to move charged peptides, fluid flow from one location to another, magnetic attraction of paramagnetically labeled peptides or the like. Another means for moving peptides is to contact the peptides with beads or particles and transfer the peptide loaded beads or particles to another location. For example, the peptides can be captured at addresses of an array that are configured to bind to the beads or particles, such as an array of wells that fit one particle or bead per well.

In some configurations, the unique identifier labels can include nucleic acids encoded with unique sequences. The unique sequences can be detected to decode the identity or other characteristics of proteins or peptides with which the nucleic acids are associated. Multiple peptides can be associated with nucleic acids having a common sequence that encodes the identity or other characteristics of a protein from which the peptides were derived. Multiple peptides from the same protein can, additionally or alternatively, be encoded with sequences that are unique to the peptide. Encoded nucleic acids can have sequences that hybridize to complementary nucleic acids at peptide addresses. For example, peptides can be attached to nucleic acids, each peptide being attached to a nucleic acid having a known sequence that hybridizes to one or more nucleic acids having known sequences at a known peptide address of an array. The location for individual peptides can be determined based on the known sequence for the nucleic acid(s) that are attached to the peptides, the known location of complementary nucleic acid sequences in the peptide array and known rules for nucleic acid complementarity.

Methods set forth in the context of this example, FIG. 2A or FIG. 2B need not be limited to identification of a protein in the first assay nor to detection of phosphorylation in the second assay. Rather, the methods can be readily extended to the use of other assays that detect or identify other characteristics of proteins or peptides, such as the assays and characteristics set forth herein or known in the art. Furthermore, methods set forth in the context of this example, FIG. 2A or FIG. 2B need not be limited to use of unique identifier labels. Other unique identifiers can be used additionally or instead.

Example II

Proteins Encoded by Locations and Peptides Encoded by Locations

A method for characterizing proteins can include steps of (a) detecting a plurality of proteins, wherein individual proteins of the plurality are located at unique protein addresses of an array, wherein the detecting distinguishes the identities of the individual proteins at the unique protein addresses of the array; (b) digesting the proteins at the unique protein addresses of the array to form peptides; (c) transferring the peptides from the unique protein addresses of the array to unique peptide addresses of an array, wherein the unique protein address from which the peptides are transferred is known for individual peptides at the unique peptide addresses; (d) detecting the peptides at the unique peptide addresses, wherein the detecting distinguishes characteristics of individual peptides; and (e) correlating the characteristics detected in step (d) with individual proteins detected in step (a) based on the known unique protein addresses and the known unique peptide addresses for the peptides.

A method of the present disclosure can be configured to encode individual proteins with unique protein addresses in an array and to encode peptide fragments of the proteins with unique peptide addresses in an array. Information pertaining to the identity or characteristic(s) of a protein can be encoded by the protein address with which the protein is associated. Information that is encoded for a given protein by its associated protein address can be transferred to one or more unique peptide addresses that are associated with one or more peptide fragments of the protein, respectively. In some configurations, the nexus between the information encoded by the protein address and the information encoded by the peptide address(es) is transfer of unique identifier label(s) between the protein address and the peptide address(es). The association of the unique identifier label(s) with the addresses can be observed or detected as set forth in Example I, supra. Additionally or alternatively, the nexus between the information encoded by the protein address and the information encoded by the peptide address(es) can be knowledge of the transfer of one or more peptide from a given protein address to one or more known peptide address. Thus, information acquired from an assay performed at the protein address can be correlated with information acquired from an assay performed for the peptide(s) at the peptide address(es). As such, characteristics attributed to the peptide(s) can be correlated with the protein identified or characterized at the protein address.

Figure 3A:
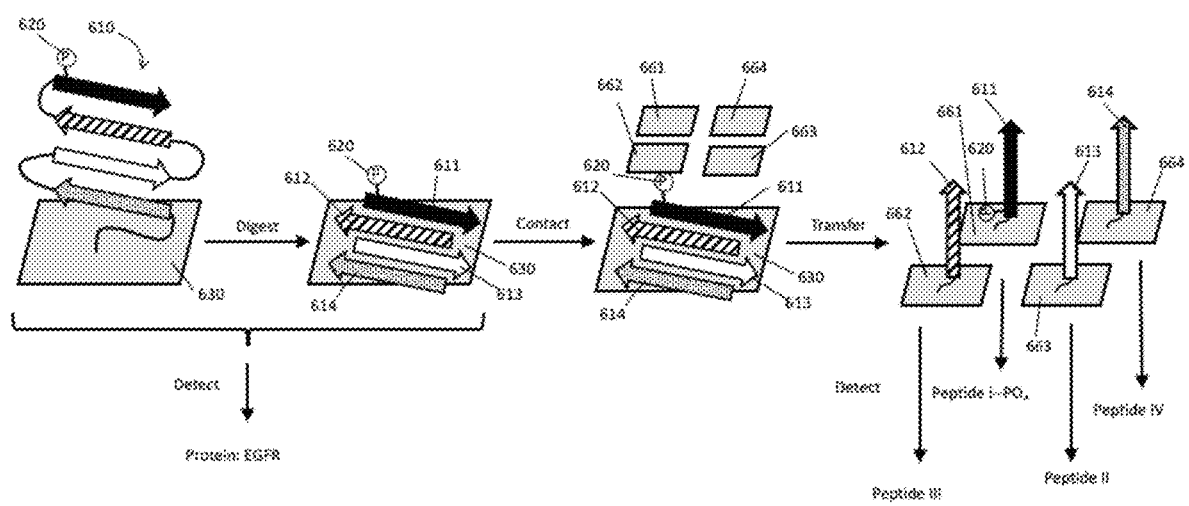
FIG. 3A shows a diagrammatic representation of processes carried out for a protein associated with a protein address and peptide fragments associated peptide addresses, wherein peptide fragments are transferred from the protein address to the peptide addresses.

FIG. 3A shows a diagrammatic representation of steps that can be used in a method for characterizing a protein. In this example, protein 610 is associated with protein address 630 and it has a phosphoryl moiety 620. Protein 610 can be associated with protein address 630 via attachment to a surface of a solid support that forms part of protein address 630 or via attachment to a linker or particle (e.g. a structured nucleic acid particle) that is immobilized (e.g. via attachment or confinement) at protein address 630. Protein 610 can be digested to form peptides 611 to 614 (i.e. fragments of protein 610). As with other configurations of the methods set forth herein, digestion to create peptide fragments can occur at a protein address. In some configurations, the peptides 611 to 614 will be released from the surface due to digestion. Alternatively, protein 610 can be retained at the surface for some period of time after digestion. For example, protein 610 can have multiple points of attachment to protein address 630 including attachment to one or more regions of the protein that are included in peptides 611 to 614. One or more of peptides 611 to 614 can be retained via other mechanisms such as those set forth elsewhere herein. The retained peptides can then be released using methods set forth herein and then transferred to peptide addresses.

Figure 3B:
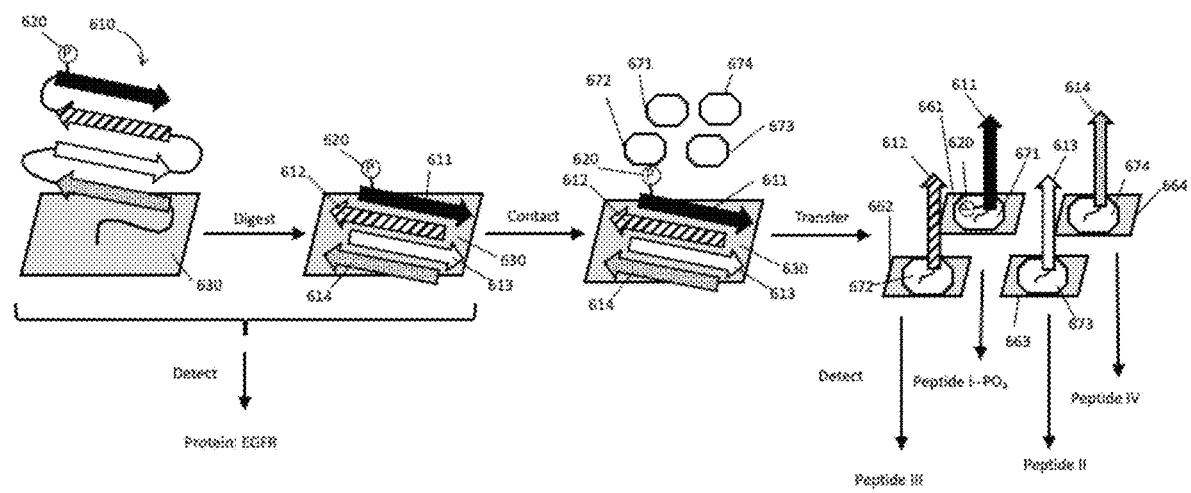
FIG. 3B shows a diagrammatic representation of processes carried out for a protein associated with a protein address and peptide fragments associated peptide addresses, wherein peptide fragments are transferred from the protein address to the peptide addresses by linkers.

One or more of peptides 611 to 614 can be released from protein address 630 for transfer to one or more of peptide addresses 661 to 664, respectively. As exemplified in FIG. 3A, transfer can be facilitated by juxtaposition of protein address 630 with peptide addresses 661 to 664. An alternative transfer process is shown in FIG. 3B. Here, protein address 630 is contacted with particles 671-674 which are configured to attach peptides 611-614. The particle attached peptides are transferred to a peptide array for attachment to peptide addresses 661-664. The particles can be nucleic acid origami particles having a single nucleotide moiety that attaches to a peptide. As such, each particle will attach to no more than one of peptides 611-614. Peptide addresses 661-664 have a surface area that accommodates only a single particle (i.e. a second particle is sterically excluded from binding to a peptide address once another particle is present. As such, each peptide address will attach to no more than a single particle. When the particles each have only a single peptide attached, the result is an array of peptide addresses configured for single-molecule detection of the peptides. In some configurations of the exemplified method, contact can occur after digestion is complete. Alternatively, digestion can occur while peptide addresses 661 to 664 are juxtaposed with protein address 630 or while particles 671-674 are in contact with protein address 630. Accordingly, peptide addresses 661 to 664 or particles 671-674 can be in contact with peptides 611 to 614 to facilitate transfer.

Protein 610 can be detected in association with address 630. For example, protein 610 can be detected using a method set forth herein or known in the art for identifying the protein. Optionally, phosphoryl moiety 620 can be detected while the protein is at protein address 630. The location of protein address 630 provides a unique identifier of protein 610. In the examples shown in FIGS. 3A-3C, protein 610 is identified as EGFR. Protein 610 can optionally be detected before, during or after the digestion reaction. As such, protein 610 can be intact during detection or the peptide products can be present during detection. Peptide fragments 611 to 614 can be detected at protein address 630, for example, using an assay set forth herein and the results can be used to identify protein 610 as EGFR.

Peptide fragments 611 to 614 can be detected at peptide addresses 661 to 664, respectively, in a second assay. For example, the second assay can be performed to identify a post translational modification such as presence of a phosphoryl moiety 620 as shown for peptide I (611) in FIGS. 3A-3C. The presence of phosphorylation on peptide I (611) can be attributed to phosphorylation of EGFR due to knowledge of the transfer of peptide I (611) from protein address 630 to peptide address 661. The assay can also detect absence of phosphorylation for peptides II to IV (612 to 614), and this can be attributed to EGFR due to knowledge of the transfer of peptides II to IV (612 to 614) from protein address 630 to peptide addresses 662 to 664, respectively. Optionally, an assay can be performed on peptides 611 to 614 to identify sufficient structural features (e.g. the primary amino acid sequence of the peptides) to locate the peptides in the structure of the EGFR protein. This information can be useful for locating the region of EGFR that is phosphorylated. If the phosphorylated amino acid can be identified from assay of the peptide fragments, then the phosphorylated amino acid in EGFR can be identified as well. Similarly, absence of detected phosphorylation in peptides II to IV (612 to 614) can indicate absence of phosphorylation in the respective regions of EGFR.

Figure 3C:
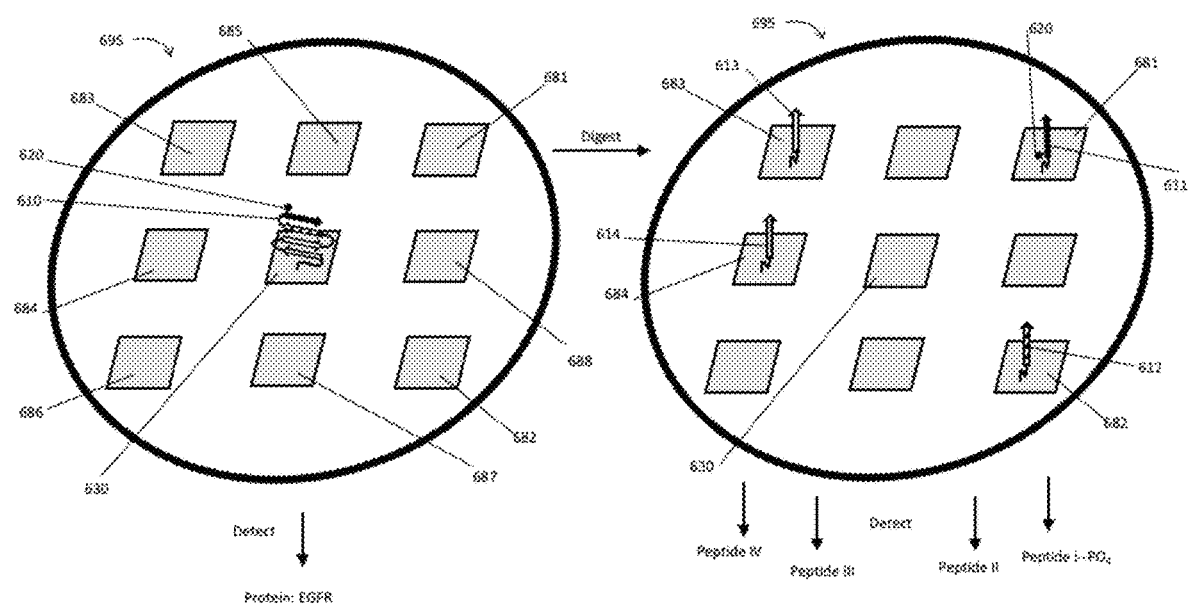
FIG. 3C shows a diagrammatic representation of processes carried out for a protein associated with a protein address and peptide fragments associated peptide addresses, wherein protein addresses and peptide addresses are colocalized.

For purposes of illustration, FIGS. 3A-3C show a single protein address. Multiplex formats can be configured to include a plurality of protein addresses each associated with a different protein. In an optional multiplexed configuration, individual proteins of a plurality can be randomly located at the protein addresses of the array. As such, the identities of the individual proteins at the unique protein addresses may be unknown prior to performing an assay on the proteins. A method of characterizing a plurality of proteins can include a step of randomly distributing the plurality of proteins at the protein addresses of the array. The distribution step can be carried out prior to or during a detection assay. In some configurations, the proteins can be attached to probe nucleic acids that are complementary to nucleic acids at addresses of an array. The sequence of the nucleic acid(s) attached to each protein need not be known prior to the distribution step. Moreover, the addresses for the probe sequence need not be known prior to the distribution step. The nucleic acid moieties of the proteins can serve as linkers that facilitate attachment of the proteins via hybridization and the locations of the proteins can be determined using methods set forth herein.

In an optional multiplexed configuration, proteins can be located at known protein addresses of the array. In this configuration, a detection assay need not be performed to identify the protein at each address. However, a detection assay can be carried out, for example, to confirm the identity of the protein at each address. An assay for determining another characteristic of the protein at each site, such as the presence or absence of a post-translational modification, can be performed as an alternative or addition to a protein identification assay. A method of characterizing a plurality of proteins can include a step of distributing a plurality of proteins to known protein addresses, respectively. The distribution step can be carried out, for example, using inkjet technology, nanofluidics or other array manufacturing techniques known in the art. In another example, the proteins can be attached to nucleic acids, each protein being attached to one or more nucleic acids having a known sequence that hybridizes to one or more nucleic acids having known sequences at a known address of an array. The location for individual proteins can be determined based on the known sequence for the nucleic acid(s) that are attached to the proteins, the known location of the probe sequences in the array and known rules for nucleic acid complementarity.

Methods set forth in the context of this example and FIGS. 3A-3C can further include a step of releasing one or more of peptides 611 to 614 from protein address 630. In a multiplex configuration, such as an array of protein addresses, the peptides can be released from a plurality of the protein addresses to produce a mixture of different peptides and associated unique nucleic acid sequences. For example, the peptides can be retained at the protein addresses via an immobilization mechanism that can be disrupted using reagents or conditions that are common to a plurality of protein addresses. By way of further examples, the peptides can be attached to protein addresses via scissile linkages that are cleaved via a reagent that is delivered to the array; the peptides can be attached to protein addresses via hybridization of nucleic acid strands that are denatured under similar treatments (e.g. treatment with heat above a melting temperature for the nucleic acid strands or a chemical denaturant); or the peptides can be immobilized to protein addresses via a temporary confinement (e.g. wax or lipid bilayer covering to a well) that is disrupted via a treatment of the array. Thus, the peptides can be manipulated or detected as a mixture or pool in downstream steps.

Peptides need not be removed from an array of protein addresses as a pool of peptides from different proteins. Rather, the peptides can be selectively released from individual unique protein addresses to produce separated fractions, each fraction being derived from a single protein. For example, the peptides can be retained at the protein addresses via immobilization mechanisms that can be disrupted using reagents or conditions that are unique to different protein addresses in the array. By way of further examples, the peptides can be attached to protein addresses via photolabile linkages that are photolyzed at different wavelengths of radiation; the peptides can be attached to protein addresses via hybridization of nucleic acid strands that are recognized and cleaved by different restriction endonuclease or other sequence specific nucleic acid enzymes; or the peptides can be selectively released by application of an electric field to the unique protein addresses individually. Accordingly, one or more peptide fragments from a given protein or given address in an array can be manipulated or detected as a separate fraction from peptide fragments of other proteins or protein addresses in the array.

Optionally, a protein address can be in the same array as one or more peptide addresses. For example, an array can be configured to have a plurality of protein addresses, wherein each peptide address is in proximity to one or more peptide addresses. FIG. 3C shows an example in which peptide addresses 681-688 are arranged as satellites of protein address 630. Protein address 630 can be present in a well 695 with peptide addresses 681-688. An array can include multiple wells each having a single protein address and one or more peptide addresses. The well 695 can function to prevent or retard diffusion of released peptides 611-614 such that the peptides are preferentially transferred to peptide addresses 681-684 in the same well as the protein address 630 from which they were released. Other surface features that prevent or retard diffusion, such as ridges, channels or pillars, can be used to separate protein addresses (and their peptide addresses) from other protein addresses. Whether or not wells or other features are present on an array, a first protein address in an array can be closer to one or more peptide addresses than it is to some or all of the other protein addresses in the array. Peptides released from the first protein address under passive diffusion or non-directional diffusion are more likely to transfer to a peptide address that is proximal to the first protein address than to a peptide address that is more distal, for example, due to being proximal to a second protein address. As illustrated by this exemplary configuration, relative location of a peptide address to a protein address can be positively weighted when correlating the characteristics detected for a peptide at the peptide address with a protein identified at the protein address. Alternatively, a protein address need not be located proximal to peptide addresses. Rather, a plurality of protein addresses can be located proximal to each other in one region of an array and a plurality of peptide addresses can be located proximal to each other. Accordingly, one or more protein addresses in an array can be closer to another protein address in the array than to any peptide address in the array.

Optionally, protein address 630 can be in a separate array from the array of peptide addresses 661 to 664, for example as shown in FIG. 3A. An advantage of this configuration is that some or all of the peptide addresses in a peptide array can be juxtaposed with one or more of the protein addresses in a protein array. Optionally, a plurality of protein addresses can be in simultaneous contact with respective peptide addresses. Alternatively, different protein addresses can be serially contacted with their respective peptide addresses. The juxtaposition can be temporary, for example, to facilitate transfer of peptides from a protein address on a protein array to one or more peptide address on a peptide array prior to separating the arrays for detection. Alternatively, the addresses of the two arrays can be juxtaposed after transfer, for example, during detection.

One or more peptides can be transferred from a protein address to a peptide address via passive diffusion or active transport. Active transport can be achieved, for example, using an electric field to move charged peptides, fluid flow from one location to another, magnetic attraction of paramagnetically labeled peptides or the like. Another means for moving peptides is to contact the peptides with beads or particles and transfer the peptide loaded beads or peptide loaded particles to addresses of a peptide array using active transport mechanisms that act on the beads or particles. For example, charged beads or particles can be transferred via electric field, paramagnetic or magnetic beads can be moved via magnetic forces, and the like. As a further option, the peptides can be captured at addresses of an array that are configured to bind to the beads or particles, such as an array of wells that fit one particle or bead per well.

A three-dimensional array can be useful. For example, a plurality of proteins can be identified or otherwise characterized at protein addresses that are spatially separated in the x and y dimensions of a coordinate system. The proteins can then be digested and the peptides from each proteins address can be separated along the z dimension of the coordinate system. For example, peptides can be separated via electrophoresis through a gel or other porous material that is in contact with the protein addresses. In this configuration, peptides can be separated according to mass, charge or charge-to-mass ratio based on the electrophoresis technique used. The location of each peptide in the x,y,z coordinate system can be used to trace back to the protein address from which the peptide was derived. The peptides can be detected while in the three-dimensional array or, alternatively, the peptides can be removed for subsequent detection. For example, a column of one or more peptides (e.g. peptides separated along the z dimension) derived from a given protein address (e.g. a protein address at a defined x, y coordinate) can be removed prior to detecting the peptides using a technique set forth herein or known in the art.

Methods set forth in the context of this example or FIGS. 3A-3C need not be limited to identification of a protein in the first assay nor to detection of phosphorylation in the second assay. Rather, the methods can be readily extended to the use of other assays that detect or identify other characteristics of proteins or peptides, such as the assays and characteristics set forth herein or known in the art. Furthermore, methods set forth in the context of this example or FIGS. 3A-3C can optionally include the use of unique identifier labels. Alternatively, methods set forth in the context of this example or FIGS. 3A-3C can be performed without the use of unique identifier labels in one, some or all steps.

Example III

Proteins Encoded by Labels and Peptides Encoded by Locations

A method for characterizing proteins can include steps of (a) detecting a plurality of proteins, wherein individual proteins of the plurality are associated with unique identifier labels, wherein the detecting distinguishes the identities of the individual proteins and the unique identifier labels associated with the individual proteins; (b) digesting the proteins to form peptides, wherein the peptides from each protein are associated with the unique identifier labels for the respective individual protein; (c) transferring the peptides and the unique identifier labels to unique peptide addresses of an array; (d) detecting the peptides at the unique peptide addresses, wherein the detecting distinguishes characteristics of individual peptides and the unique identifier labels associated with the individual proteins; and (e) correlating the characteristics detected in step (d) with individual proteins detected in step (a) based on the detection of the unique identifier labels.

A method of the present disclosure can be configured to encode individual proteins with unique identifier labels and to encode peptide fragments of the proteins with unique peptide addresses. Information pertaining to the identity or characteristic(s) of a protein can be encoded by the unique identifier labels with which the protein is associated. Information that is encoded for a given protein by its associated unique identifier label can be transferred to one or more unique peptide addresses that are associated with one or more peptide fragments of the protein, respectively. In some configurations, the nexus between the information encoded by the unique identifier label and the information encoded by the unique peptide address(es) is an association of the unique identifier label with the peptide address(es). Thus, information acquired from an assay performed using the label-associated protein can be correlated with information acquired from an assay performed for the peptide(s) at the peptide address(es). As such, characteristics attributed to the peptide(s) can be correlated with the protein identified or characterized in association with the unique identifier label.

A unique identifier label will typically be associated with a protein prior to or during detection of the protein. Unique identifier label(s) can be associated with a protein in a variety of ways. For example, unique identifier label(s) can be attached to the protein or colocalized with the protein. In some cases, one or more unique identifier labels are colocalized with a protein, for example being contained in the same vessel, without being attached to the protein. One or more unique identifier label(s) can be attached to a protein at one or more regions of the protein that will be included in peptide fragments. As such, digesting the protein can form one or more peptide fragments attached to a unique identifier label. Multiple peptide fragments of a protein can be attached to unique identifier labels that are unique for the protein (compared to other proteins). The unique identifier labels for some or all of the peptides from a given protein can be indistinguishable from each other. Alternatively, the unique identifier labels for some or all of the peptides from a given protein can be distinguishable, for example, such that each peptide is uniquely encoded compared to other peptides from the same protein.

A unique identifier label can be associated with a peptide via attachment to the peptide, for example, via a covalent or non-covalent bond. A unique identifier label can be associated with a peptide via attachment to an object that is associated with the peptide. Exemplary objects include, but are not limited to, a bead, particle, solid support, address, nucleic acid, or linker used to associate a peptide with another object. A unique identifier label can be associated with a peptide via attachment to the protein from which the peptide is produced.

Figure 4:
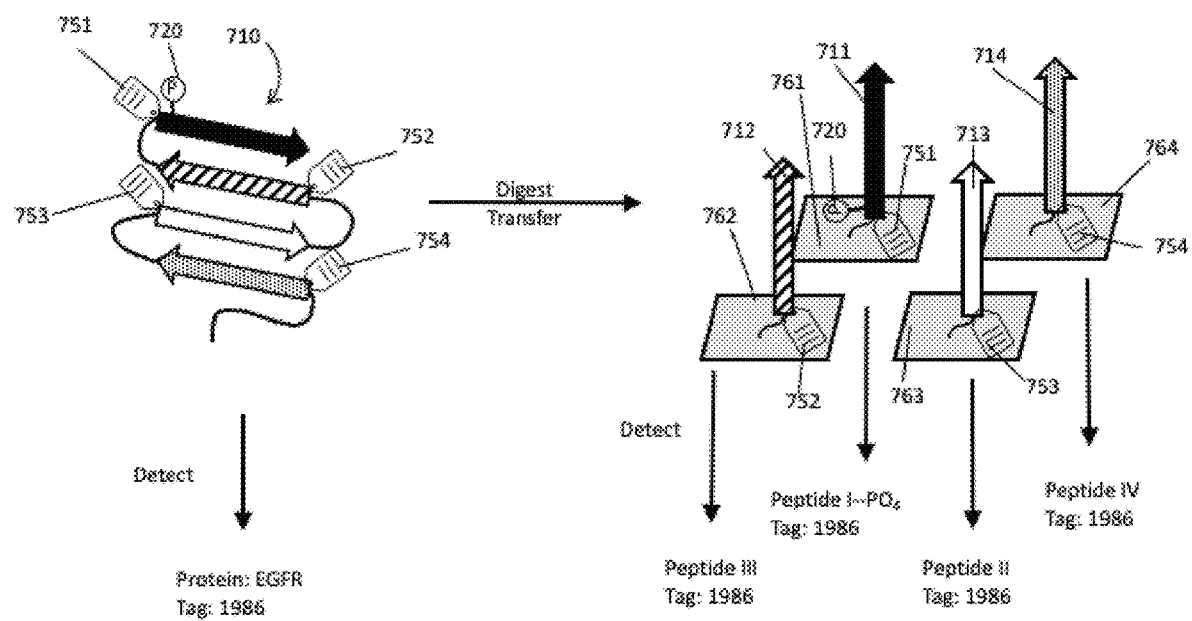
FIG. 4 shows a diagrammatic representation of processes carried out for a protein associated with a unique identifier label and peptide fragments associated peptide addresses.

FIG. 4 shows a diagrammatic representation of steps that can be used in a method for characterizing a protein. In this example a protein 710 is attached to unique identifier labels 751 to 754 at regions that will be included in peptide fragments 711 to 714. Protein 710 has a phosphoryl moiety 720. Protein 710 can optionally be associated with a protein address, for example, as exemplified elsewhere herein. However, protein 710 need not be associated with a unique address. Protein 710 can be associated with a solid support, bead, particle or other object. However, protein 710 need not be associated with one or more of those objects or any other object known in the art. For example, protein 710 can be in solution phase during one or more steps of the method set forth herein, such as during the detection step, digestion step or both.

Protein 710 can be detected in association with unique identifier labels 751 to 754. For example, the protein can be detected using a method set forth herein or known in the art for identifying the protein. Presence or absence of phosphoryl moiety 720 can optionally be detected in the protein prior to the digestion or transfer step. Encoded characteristics for one or more of unique identifier labels 751 to 754 can be detected in association with protein 710 and decoded. In the example shown, protein 710 is identified as EGFR and the unique identifier labels are identified as tag number 1986. The method can include a step of digesting protein 710 to form peptides 711 to 714 (i.e. fragments of protein 710). The digestion step can occur during or after detection of protein 710 and its associated identifier labels 751 to 754. In some cases, protein 710 can be digested to form peptides 711 to 714 prior to detection. As such, peptides 711 to 714 can be detected to determine the identity of protein 710 or a characteristic of protein 710.

Peptides 711 to 714 and associated unique identifier labels 751 to 754, respectively, can be transferred to peptide addresses 761 to 764, respectively. Peptide fragments 711 to 714 and their associated tags 751 to 754, respectively, can be detected in a second assay at peptide addresses 761 to 764. For example, the second assay can be performed to identify a post translational modification such as presence of a phosphoryl moiety 720 as shown for peptide I (711). The presence of phosphorylation on peptide I (711) can be attributed to phosphorylation of EGFR due to protein 710 and peptide I (711) both being associated with common tag 1986 (751). The assay can also detect absence of phosphorylation for peptides II to IV (712 to 714), and this can be attributed to EGFR due to the peptides and protein 710 being associated with common tag 1986 (752 to 754). Optionally, an assay can be performed on peptides 711 to 714 to identify sufficient structural features (e.g. the primary amino acid sequence of the peptides) to locate the peptides in the structure of the EGFR protein. This information can be useful for locating the region of EGFR that is phosphorylated. If the phosphorylated amino acid can be identified from assay of the peptide fragments, then the phosphorylated amino acid in EGFR can be identified as well. Similarly, absence of detected phosphorylation in peptides II to IV (712 to 714) can indicate absence of phosphorylation in the respective regions of EGFR.

For purposes of illustration, FIG. 4 shows a single protein 710. Multiplex formats can be configured to include a plurality of different proteins each associated with identifier labels that are unique to each of the different proteins in the plurality. As such, different unique identifier labels can be used to distinguish a given protein from the other proteins in the plurality. In an optional multiplexed configuration, individual proteins of a plurality can be randomly associated with unique identifier labels. As such, the identity of the individual protein associated with a given unique identifier label may be unknown prior to performing an assay on the protein. A method of characterizing a plurality of proteins can include a step of randomly associating the plurality of proteins with a plurality of unique identifier label. The associating step can be carried out prior to or during a detection assay.

In an optional multiplexed configuration, proteins can be associated with known unique identifier labels. In this configuration, a label decoding assay need not be performed to identify the protein associated with each label. However, a label decoding assay can be carried out, for example, to confirm the identity of a protein associated with a given unique identifier label. An assay for determining another characteristic of a protein associated with a given unique identifier label can be performed as an alternative or addition to a protein identification assay. A method of characterizing a plurality of proteins can include a step of associating a plurality of proteins to known unique identifier labels, respectively. The associating step can be carried out, for example, using a plurality of discrete deliveries, wherein each delivery includes associating a known label with a known protein. In another example, known proteins can be attached to known nucleic acids, each protein being attached to one or more nucleic acids having a known sequence that hybridizes to one or more nucleic acids having known sequences and being associated (e.g. via attachment to) a known unique identifier label. The identity for individual proteins can be determined based on the known sequence for the nucleic acid(s) that are attached to the proteins, the known unique identifier label associated with each nucleic acid, and known rules for nucleic acid complementarity.

Optionally, protein 710 can be detected in the presence of peptide addresses 761 to 764. Protein 710 can be associated with one or more of peptide addresses 761 to 764, for example, via attachment. However, protein 710 need not be associated with any peptide address including peptide addresses 761 to 764. For example, protein 710 can be detected in a solution that is in contact with peptide addresses 761 to 764 or on a solid support that is in fluidic communication with peptide addresses 761 to 764. In another configuration, protein 710 can be attached to a protein address and one or more of peptides 711 can be transferred from the protein address to peptide addresses 761 to 764 using methods set forth in Example I or II, or elsewhere herein. One or more peptides and associated unique identifiers can be transferred to a peptide address via passive diffusion, active transport or other methods set forth in Example I or II, or elsewhere herein.

In some configurations, the unique identifier labels can include nucleic acids encoded with unique sequences. The unique sequences can be detected to decode the identity or other characteristics of proteins or peptides with which the nucleic acids are associated. Multiple peptides can be associated with nucleic acids having a common sequence that encodes the identity or other characteristics of a protein from which the peptides were derived. Multiple peptides from the same protein can, additionally or alternatively, be encoded with sequences that are unique to the peptide. Encoded nucleic acids can have sequences that hybridize to complementary nucleic acids at peptide addresses. For example, peptides can be attached to nucleic acids, each peptide being attached to a nucleic acid having a known sequence that hybridizes to one or more nucleic acids having known sequences at a known peptide address of an array. The location for individual peptides can be determined based on the known sequence for the nucleic acid(s) that are attached to the peptides, the known location of complementary nucleic acid sequences in the peptide array and known rules for nucleic acid complementarity.

Methods set forth in the context of this example or FIG. 4 need not be limited to identification of a protein in the first assay nor to detection of phosphorylation in the second assay. Rather, the methods can be readily extended to the use of other assays that detect or identify other characteristics of proteins or peptides, such as the assays and characteristics set forth herein or known in the art. Furthermore, methods set forth in the context of this example, or FIG. 4 need not be limited to use of unique identifier labels. Other unique identifiers can be used additionally or instead.

Example IV

Proteins Encoded by Labels and Peptides Encoded by Labels

Also provided is a method for characterizing proteins, the method including steps of (a) detecting a plurality of proteins, wherein individual proteins of the plurality are associated with unique identifier labels, wherein the detecting distinguishes the identities of the individual proteins and the unique identifier labels associated with the individual proteins; (b) digesting the proteins to form peptides, wherein the peptides from each protein are associated with the unique identifier labels for the respective individual protein; (c) detecting the peptides and associated unique identifier labels, wherein the detecting distinguishes characteristics of individual peptides, and wherein the detecting distinguishes unique identifier labels associated with the individual peptides; and (d) correlating the characteristics detected in step (c) with individual proteins detected in step (a) based on the unique identifier labels associated with the individual proteins and the peptides.

A method of the present disclosure can be configured to encode individual proteins with unique identifier labels and to encode peptide fragments of the proteins with unique identifier labels. Information pertaining to the identity or characteristic(s) of a protein can be encoded by the unique identifier label with which the protein is associated. Information that is encoded for a given protein by its associated unique identifier label can be transferred to one or more unique identifier labels that are associated with one or more peptide fragments of the protein, respectively. The transfer of encoded information from a given protein to a given peptide fragment of the protein can occur due to association of a particular label molecule with the protein and with the peptide. For example, the label can be attached to the protein at a region that is included in the peptide after digestion of the protein. Alternatively, the transfer of encoded information from a given protein to a given peptide fragment of the protein can occur due to modification of a peptide-associated unique identifier label due to specific interaction with a protein associated unique identifier label. For example, a nucleic acid tag that is associated with a protein can include an encoded sequence that is copied to a peptide associated nucleic acid or a peptide-associated nucleic acid sequence can be modified in a way that is specific to presence of the protein-associated nucleic acid. Accordingly, the nexus between the information encoded by the protein associated-tag and a peptide-associated tag can be physical presence of a particular label molecule with both or modification of one label molecule by another label molecule.

A unique identifier label will typically be associated with a protein prior to or during detection of the protein. Unique identifier label(s) can be associated with a protein in a variety of ways. For example, unique identifier label(s) can be attached to the protein or colocalized with the protein. In some cases, one or more unique identifier labels are colocalized with a protein, for example being contained in the same vessel, without being attached to the protein. One or more unique identifier label(s) can be attached to a protein at one or more regions of the protein that will be included in peptide fragments. As such, digesting the protein can form one or more peptide fragments attached to a unique identifier label. Multiple peptide fragments of a protein can be attached to unique identifier labels that are unique for the protein (compared to other proteins). The unique identifier labels for some or all of the peptides from the protein can be indistinguishable from each other. Alternatively, the unique identifier labels for some or all of the peptides from the protein can be distinguishable, for example, such that each peptide is uniquely encoded compared to other peptides from the same protein.

Figure 5:
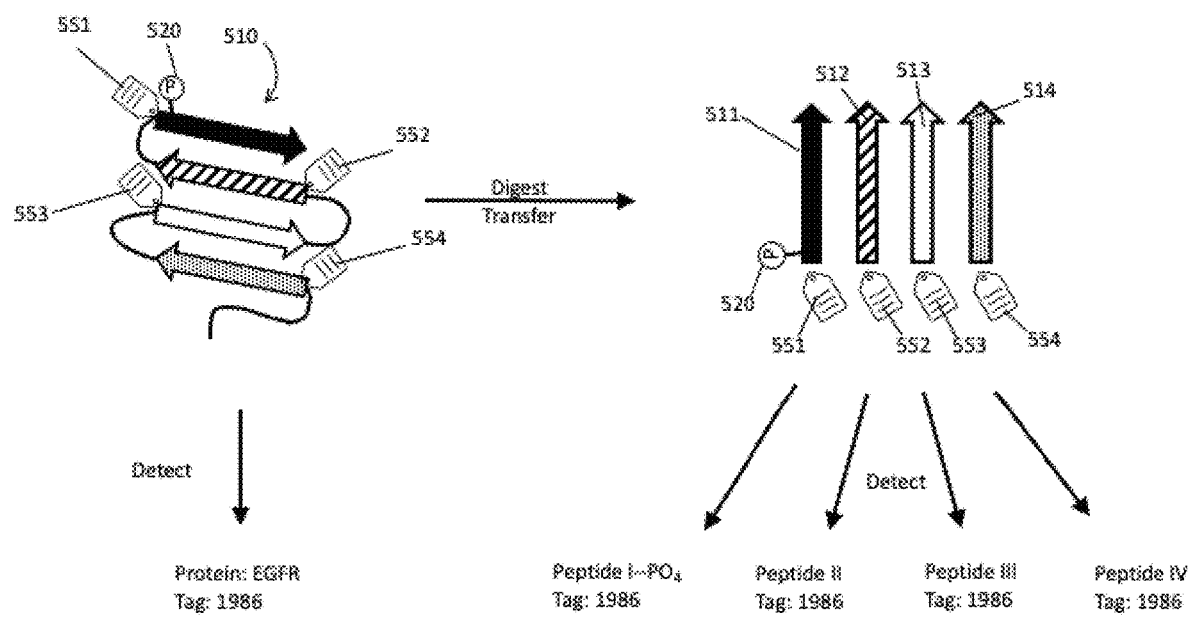
FIG. 5 shows a diagrammatic representation of processes carried out for a protein associated with a unique identifier label and peptide fragments associated unique identifier labels.

FIG. 5 shows a diagrammatic representation of steps that can be used in a method for characterizing a protein. In this example a protein 510 is attached to unique identifier labels 551 to 554 at regions that will be included in peptide fragments 511 to 514. Protein 510 has a phosphoryl moiety 520. Protein 510 can optionally be associated with a protein address, for example, as exemplified elsewhere herein. However, protein 510 need not be associated with a unique address. Protein 510 can be associated with a solid support, bead, particle or other object. However, protein 510 need not be associated with one or more of those objects or any other object known in the art. For example, protein 510 can be in solution phase during one or more steps of the method set forth herein, such as during the detection step, digestion step or both.

Protein 510 can be detected in association with unique identifier labels 551 to 554. For example, the protein can be detected using a method set forth herein or known in the art for identifying the protein. Encoded characteristics for one or more of unique identifier labels 551 to 554 can be detected in association with protein 510 and decoded. In the example shown, protein 510 is identified as EGFR and the unique identifier labels are identified as tag number 1986. The method can include a step of digesting protein 510 to form peptides 511 to 514 (i.e. fragments of protein 510). The digestion step can occur during or after detection of protein 510 and its associated identifier labels 551 to 554. In some cases, protein 510 can be digested to form peptides 511 to 514 prior to detection. As such, peptides 511 to 514 can be detected to determine the identity of protein 510 or a characteristic of protein 510.

Peptides 511 to 514 and associated unique identifier labels 551 to 554, respectively, can be detected in a second assay 5. For example, the second assay can be performed to identify a post translational modification such as presence of a phosphoryl moiety 520 as shown for peptide I (511). The presence of phosphorylation on peptide I (511) can be attributed to phosphorylation of EGFR due to protein 510 and peptide I (511) both being associated with common tag 1986 (551). The assay can also detect absence of phosphorylation for peptides II to IV (512 to 514), and this can be attributed to EGFR due to the peptides and protein 510 being associated with common tag 1986 (552 to 554). Optionally, an assay can be performed on peptides 511 to 514 to identify sufficient structural features (e.g. the primary amino acid sequence of the peptides) to locate the peptides in the structure of the EGFR protein. This information can be useful for locating the region of EGFR that is phosphorylated. If the phosphorylated amino acid can be identified from assay of the peptide fragments, then the phosphorylated amino acid in EGFR can be identified as well. Similarly, absence of detected phosphorylation in peptides II to IV (512 to 514) can indicate absence of phosphorylation in the respective regions of EGFR.

For purposes of illustration, FIG. 5 shows a single protein 510. Multiplex formats can be configured to include a plurality of different proteins each associated with identifier labels that are unique to each of the different proteins in the plurality. As such, different unique identifier labels can be used to distinguish a given protein from the other proteins in the plurality. In an optional multiplexed configuration, individual proteins of a plurality can be randomly associated with unique identifier labels. As such, the identity of the individual protein associated with a given unique identifier label may be unknown prior to performing an assay on the protein. A method of characterizing a plurality of proteins can include a step of randomly associating the plurality of proteins with a plurality of unique identifier label. The associating step can be carried out prior to or during a detection assay.

In an optional multiplexed configuration, proteins can be associated with known unique identifier labels. In this configuration, a label decoding assay need not be performed to identify the protein associated with each label. However, a label decoding assay can be carried out, for example, to confirm the identity of a protein associated with a given unique identifier label. An assay for determining another characteristic of a protein associated with a given unique identifier label can be performed as an alternative or addition to a protein identification assay. A method of characterizing a plurality of proteins can include a step of associating a plurality of proteins to known unique identifier labels, respectively. The associating step can be carried out, for example, using a plurality of discrete deliveries, wherein each delivery includes associating a known label with a known protein. In another example, known proteins can be attached to known nucleic acids, each protein being attached to one or more nucleic acids having a known sequence that hybridizes to one or more nucleic acids having known sequences and being associated (e.g. via attachment to) a known unique identifier label. The identity for individual proteins can be determined based on the known sequence for the nucleic acid(s) that are attached to the proteins, the known unique identifier label associated with each nucleic acid, and known rules for nucleic acid complementarity.

In some configurations, the unique identifier labels can include nucleic acids encoded with unique sequences. The unique sequences can be detected to decode the identity or other characteristics of proteins or peptides with which the nucleic acids are associated. Multiple peptides can be associated with nucleic acids having a common sequence that encodes the identity or other characteristics of a protein from which the peptides were derived. Multiple peptides from the same protein can, additionally or alternatively, be encoded with sequences that are unique to the peptide. Encoded nucleic acids can have sequences that hybridize to complementary nucleic acids at peptide addresses. For example, peptides can be attached to nucleic acids, each peptide being attached to a nucleic acid having a known sequence that hybridizes to one or more nucleic acids having known sequences at a known peptide address of an array. The location for individual peptides can be determined based on the known sequence for the nucleic acid(s) that are attached to the peptides, the known location of complementary nucleic acid sequences in the peptide array and known rules for nucleic acid complementarity.

Methods set forth in the context of this example or FIG. 5 need not be limited to identification of a protein in the first assay nor to detection of phosphorylation in the second assay. Rather, the methods can be readily extended to the use of other assays that detect or identify other characteristics of proteins or peptides, such as the assays and characteristics set forth herein or known in the art. Furthermore, methods set forth in the context of this example, or FIG. 5 need not be limited to use of unique identifier labels. Other unique identifiers can be used additionally or instead.

What is claimed is:

1. A composition, comprising:
    a) a nucleic acid particle; and
    b) a polypeptide attached to the nucleic acid particle through two or more linking moieties,
    wherein first ends of the two or more linking moieties are attached to the nucleic acid particle and second ends of the two or more linking moieties are attached to the polypeptide.

2. The composition of claim 1, wherein the polypeptide comprises a full-length protein.

3. The composition of claim 1, wherein the composition comprises a plurality of polypeptides, and each polypeptide in the plurality of polypeptides is attached to two or more linking moieties.

4. The composition of claim 1, wherein each of the two or more linking moieties comprises a same identifier label.

5. The composition of claim 1, wherein the polypeptide is attached to a linking moiety of the two or more linking moieties by a bond between the polypeptide and an identifier label attached to the linking moiety.

6. The composition of claim 1, wherein the polypeptide comprises at least one cleavage site.

7. The composition of claim 6, wherein the cleavage site is located on the polypeptide between an attachment site of a first linking moiety of the two or more linking moieties and a second attachment site of a second linking moiety of the two or more linking moieties.

8. The composition of claim 1, wherein the polypeptide comprises a post-translational modification.

9. The composition of claim 8, wherein the composition comprises a plurality of polypeptides and a second polypeptide in the composition does not comprise the post-translational modification.

10. The composition of claim 1, further comprising a solid support.

11. The composition of claim 10, wherein the nucleic acid particle is attached to the solid support.

12. The composition of claim 11, wherein the nucleic acid particle is contained within a well of the solid support.

13. The composition of claim 12, wherein the nucleic acid particle is attached to a bead, and wherein the bead is contained in the well of the solid support.

14. The composition of claim 1, further comprising an affinity reagent bound to the polypeptide.

15. The composition of claim 14, wherein the affinity reagent is bound to a post-translational modification of the polypeptide.

16. The composition of claim 14, wherein the affinity reagent is bound to a trimer, tetramer, pentamer, or hexamer epitope of the polypeptide.

17. The composition of claim 1, wherein the polypeptide further comprises a molecular barcode.

18. An array comprising a first address for binding a first polypeptide and a second address for binding a second polypeptide, wherein the first address and the second address are optically resolvable, wherein the first address is attached to a first nucleic acid particle, wherein the second address is attached to a second nucleic acid particle, and wherein:
  a) the first nucleic acid particle comprises two or more linking moieties, wherein the two or more linking moieties of the first nucleic acid particle are attached to the first polypeptide; and
  b) the second nucleic acid particle comprises two or more linking moieties, wherein the two or more linking moieties of the second nucleic acid particle are attached to the second polypeptide;
wherein the first polypeptide differs from the second polypeptide.

19. A system comprising:
  a) a solid support, wherein an address of the solid support is attached to a nucleic acid particle, wherein the particle comprises two or more linking moieties, wherein the two or more linking moieties of the nucleic acid particle are attached to a polypeptide;
  b) a detectable affinity reagent, wherein the detectable affinity reagent is configured to provide a detectable signal, and wherein the detectable affinity reagent is configured to be delivered to the solid support;
  c) an optical detector; and
  d) one or more processors programmed to read data from the optical detector to detect a presence or absence of the detectable signal at the address of the solid support.

* * * * *